United States Patent
Wilkinson et al.

(10) Patent No.: US 10,592,959 B2
(45) Date of Patent: Mar. 17, 2020

(54) SYSTEMS AND METHODS FOR FACILITATING SHOPPING IN A PHYSICAL RETAIL FACILITY

(71) Applicant: Walmart Apollo, LLC, Bentonville, AR (US)

(72) Inventors: Bruce W. Wilkinson, Rogers, AR (US); Matthew A. Jones, Bentonville, AR (US); Aaron J. Vasgaard, Rogers, AR (US); Robert J. Taylor, Rogers, AR (US); Tim W. Webb, Rogers, AR (US); Todd D. Mattingly, Bentonville, AR (US); Jason R. Todd, Lowell, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 8 days.

(21) Appl. No.: 15/487,728

(22) Filed: Apr. 14, 2017

(65) Prior Publication Data
US 2017/0300999 A1 Oct. 19, 2017

Related U.S. Application Data

(60) Provisional application No. 62/323,026, filed on Apr. 15, 2016, provisional application No. 62/348,444, (Continued)

(51) Int. Cl.
*G06Q 30/06* (2012.01)
*G06Q 90/00* (2006.01)
*G06F 16/28* (2019.01)

(52) U.S. Cl.
CPC ....... *G06Q 30/0631* (2013.01); *G06F 16/288* (2019.01); *G06Q 90/00* (2013.01)

(58) Field of Classification Search
CPC .................................................. G06Q 30/0631
See application file for complete search history.

(56) References Cited

U.S. PATENT DOCUMENTS 4,771,380 A 9/1988 Kriz
4,931,929 A 6/1990 Sherman
(Continued)

FOREIGN PATENT DOCUMENTS

CA 2822865 2/2014
CN 103106267 5/2013
(Continued)

OTHER PUBLICATIONS

Gustafson, Krystina; "The anti-Amazons: Two brands shaking up retail"; http:// www.cnbc.com/2016/03/22/the-anti-amazons-two-brands-shaking-up-retail.html; Mar. 28, 2016; pp. 1-8.*

(Continued)

*Primary Examiner* — Florian M Zeender
*Assistant Examiner* — Whitney Poffenbarger
(74) *Attorney, Agent, or Firm* — Fitch, Even, Tabin & Flannery LLP

(57) ABSTRACT

In some embodiments, apparatuses and methods are provided herein useful to facilitate expedient shopping in a physical retail facility. In one embodiment, a shopping system directed to pre-filling shopping carts with retail items prior to a customer's arrival at the physical retail shopping facility includes a user database of user profiles having one or more partialities associated with customers, a product database of retail products with identified vectorized characterizations or product vectors, a plurality of physical shopping carts, and a control circuit. By one approach, the control circuit is configured to access the user database and the product database and identify suggested retail items for a particular customer based, in part, on comparisons between the identified partialities and the identified vectorized product characterizations of the retail products.

18 Claims, 25 Drawing Sheets

Related U.S. Application Data filed on Jun. 10, 2016, provisional application No. 62/436,842, filed on Dec. 20, 2016, provisional application No. 62/485,045, filed on Apr. 13, 2017, provisional application No. 62/356,375, filed on Jun. 29, 2016, provisional application No. 62/356,374, filed on Jun. 29, 2016, provisional application No. 62/413,487, filed on Oct. 27, 2016, provisional application No. 62/402,068, filed on Sep. 30, 2016.

(56) References Cited

U.S. PATENT DOCUMENTS

| | | | |
|---|---|---|---|
| 5,092,343 A | 3/1992 | Spitzer | |
| 5,357,439 A | 10/1994 | Matsuzaki | |
| 5,410,471 A | 4/1995 | Alyfuku | |
| 5,712,830 A | 1/1998 | Ross | |
| 5,737,611 A | 4/1998 | Vicik | |
| 5,974,396 A | 10/1999 | Anderson | |
| 6,236,974 B1 | 5/2001 | Kolawa | |
| 6,249,773 B1 | 6/2001 | Allard | |
| 6,260,024 B1 | 7/2001 | Shkedy | |
| 6,327,574 B1 | 12/2001 | Kramer | |
| 6,519,571 B1 | 2/2003 | Guheen | |
| 6,583,720 B1 | 6/2003 | Quigley | |
| 6,594,642 B1 | 7/2003 | Lemchen | |
| 6,614,348 B2 | 9/2003 | Ciccolo | |
| 6,615,208 B1 * | 9/2003 | Behrens | G06F 17/3069 707/754 |
| 6,654,725 B1 | 11/2003 | Langheinrich | |
| 6,655,963 B1 | 12/2003 | Horvitz | |
| 6,731,940 B1 | 5/2004 | Nagendran | |
| 6,826,541 B1 | 11/2004 | Johnston | |
| 6,856,249 B2 | 2/2005 | Strubbe | |
| 6,901,304 B2 | 5/2005 | Swan | |
| 6,937,710 B1 | 8/2005 | Griffiths | |
| 7,063,263 B2 | 6/2006 | Swartz | |
| 7,072,848 B2 | 7/2006 | Boyd | |
| 7,130,814 B1 | 10/2006 | Szabo | |
| 7,147,154 B2 | 12/2006 | Myers | |
| 7,174,312 B2 | 2/2007 | Harper | |
| 7,225,979 B2 | 6/2007 | Silverbrook | |
| 7,249,708 B2 | 7/2007 | McConnell | |
| 7,330,828 B2 | 2/2008 | Schoder | |
| 7,346,563 B2 | 3/2008 | Pellerin | |
| 7,369,680 B2 | 5/2008 | Trajkovic | |
| 7,508,307 B2 | 3/2009 | Albert | |
| 7,584,139 B2 | 9/2009 | Goodwin | |
| 7,657,457 B2 | 2/2010 | Razumov | |
| 7,658,327 B2 | 2/2010 | Tuchman | |
| 7,680,694 B2 | 3/2010 | Glazer | |
| 7,685,024 B2 | 3/2010 | Ofer | |
| 7,707,073 B2 | 4/2010 | Bloebaum | |
| 7,720,720 B1 | 5/2010 | Sharma | |
| 7,766,829 B2 | 8/2010 | Sloan | |
| 7,778,773 B2 | 8/2010 | Yaqub | |
| 7,814,029 B1 | 10/2010 | Siegel | |
| 7,819,315 B1 | 10/2010 | Pienkos | |
| 7,856,368 B2 | 12/2010 | Avallone | |
| 7,860,759 B2 | 12/2010 | Stoppelman | |
| 7,873,543 B2 | 1/2011 | Perrier | |
| 7,945,473 B2 | 5/2011 | Fano | |
| 8,013,729 B2 | 9/2011 | Buehler | |
| 8,036,951 B2 | 10/2011 | Kraft | |
| 8,055,546 B1 | 11/2011 | Cassone | |
| 8,073,460 B1 | 12/2011 | Scofield | |
| 8,086,546 B2 | 12/2011 | Spiegel | |
| 8,117,089 B2 | 2/2012 | Minsky | |
| 8,140,388 B2 | 3/2012 | Gross | |
| 8,239,287 B1 | 8/2012 | Smith | |
| 8,244,830 B2 | 8/2012 | Robinson | |
| 8,249,946 B2 | 8/2012 | Froseth | |
| 8,261,306 B2 | 9/2012 | Dimitrova | |
| 8,266,017 B1 | 9/2012 | Dearlove | |
| 8,271,322 B2 | 9/2012 | Ariyibi | |
| 8,285,715 B2 * | 10/2012 | Faria | G06F 17/30265 707/728 |
| 8,298,087 B1 | 10/2012 | Smith | |
| 8,316,020 B1 | 11/2012 | Kleinmann | |
| 8,364,520 B1 | 1/2013 | Eichorn | |
| 8,370,207 B2 | 2/2013 | Edwards | |
| 8,370,216 B2 | 2/2013 | Kessel | |
| 8,401,914 B1 | 3/2013 | Kim | |
| 8,429,026 B1 | 4/2013 | Kolawa | |
| 8,447,703 B2 | 5/2013 | Yuasa | |
| 8,457,354 B1 | 6/2013 | Kolar | |
| 8,494,915 B2 | 7/2013 | Mesaros | |
| 8,538,829 B1 | 9/2013 | Hu | |
| 8,558,703 B2 | 10/2013 | Edlund | |
| 8,577,753 B1 | 11/2013 | Vincent | |
| 8,583,511 B2 | 11/2013 | Hendrickson | |
| 8,595,773 B1 | 11/2013 | Wang | |
| 8,606,636 B1 | 12/2013 | Keoshkerian | |
| 8,606,645 B1 | 12/2013 | Applefeld | |
| 8,630,921 B2 | 1/2014 | Nuzzi | |
| 8,666,844 B2 | 3/2014 | Shaya | |
| 8,738,541 B2 | 5/2014 | Gross | |
| 8,744,920 B2 | 6/2014 | Aldomar | |
| 8,803,366 B2 | 8/2014 | Proud | |
| 8,818,876 B2 | 8/2014 | Yu | |
| 8,849,710 B2 | 9/2014 | Moghadam | |
| 8,849,719 B2 | 9/2014 | Baker | |
| 8,874,485 B2 | 10/2014 | Partridge | |
| 8,968,195 B2 | 3/2015 | Tran | |
| 9,015,277 B1 | 4/2015 | Slavin | |
| 9,030,295 B2 | 5/2015 | Allen | |
| 9,036,019 B2 | 5/2015 | Hanson | |
| 9,087,358 B1 | 7/2015 | Giorgalli | |
| 9,129,250 B1 * | 9/2015 | Sestini | G06Q 10/087 |
| 9,165,320 B1 | 10/2015 | Belvin | |
| 9,174,758 B1 | 11/2015 | Rowley | |
| 9,183,510 B1 | 11/2015 | Walti | |
| 9,189,021 B2 | 11/2015 | Jerauld | |
| 9,218,633 B2 | 12/2015 | Hulett | |
| 9,224,157 B2 | 12/2015 | Lim | |
| 9,230,070 B2 | 1/2016 | Farha | |
| 9,251,527 B2 | 2/2016 | Shah | |
| 9,256,693 B2 | 2/2016 | Nice | |
| 9,256,890 B1 | 2/2016 | Schmidt | |
| 9,286,617 B2 | 3/2016 | Maskatia | |
| 9,294,298 B2 | 3/2016 | Lee | |
| 9,325,849 B1 | 4/2016 | Brydon | |
| 9,424,589 B2 | 8/2016 | Perrier | |
| 9,430,788 B2 | 8/2016 | Stiernagle | |
| 9,451,576 B2 | 9/2016 | Lifshitz | |
| 9,489,674 B2 | 11/2016 | Faith | |
| 9,524,638 B2 | 12/2016 | Kim | |
| 9,563,194 B2 | 2/2017 | Stiernagle | |
| 9,750,439 B2 | 9/2017 | Doniger | |
| 1,016,997 A1 | 1/2019 | Wilkinson | |
| 1,036,639 A1 | 7/2019 | Wilkinson | |
| 1,037,323 A1 | 8/2019 | Walti | |
| 1,037,346 A1 | 8/2019 | Wilkinson | |
| 2001/0014868 A1 | 8/2001 | Herz | |
| 2001/0034661 A1 | 10/2001 | Ferreira | |
| 2002/0003166 A1 | 1/2002 | Miller | |
| 2002/0010000 A1 | 1/2002 | Chern | |
| 2002/0052825 A1 | 5/2002 | Bensemana | |
| 2002/0095345 A1 | 7/2002 | Panelli | |
| 2002/0128910 A1 | 9/2002 | Sakuma | |
| 2002/0152001 A1 | 10/2002 | Knipp | |
| 2002/0161664 A1 | 10/2002 | Shaya | |
| 2002/0174025 A1 | 11/2002 | Hind | |
| 2002/0178013 A1 | 11/2002 | Hoffman | |
| 2002/0194604 A1 | 12/2002 | Sanchez | |
| 2003/0004810 A1 | 1/2003 | Eldering | |
| 2003/0028424 A1 | 2/2003 | Kampff | |
| 2003/0065520 A1 | 4/2003 | Jutzi | |
| 2003/0083951 A1 | 5/2003 | Connelly | |
| 2003/0088370 A1 | 5/2003 | Bagepalli | |
| 2003/0107650 A1 | 6/2003 | Colmenarez | |
| 2003/0130897 A1 * | 7/2003 | Pickover | G06Q 10/0637 705/7.36 |
| 2003/0130908 A1 | 7/2003 | Hing | |

(56) References Cited

U.S. PATENT DOCUMENTS

| | | |
|---|---|---|
| 2003/0149693 A1 | 8/2003 | Dobler |
| 2003/0177072 A1 | 9/2003 | Bared |
| 2003/0212619 A1 | 11/2003 | Jain |
| 2004/0030531 A1 | 2/2004 | Miller |
| 2004/0064379 A1 | 4/2004 | Anderson |
| 2004/0100380 A1 | 5/2004 | Lindsay |
| 2004/0103043 A1 | 5/2004 | Reade |
| 2004/0117383 A1 | 6/2004 | Lee |
| 2004/0153442 A1 | 8/2004 | Mantz |
| 2004/0158497 A1 | 8/2004 | Brand |
| 2004/0165708 A1 | 8/2004 | White |
| 2004/0176987 A1 | 9/2004 | Dial |
| 2004/0198386 A1 | 10/2004 | Dupray |
| 2004/0225651 A1 | 11/2004 | Musgrove |
| 2005/0034161 A1 | 2/2005 | Brown |
| 2005/0049920 A1 | 3/2005 | Day |
| 2005/0159996 A1 | 7/2005 | Lazarus |
| 2005/0187021 A1 | 8/2005 | Daskalakis |
| 2005/0238465 A1 | 10/2005 | Razumov |
| 2005/0273377 A1 | 12/2005 | Ouimet |
| 2005/0283394 A1 | 12/2005 | McGloin |
| 2006/0010029 A1 | 1/2006 | Gross |
| 2006/0036485 A1 | 2/2006 | Duri |
| 2006/0055543 A1 | 3/2006 | Ganesh |
| 2006/0136293 A1 | 6/2006 | Kasravi |
| 2006/0183980 A1 | 8/2006 | Yang |
| 2006/0230053 A1 | 10/2006 | Eldering |
| 2006/0237532 A1 | 10/2006 | Scott-Leikach |
| 2006/0256008 A1 | 11/2006 | Rosenberg |
| 2006/0259360 A1 | 11/2006 | Flinn |
| 2006/0288374 A1 | 12/2006 | Ferris |
| 2007/0016488 A1 | 1/2007 | Ulenas |
| 2007/0035511 A1 | 2/2007 | Banerjee |
| 2007/0050201 A1 | 3/2007 | Gardner |
| 2007/0073553 A1 | 3/2007 | Flinn |
| 2007/0179846 A1 | 8/2007 | Jain |
| 2007/0219866 A1 | 9/2007 | Wolf |
| 2007/0244741 A1 | 10/2007 | Blume |
| 2007/0265870 A1 | 11/2007 | Song |
| 2007/0290038 A1 | 12/2007 | Woodcock |
| 2007/0294133 A1 | 12/2007 | Lasker |
| 2007/0299724 A1 | 12/2007 | Hales |
| 2008/0004995 A1 | 1/2008 | Klingenberg |
| 2008/0043013 A1 | 2/2008 | Gruttadauria |
| 2008/0052171 A1 | 2/2008 | Eldering |
| 2008/0059297 A1 | 3/2008 | Vallier |
| 2008/0065468 A1 | 3/2008 | Berg |
| 2008/0071622 A1 | 3/2008 | Walker |
| 2008/0089288 A1 | 4/2008 | Anschutz |
| 2008/0114642 A1 | 5/2008 | Goldberg |
| 2008/0208673 A1 | 8/2008 | Mebruer |
| 2008/0248815 A1 | 10/2008 | Busch |
| 2008/0288327 A1 | 11/2008 | Watarai |
| 2009/0012704 A1 | 1/2009 | Franco |
| 2009/0018996 A1 | 1/2009 | Hunt |
| 2009/0063290 A1 | 3/2009 | Mehew |
| 2009/0083121 A1 | 3/2009 | Angell |
| 2009/0094121 A1 | 4/2009 | Newhouse |
| 2009/0128325 A1 | 5/2009 | Ivanov |
| 2009/0132347 A1 | 5/2009 | Anderson |
| 2009/0164772 A1 | 6/2009 | Karkaria |
| 2009/0166375 A1 | 7/2009 | Butler |
| 2009/0171968 A1 | 7/2009 | Kane |
| 2009/0197616 A1 | 8/2009 | Lewis |
| 2009/0234712 A1* | 9/2009 | Kolawa ............... G06Q 30/02 705/14.4 |
| 2009/0271293 A1 | 10/2009 | Parkhurst |
| 2009/0303052 A1 | 12/2009 | Aklepi |
| 2010/0030578 A1 | 2/2010 | Siddique |
| 2010/0042940 A1 | 2/2010 | Monday |
| 2010/0064040 A1 | 3/2010 | Wise |
| 2010/0084463 A1 | 4/2010 | Huang |
| 2010/0133850 A1 | 6/2010 | Winkler |
| 2010/0185552 A1 | 7/2010 | Deluca |
| 2010/0198668 A1 | 8/2010 | Resnick |
| 2010/0216509 A1 | 8/2010 | Riemer |
| 2010/0293032 A1 | 11/2010 | Engelsma |
| 2010/0293569 A1 | 11/2010 | Kusumoto |
| 2011/0004588 A1 | 1/2011 | Leitersdorf |
| 2011/0022606 A1 | 1/2011 | Mason |
| 2011/0035282 A1 | 2/2011 | Spatscheck |
| 2011/0131089 A1 | 6/2011 | Walker |
| 2011/0213661 A1 | 9/2011 | Milana |
| 2011/0218859 A1 | 9/2011 | Wang |
| 2011/0225046 A1 | 9/2011 | Eldering |
| 2011/0246260 A1 | 10/2011 | Gilbert |
| 2011/0246306 A1 | 10/2011 | Blackhurst |
| 2011/0251897 A1 | 10/2011 | Litvack |
| 2011/0282476 A1 | 11/2011 | Hegemier |
| 2011/0302011 A1 | 12/2011 | Yoder |
| 2011/0316697 A1 | 12/2011 | Krahnstoever |
| 2012/0019378 A1 | 1/2012 | Watson |
| 2012/0036522 A1 | 2/2012 | Wang |
| 2012/0054018 A1 | 3/2012 | Pradeep |
| 2012/0059735 A1 | 3/2012 | Su |
| 2012/0150626 A1 | 6/2012 | Zhang |
| 2012/0166268 A1 | 6/2012 | Griffiths |
| 2012/0259732 A1 | 10/2012 | Sasankan |
| 2012/0271740 A1 | 10/2012 | Connors |
| 2012/0310715 A1 | 12/2012 | Singhal |
| 2013/0030915 A1 | 1/2013 | Statler |
| 2013/0031018 A1 | 1/2013 | Jellum |
| 2013/0066740 A1 | 3/2013 | Ouimet |
| 2013/0073389 A1 | 3/2013 | Heath |
| 2013/0080364 A1 | 3/2013 | Wilson |
| 2013/0091146 A1 | 4/2013 | Stanger |
| 2013/0106604 A1 | 5/2013 | Lee |
| 2013/0117137 A1 | 5/2013 | Klein |
| 2013/0138530 A1 | 5/2013 | Westphal |
| 2013/0138656 A1 | 5/2013 | Wheaton |
| 2013/0232221 A1 | 5/2013 | Brechner |
| 2013/0140357 A1 | 6/2013 | Ure |
| 2013/0175335 A1 | 7/2013 | Roberts |
| 2013/0176115 A1 | 7/2013 | Puleston |
| 2013/0201800 A1 | 8/2013 | Kim |
| 2013/0204737 A1 | 8/2013 | Agarwal |
| 2013/0214938 A1 | 8/2013 | Kim |
| 2013/0226539 A1 | 8/2013 | Shaw |
| 2013/0268317 A1 | 10/2013 | Mattila |
| 2013/0268335 A1 | 10/2013 | Cooper |
| 2013/0268395 A1 | 10/2013 | Sandow |
| 2013/0268886 A1 | 10/2013 | Sureshkumar |
| 2013/0275275 A1 | 10/2013 | Lemmons |
| 2013/0311324 A1 | 11/2013 | Stoll |
| 2013/0326008 A1 | 12/2013 | Morgan |
| 2013/0339122 A1 | 12/2013 | Truitt |
| 2014/0002643 A1 | 1/2014 | Aziz |
| 2014/0040038 A1 | 2/2014 | Hermanowski |
| 2014/0052562 A1 | 2/2014 | Oliveira |
| 2014/0074649 A1 | 3/2014 | Patel |
| 2014/0074743 A1 | 3/2014 | Rademaker |
| 2014/0089133 A1 | 3/2014 | Argue |
| 2014/0089134 A1 | 3/2014 | Linh |
| 2014/0108125 A1 | 4/2014 | Maraz |
| 2014/0129393 A1 | 5/2014 | Soon-Shiong |
| 2014/0156392 A1 | 6/2014 | Ouimet |
| 2014/0164046 A1 | 6/2014 | Haralambos |
| 2014/0164476 A1 | 6/2014 | Thomson |
| 2014/0180815 A1 | 6/2014 | Chatwin |
| 2014/0180953 A1 | 6/2014 | Westcott |
| 2014/0195902 A1 | 7/2014 | Yang |
| 2014/0207659 A1 | 7/2014 | Erez |
| 2014/0214543 A1 | 7/2014 | Gandhi |
| 2014/0214590 A1 | 7/2014 | Argue |
| 2014/0214600 A1 | 7/2014 | Argue |
| 2014/0214629 A1 | 7/2014 | Azam |
| 2014/0249966 A1 | 9/2014 | Zaragoza |
| 2014/0266791 A1 | 9/2014 | Lloyd |
| 2014/0278815 A1 | 9/2014 | Grant |
| 2014/0279200 A1 | 9/2014 | Hosein |
| 2014/0279202 A1 | 9/2014 | Egozi |
| 2014/0279208 A1 | 9/2014 | Nickitas |
| 2014/0279294 A1 | 9/2014 | Field-Darragh |
| 2014/0297001 A1 | 10/2014 | Silverman |

(56) References Cited

U.S. PATENT DOCUMENTS

| | | |
|---|---|---|
| 2014/0297470 A1 | 10/2014 | Ramadge |
| 2014/0304123 A1 | 10/2014 | Schwartz |
| 2014/0310040 A1 | 10/2014 | Carmichael |
| 2014/0310056 A1 | 10/2014 | Alapati |
| 2014/0316916 A1* | 10/2014 | Hay .................. G06Q 20/18 705/17 |
| 2014/0330738 A1 | 11/2014 | Falcone |
| 2014/0337151 A1 | 11/2014 | Crutchfield |
| 2014/0344102 A1* | 11/2014 | Cooper ............ G06Q 30/0631 705/26.7 |
| 2015/0006314 A1 | 1/2015 | Goulart |
| 2015/0032847 A1 | 1/2015 | Van Coppenolle |
| 2015/0058154 A1 | 2/2015 | Appleyard |
| 2015/0058175 A1 | 2/2015 | Axt |
| 2015/0081469 A1 | 3/2015 | Acharyya |
| 2015/0099589 A1 | 4/2015 | Smith |
| 2015/0106236 A1 | 4/2015 | Morris |
| 2015/0106238 A1 | 4/2015 | Shuster |
| 2015/0112807 A1 | 4/2015 | Muppirala |
| 2015/0120550 A1 | 4/2015 | Jung |
| 2015/0120600 A1 | 4/2015 | Luwang |
| 2015/0139416 A1 | 5/2015 | Skiba |
| 2015/0149443 A1 | 5/2015 | Aravamudan |
| 2015/0161706 A1 | 6/2015 | Karmakar |
| 2015/0186773 A1 | 7/2015 | Weill |
| 2015/0186981 A1 | 7/2015 | Holman |
| 2015/0190086 A1 | 7/2015 | Chan |
| 2015/0193115 A1 | 7/2015 | Chirakan |
| 2015/0206246 A1 | 7/2015 | Lange |
| 2015/0221016 A1* | 8/2015 | Schulz ............ G06Q 30/0633 705/26.7 |
| 2015/0227871 A1 | 8/2015 | Zeile |
| 2015/0227883 A1 | 8/2015 | Murphy |
| 2015/0242750 A1 | 8/2015 | Anderson |
| 2015/0254712 A1 | 9/2015 | Chen |
| 2015/0254785 A1 | 9/2015 | Yang |
| 2015/0256633 A1 | 9/2015 | Chand |
| 2015/0256899 A1 | 9/2015 | Chand |
| 2015/0262117 A1 | 9/2015 | Li |
| 2015/0262282 A1 | 9/2015 | Walti |
| 2015/0269642 A1 | 9/2015 | Cai |
| 2015/0278908 A1 | 10/2015 | Nice |
| 2015/0310536 A1 | 10/2015 | Brady |
| 2015/0324490 A1 | 11/2015 | Page |
| 2015/0324881 A1 | 11/2015 | Ouimet |
| 2015/0324882 A1 | 11/2015 | Ouimet |
| 2015/0356601 A1 | 12/2015 | Lu |
| 2015/0370985 A1 | 12/2015 | Carvalko |
| 2015/0379597 A1 | 12/2015 | Gupta |
| 2016/0005070 A1 | 1/2016 | Burr |
| 2016/0027068 A1 | 1/2016 | Brantley |
| 2016/0027094 A1 | 1/2016 | Chamyvelumani |
| 2016/0034907 A1 | 2/2016 | Worrall |
| 2016/0063440 A1 | 3/2016 | Webb |
| 2016/0063551 A1 | 3/2016 | Yankovich |
| 2016/0071116 A1 | 3/2016 | Atkins |
| 2016/0086255 A1 | 3/2016 | Sainfort |
| 2016/0092988 A1 | 3/2016 | Letourneau |
| 2016/0094703 A1 | 3/2016 | Wernevi |
| 2016/0098547 A1 | 4/2016 | Char |
| 2016/0110759 A1 | 4/2016 | Polehn |
| 2016/0140589 A1 | 5/2016 | Deshpande |
| 2016/0171424 A1 | 6/2016 | Kannan |
| 2016/0171539 A1 | 6/2016 | Ganduri |
| 2016/0171597 A1 | 6/2016 | Todeschini |
| 2016/0171866 A1 | 6/2016 | Dupasquier |
| 2016/0239857 A1 | 8/2016 | Milton |
| 2016/0253710 A1* | 9/2016 | Publicover ............ H04W 4/21 705/14.66 |
| 2016/0283979 A1 | 9/2016 | Chatterton |
| 2016/0292634 A1 | 10/2016 | Mehring |
| 2016/0292769 A1* | 10/2016 | Colson ............ G06Q 30/0631 |
| 2016/0300547 A1 | 10/2016 | El-Rukby |
| 2016/0345869 A1 | 12/2016 | Rishi |
| 2016/0350715 A1 | 12/2016 | Minvielle |
| 2016/0371650 A1 | 12/2016 | Schmidt |
| 2017/0109806 A1 | 4/2017 | Adoni |
| 2017/0180147 A1 | 6/2017 | Brandman |
| 2017/0300856 A1 | 10/2017 | Wilkinson |
| 2017/0300936 A1 | 10/2017 | Wilkinson |
| 2017/0300944 A1 | 10/2017 | Wilkinson |
| 2017/0300946 A1 | 10/2017 | Wilkinson |
| 2017/0300956 A1 | 10/2017 | Cantrell |
| 2017/0300992 A1 | 10/2017 | Wilkinson |
| 2017/0301000 A1 | 10/2017 | Morgan |
| 2017/0301001 A1 | 10/2017 | Wilkinson |
| 2017/0301002 A1 | 10/2017 | Wilkinson |
| 2017/0301008 A1 | 10/2017 | Houdek-Heis |
| 2017/0308909 A1 | 10/2017 | Faith |
| 2017/0330269 A1 | 11/2017 | Kanellos |
| 2017/0345033 A1 | 11/2017 | Wilkinson |
| 2017/0364860 A1 | 12/2017 | Wilkinson |
| 2017/0364925 A1 | 12/2017 | Wilkinson |
| 2017/0364962 A1 | 12/2017 | Wilkinson |
| 2018/0005177 A1 | 1/2018 | Wilkinson |
| 2018/0025365 A1 | 1/2018 | Wilkinson |
| 2018/0040044 A1 | 2/2018 | Mattingly |
| 2018/0047065 A1 | 2/2018 | Wildberger |
| 2018/0053240 A1 | 2/2018 | Jones |
| 2018/0060943 A1 | 3/2018 | Mattingly |
| 2018/0082252 A1 | 3/2018 | Wilkinson |
| 2018/0083908 A1 | 3/2018 | Dotan-Cohen |
| 2018/0107971 A1 | 4/2018 | Vukin |
| 2018/0108062 A1 | 4/2018 | McHale |
| 2018/0113431 A1 | 4/2018 | Wilkinson |
| 2018/0137461 A1 | 5/2018 | Wilkinson |
| 2018/0144397 A1 | 5/2018 | Wilkinson |
| 2018/0174101 A1 | 6/2018 | Mattingly |
| 2018/0174188 A1 | 6/2018 | Wilkinson |
| 2018/0174198 A1 | 6/2018 | Wilkinson |
| 2018/0174223 A1 | 6/2018 | Cantrell |
| 2018/0174224 A1 | 6/2018 | Wilkinson |
| 2018/0233014 A1 | 8/2018 | Wilkinson |
| 2018/0254096 A1 | 9/2018 | Karunanithi |
| 2018/0268357 A1 | 9/2018 | Cantrell |
| 2018/0285816 A1 | 10/2018 | Mattingly |
| 2018/0300677 A1 | 10/2018 | Wilkinson |
| 2018/0300788 A1 | 10/2018 | Mattingly |
| 2019/0005021 A1 | 1/2019 | Miller |

FOREIGN PATENT DOCUMENTS

| | | |
|---|---|---|
| CN | 203299604 | 11/2013 |
| CN | 203405712 | 1/2014 |
| CN | 203745868 | 7/2014 |
| EP | 3018591 | 5/2016 |
| JP | 2002123716 | 4/2002 |
| KR | 20120008159 | 1/2012 |
| KR | 101220581 | 1/2013 |
| KR | 20130082894 | 7/2013 |
| KR | 101595538 | 2/2016 |
| WO | 2000033228 | 6/2000 |
| WO | 2000070481 | 11/2000 |
| WO | 2000073958 | 12/2000 |
| WO | 2001011511 | 2/2001 |
| WO | 2001073651 | 10/2001 |
| WO | 2001075680 | 10/2001 |
| WO | 2002003267 | 1/2002 |
| WO | 2006006940 | 1/2006 |
| WO | 2007041275 | 4/2007 |
| WO | 2007072579 | 6/2007 |
| WO | 2011146688 A1 | 11/2011 |
| WO | 2014195902 | 12/2014 |
| WO | 2015123751 | 8/2015 |
| WO | 2015171072 | 11/2015 |
| WO | 2016018994 | 2/2016 |
| WO | 2016085827 | 6/2016 |

OTHER PUBLICATIONS

Merriam-Webster dictionary. Datasheet [online]. "bin" definition [retrieved on Apr. 2, 2019]. Retrieved from the Internet: <https://www.merriam-webster.com/dictionary/bin>.*

(56) References Cited

OTHER PUBLICATIONS

U.S. Appl. No. 15/487,538, filed Apr. 14, 2017, Bruce W. Wilkinson.
U.S. Appl. No. 15/487,760, filed Apr. 14, 2017, Starla C. Morgan.
U.S. Appl. No. 15/487,775, filed Apr. 14, 2017, Robin Houdek-Heis.
U.S. Appl. No. 15/487,792, filed Apr. 14, 2017, Robert L. Cantrell.
U.S. Appl. No. 15/487,826, filed Apr. 14, 2017, Bruce W. Wilkinson.
U.S. Appl. No. 15/487,882, filed Apr. 14, 2017, Bruce W. Wilkinson.
U.S. Appl. No. 15/487,894, filed Apr. 14, 2017, Bruce W. Wilkinson.
U.S. Appl. No. 15/488,004, filed Apr. 14, 2017, Bruce W. Wilkinson.
U.S. Appl. No. 15/488,015, filed Apr. 14, 2017, Bruce W. Wilkinson.
U.S. Appl. No. 15/488,107, filed Apr. 14, 2017, Bruce W. Wilkinson.
U.S. Appl. No. 15/606,602, filed May 26, 2017, Bruce W. Wilkinson.
U.S. Appl. No. 15/624,030, filed Jun. 15, 2017, Bruce W. Wilkinson.
U.S. Appl. No. 15/625,599, filed Jun. 16, 2017, Bruce W. Wilkinson.
U.S. Appl. No. 15/628,282, filed Jun. 20, 2017, Bruce W. Wilkinson.
U.S. Appl. No. 15/634,862, filed Jun. 27, 2017, Bruce W. Wilkinson.
"Amazon Alexa;" Wikipedia; https://web.archive.org/web/20160926125220/https://en.wikipedia.org/wiki/Amazon_Alexa; Sep. 26, 2016; pp. 1-4.
"Amazon Dash Buttons;" Amazon; https://web.archive.org/web/20160623172354/https://www.amazon.com/Dash-Buttons/b?ie=UTF8&node=10667898011; Jun. 23, 2016; pp. 1-8.
"Amazon Dash;" Wikipedia; https://web.archive.org/web/20160310021300/https://en.wikipedia.org/wiki/Amazon_Dash; Mar. 10, 2016; pp. 1-2.
"Amazon Echo;" Amazon; https://web.archive.org/web/20160602024155/https://www.amazon.com/Amazon-Echo-Bluetooth-Speaker-with-WiFi-Alexa/dp/B00X4WHP5E; Jun. 2, 2016; pp. 1-10.
"Intelligent Online Shopping Cart Which Can Automatically Pre-Load a Shopping List;" Prior Art Database; http://priorart.ip.com/IPCOM/00236206; Apr. 11, 2016, pp. 1-11.
Cognizant; "Omnichannel Retailing | The Ditial Sotre of the Future | Cognizant;" http://www.youtube.com/watch?v=CRaiadNn_nw; published on Sep. 1, 2015; pp. 1-5.
Igodigital; "iGoDigital: Creating a Personalized Multi-Channel Shopping Experience with Product Recommendations;" http://www.youtube.com/watch?v=Zvnd4RLnV5I; published on Aug. 15, 2012; pp. 1-4.
Karim, Shah; "Seven Retail Megatrends for 2020;" Chain Store Age; http://www.chainstoreage.com/article/seven-retail-megatrends-2020; Feb. 22, 2015; pp. 1-3.
Kelso, Alicia; "Pizza Hut Serves Up Custom Pies on Interactive Tabletops;" Kiosk Marketplace; http://www.kioskmarketplace.com/articles/pizzahutservessupcustompiesoninteractivetabletops/; Jun. 28, 2016, pp. 1-2.
Kiosk"Vending Kiosk Software;" Kiosk Information Systems; http://kiosk.com/market-solutions/vending-rental; Jun. 28m 2016; pp. 1-8.
Kohan, Shelley E.; "5 Retail Trends for 2015;" RetailNext; https://retailnext.net/en/blog/retail-trends-2015/; Feb. 24, 2015; pp. 1-4.
Kohn, David, et al.; A New Social Proof Application for Online Retailers that Drives Conversions; Barilliance; http://www.barilliance.com/social-proof-application-for-ecommerce-sites/; 2015; retrieved Feb. 17, 2016; pp. 1-6.
Neo4J; "Walmart uses Neo4j to optimize customer experience with personal recommendations"; http://info.neo4j.com/rs/neotechnology/images/neo4j-casestudy-walmart.pdf; available at least as early as Mar. 29, 2016; pp. 1-2.
U.S. Appl. No. 15/655,339, filed Jul. 20, 2017, Bruce W. Wilkinson.
U.S. Appl. No. 15/669,546, filed Aug. 4, 2017, Todd D. Mattingly.
U.S. Appl. No. 15/678,608, filed Aug. 16, 2017, Nicholaus A. Jones.
U.S. Appl. No. 15/685,981, filed Aug. 24, 2017, Todd D. Mattingly.
U.S. Appl. No. 15/704,878, filed Sep. 14, 2017, Bruce W. Wilkinson.
U.S. Appl. No. 15/782,509, filed Oct. 12, 2017, Greg N. Vukin.
U.S. Appl. No. 15/782,555, filed Oct. 12, 2017, Todd D. Mattingly.
U.S. Appl. No. 15/782,559, filed Oct. 12, 2017, Bruce W. Wilkinson.
U.S. Appl. No. 15/783,551, filed Oct. 13, 2017, Bruce W. Wilkinson.
U.S. Appl. No. 15/783,645, filed Oct. 13, 2017, Bruce W. Wilkinson.
U.S. Appl. No. 15/783,668, filed Oct. 13, 2017, Brian G. McHale.
U.S. Appl. No. 15/783,787, filed Oct. 13, 2017, Robert L. Cantrell.
U.S. Appl. No. 15/783,825, filed Oct. 13, 2017, Bruce W. Wilkinson.
U.S. Appl. No. 15/783,929, filed Oct. 13, 2017, Bruce W. Wilkinson.
U.S. Appl. No. 15/783,960, filed Oct. 13, 2017, Bruce W. Wilkinson.
Khan, Sal; "The dot product"; https://www.khanacademy.org/science/physics/magnetic-forces-and-magnetic-fields/electric-motors/v/the-dot-product; uploaded on Aug. 8, 2008, pp. 1-10.
PCT; App. No. PCT/US17/27584; International Search Report and Written Opinion dated Sep. 5, 2017; pp. 1-24.
U.S. Appl. No. 15/921,540, filed Mar. 14, 2018, Robert L. Cantrell.
U.S. Appl. No. 15/939,788, filed Mar. 29, 2018, Todd D. Mattingly.
U.S. Appl. No. 15/947,380, filed Apr. 6, 2018, Bruce W. Wilkinson.
U.S. Appl. No. 15/952,494, filed Apr. 13, 2018, Bruce W. Wilkinson
U.S. Appl. No. 15/953,113, filed Apr. 13, 2018, Todd D. Mattingly.
Anagnostopoulos, Aris, et al.; "The Importance of Being Expert: Efficient Max-Finding in Crowdsourcing"; SIGMOD'15; ACM; May 31-Jun. 4, 2015; pp. 983-998.
Aung, Myo Min, et al.; "Quality Monitoring and Dynamic Pricing in Cold Chain Management"; World Academy of Science, Engineering and Technology International Journal of Mechanical, Aerospace, Industrial, Mechatronic and Manufacturing Engineering; vol. 6, No. 2; published 2012; pp. 454-458.
Bergen, Jennifer; "Korea's Tesco reinvents grocery shopping with QR-code 'stores'"; https://www.geek.com/mobile/koreas-tesco-reinvents-grocery-shopping-with-qr-code-stores-1396025/; Jun. 28, 2011; pp. 1-8.
Bid and Barter; "Bid and Barter"; http://www.bidandbarter.com/about.html; Retrieved on Nov. 24, 2016; pp. 1-2.
Borowski, Craig; "6 Tips to Shift from Reactive to Proactive Customer Service"; https://www.softwareadvice.com/resources/6-tips-shift-reactive-proactive-customer-service/; Retrieved on Nov. 22, 2016; pp. 1-9.
E-Thele SQD Networks; "360 degree retail surveillance & loss prevention video", https://www.youtube.com/watch?v=NgELfYPnMvQ, published on Jul. 29, 2013, pp. 1-5.
Erlibird; "Recommendation System that Uses Big Data to Help People Find Gifts for their Facebook Friends"; https://erlibird.com/go/giftri-com; retrieved on May 30, 2016; pp. 1-4.
Ernst & Young LLP and the Retailers Association of India; "Movement of Goods in India"; rasci.in/downloads/2013/Movement_Goods_India.pdf; published on Dec. 5, 2013; pp. 1-28.
Giering, Michael; "Retail Sales Prediction and Item Recommendations Using Customer Demographics at Store Level"; ACM SIGKDD Explorations Newsletter; vol. 10, Issue 2, Dec. 2008; pp. 84-89.
He, Jianming et al.; "A Social Network-Based Recommender System (SNRS)"; Annals of Information Systems book series; vol. 12; May 20, 2010; pp. 47-74.
Hewlett-Packard; "HP C350B 8 GB USB Pen Drive With 1 Year Norton"; Amazon.com, http://www.amazon.in/HP-C350B-DRIVE-NORTON-ANTIVIRUS/dp/B00GZHE9KO; retrieved on Apr. 18, 2016, pp. 1-5.
Home Chef; "Home Chef Meal Delivery Service, Fresh Ingredients to Cook at Home"; https://web.archive.org/web/20160705144946/https://www.homechef.com/; available at least as early as Jul. 5, 2016; pp. 1-4.
Jakkula, V. et al.; "Detecting Anomalous Sensor Events in Smart Home Data for Enhancing the Living Experience"; Proceedings AAAIWS'11-07 Proceedings of the 7th AAAI Conference on Artificial Intelligence and Smarter Living: The Conquest of Complexity; 2011; pp. 33-37.
Jank, Wolfgang, et al.; "Understanding Geographical Markets of Online Firms Using Spatial Models of Customer Choice"; Marketing Science; vol. 24, No. 4; Fall 2005; pp. 623-634.
Keng, Brian; "Beyond Collaborative Filtering (Part 1)"; http://rubikloud.com/labs/data-science/beyond-collaborative-filtering/; May 18, 2016; pp. 1-5.
Listonic SP. Z O.O.; "Smart Shopping List—Listonic"; https://play.google.com/store/apps/details?id=com.I; Retrieved on Nov. 24, 2016; pp. 1-3.
Maras, Elliot; "RFID: A Tool for Tracking Products, Assets and More"; http://www.foodlogistics.com/article/12141721/rfid-a-tool-for-tracking-products-assets-and-more; Dec. 17, 2015; pp. 1-9.

(56) References Cited

OTHER PUBLICATIONS

Mathisfun; "Dot Product"; https://web.archive.org/web/20140320190422/https://www.mathsisfun.com/algebra/vectors-dot-product.html; available at least as early as Mar. 20, 2014; pp. 1-5.
Mcdonald, Heath; "Who are "innovators" and do they matter?"; Marketing Intelligence & Planning; vol. 25, No. 5; 2007; pp. 1-18.
Menczer, Filippo, et al.; "Adaptive Assistants for Customized E-Shopping;" IEEE Intelligent Systems; vol. 17, Issue 6; Nov./Dec. 2002; https://www.computer.org/csdl/mags/ex/2002/06/x6012-abs.html; pp. 12-19.
Miles, Stephanie; "8 Tools for the In-Store Delivery of Mobile Coupons"; http://streetfightmag.com/2013/07/30/8-tools-for-the-in-store-delivery-of-mobile-coupons-2/; Jul. 30, 2013; pp. 1-6.
Organizy Ltd.; "Organizy Grocery Shopping List"; https://play.google.com/store/apps/details?id=com.organizy.shopping.list; Retrieved on Nov. 24, 2016; pp. 1-3.
Prassas, George, et al.; "Dynamic Recommendations in Internet Retailing"; Global Co-Operation in the New Millennium: The 9th European Conference on Information Systems; Athens University of Economics and Business; Jun. 27-29, 2001; pp. 368-379.
Shoukas, Denise; "The Future of Food Shopping is Here"; https://www.specialtyfood.com/news/article/future-food-shopping-here/; Jun. 24, 2013; pp. 1-8.
study.com; "Classes of Adopters: Innovators, Early, Late and Laggards"; http://study.com/academy/lesson/classes-of-adopters-innovators-early-late-and-laggards.html; retrieved on Oct. 13, 2016; pp. 1-4.
Tan, Soo-Jiuan; "Predicting Innovation Adoption: a Choice-Based Approach"; In AP—Asia Pacific Advances in Consumer Research; vol. 1; National University of Singapore; 1994; pp. 72-78.
Uhler, David, et al.; "Mobile Computing, Applications, and Services"; Lecture Notes of the Institute for Computer Science, Social Informatics and Telecommunications Engineering; Feb. 5, 2013; pp. 380.
Vasal, Ityam; "Gift Recommender System for Amazon;" 583 Term Paper; retrieved on May 30, 2016; pp. 1-9.
Vendhq; "Retail Trends and Predictions 2016"; https://www.vendhq.com/us/university/retail-trends-and-predictions-2016; available at least as early as 2016; pp. 1-19.
Wikipedia; "Dot Product"; https://web.archive.org/web/20140815031517/https://en.wikipedia.org/wiki/Dot_product; available at least as early as Aug. 15, 2014; pp. 1-8.
Wylie, Jonathan; "How to Read QR Codes With a Smartphone"; https://www.pcworld.com/article/242873/how_to_read_qr_codes_with_a_smartphone.html; Nov. 1, 2011; pp. 1-3.
Yin, J. et al; "Sensor-Based Abnormal Human-Activity Detection"; IEEE Transactions on Knowledge and Data Engineering; vol. 20, Issue: 8; Jun. 27, 2008; pp. 1-25.
Zhu, Wei, et al.; "Personalized In-Store E-Commerce with the PromoPad: An Augmented Reality Shopping Assistant"; https://www.researchgate.net/publication/228786852_Personalized_In-store_E-Commerce_with_the_PromoPad_an_Augmented_Reality_Shopping_Assistant; Jan. 2004; pp. 1-19.
Cognizant; "Omnichannel—Overview"; https://www.cognizant.com/omnichannel; Available at least as early as Aug. 30, 2019; pp. 1-4.
Mamabouchey; "chloe"; https://www.youtube.com/watch?v=ja17TZ5kYZ4; published Sep. 16, 2015; pp. 1-4.
Mills, Kelly-Ann; "Chatty robots who help with your shopping and recognise faces of regular customers rolled out in Russian supermarkets"; https://www.mirror.co.uk/news/world-news/chatty-robots-who-help-your-11566357; Nov. 22, 2017; pp. 1-18.
Retail Touchpoints; "Zara to Deploy Click-And-Collect Robots in Stores"; https://www.retailtouchpoints.com/topics/store-operations/zara-to-deploy-click-and-collect-robots-in-stores; Mar. 7, 2018; pp. 1-2.
USPTO; U.S. Appl. No. 15/488,004; Office Action dated Sep. 17, 2019; (pp. 1-22).
Vasile, Flavian et al., "Meta-Prod2Vec—Product Embeddings Using Side-Information for Recommendation", published in "RecSys 2016—Proceedings of the 10th ACM Conference on Recommender Systems", pp. 225-232, Association for Computing Machinery, Inc. (Year: 2016).

\* cited by examiner

SYSTEMS AND METHODS FOR FACILITATING SHOPPING IN A PHYSICAL RETAIL FACILITY

CROSS-REFERENCE TO RELATED APPLICATION

This application claims the benefit of each of the following U.S. Provisional applications, each of which is incorporated herein by reference in its entirety: 62/323,026 filed Apr. 15, 2016; 62/348,444 filed Jun. 10, 2016; 62/436,842 filed Dec. 20, 2016; 62/485,045, filed Apr. 13, 2017; 62/356,375, filed Jun. 29, 2016; 62/356,374, filed Jun. 29, 2016; 62/402,068, filed Sep. 30, 2016; and 62/413,487, filed Oct. 27, 2016.

TECHNICAL FIELD

These teachings relate generally to providing products and services to individuals.

BACKGROUND

Various shopping paradigms are known in the art. One approach of long-standing use essentially comprises displaying a variety of different goods at a shared physical location and allowing consumers to view/experience those offerings as they wish to thereby make their purchasing selections. This model is being increasingly challenged due at least in part to the logistical and temporal inefficiencies that accompany this approach and also because this approach does not assure that a product best suited to a particular consumer will in fact be available for that consumer to purchase at the time of their visit.

Increasing efforts are being made to present a given consumer with one or more purchasing options that are selected based upon some preference of the consumer. Existing preference-based approaches leave much to be desired. Information regarding preferences, for example, may tend to be very product specific and accordingly may have little value apart from use with a very specific product or product category. As a result, while helpful, a preferences-based approach is inherently very limited in scope and offers only a very weak platform by which to assess a wide variety of product and service categories.

BRIEF DESCRIPTION OF THE DRAWINGS

Disclosed herein are embodiments of systems, apparatuses and methods pertaining to systems and methods for facilitating shopping in a physical retail facility. This description includes drawings, wherein.

Figure 1:
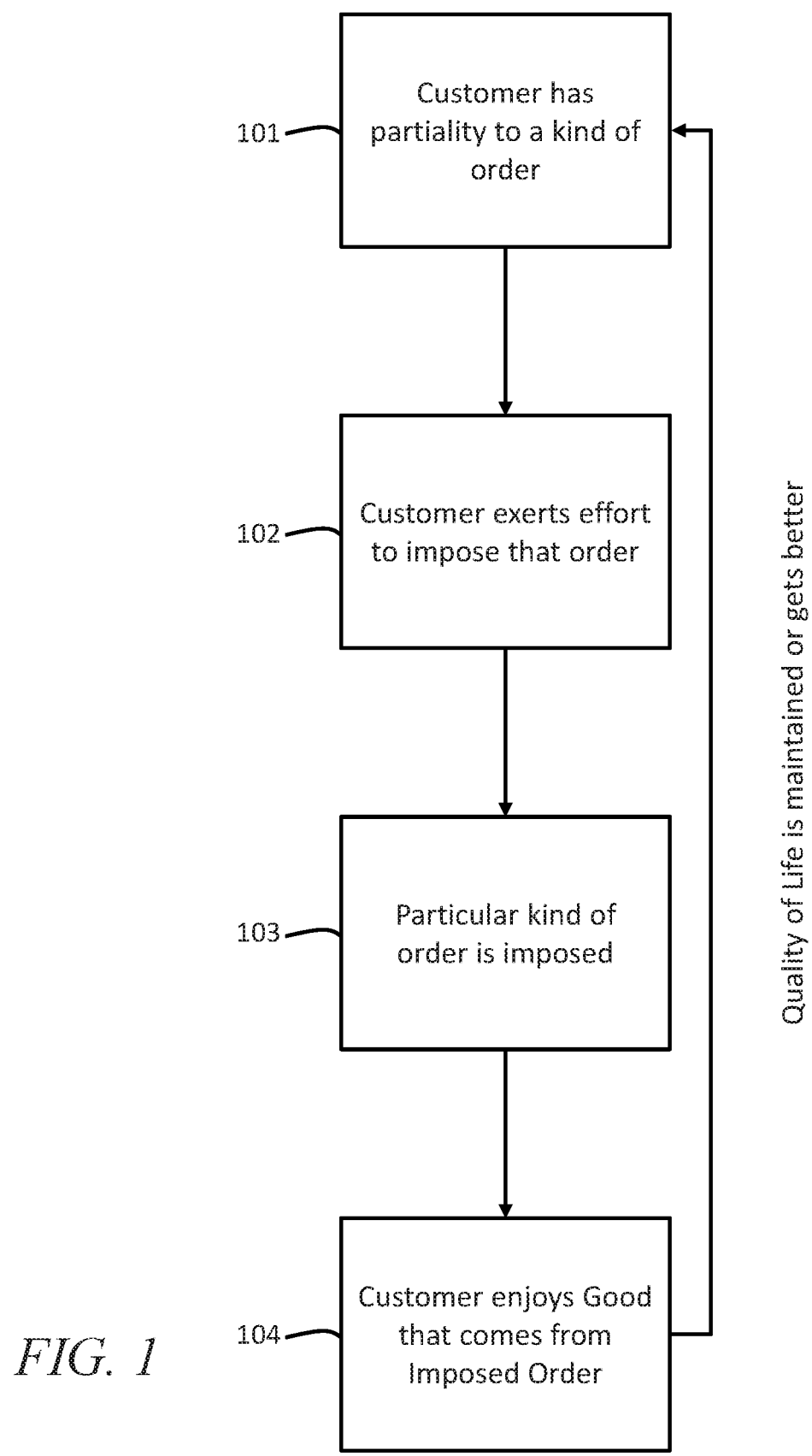
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, many of these embodiments provide for a memory having information stored therein that includes partiality information for each of a plurality of persons in the form of a plurality of partiality vectors for each of the persons wherein each partiality vector has at least one of a magnitude and an angle that corresponds to a magnitude of the person's belief in an amount of good that comes from an order associated with that partiality. This memory can also contain vectorized characterizations for each of a plurality of products, wherein each of the vectorized characterizations includes a measure regarding an extent to which a corresponding one of the products accords with a corresponding one of the plurality of partiality vectors.

Rules can then be provided that use the aforementioned information in support of a wide variety of activities and results. Although the described vector-based approaches bear little resemblance (if any) (conceptually or in practice) to prior approaches to understanding and/or metricizing a given person's product/service requirements, these approaches yield numerous benefits including, at least in some cases, reduced memory requirements, an ability to accommodate (both initially and dynamically over time) an essentially endless number and variety of partialities and/or product attributes, and processing/comparison capabilities that greatly ease computational resource requirements and/or greatly reduced time-to-solution results.

People tend to be partial to ordering various aspects of their lives, which is to say, people are partial to having things well arranged per their own personal view of how things should be. As a result, anything that contributes to the proper ordering of things regarding which a person has partialities represents value to that person. Quite literally, improving order reduces entropy for the corresponding person (i.e., a reduction in the measure of disorder present in that particular aspect of that person's life) and that improvement in order/reduction in disorder is typically viewed with favor by the affected person.

Generally speaking a value proposition must be coherent (logically sound) and have "force." Here, force takes the form of an imperative. When the parties to the imperative have a reputation of being trustworthy and the value proposition is perceived to yield a good outcome, then the imperative becomes anchored in the center of a belief that "this is something that I must do because the results will be good for me." With the imperative so anchored, the corresponding material space can be viewed as conforming to the order specified in the proposition that will result in the good outcome.

Pursuant to these teachings a belief in the good that comes from imposing a certain order takes the form of a value proposition. It is a set of coherent logical propositions by a trusted source that, when taken together, coalesce to form an imperative that a person has a personal obligation to order their lives because it will return a good outcome which improves their quality of life. This imperative is a value force that exerts the physical force (effort) to impose the desired order. The inertial effects come from the strength of the belief. The strength of the belief comes from the force of the value argument (proposition). And the force of the value proposition is a function of the perceived good and trust in the source that convinced the person's belief system to order material space accordingly. A belief remains constant until acted upon by a new force of a trusted value argument. This is at least a significant reason why the routine in people's lives remains relatively constant.

Newton's three laws of motion have a very strong bearing on the present teachings. Stated summarily, Newton's first law holds that an object either remains at rest or continues to move at a constant velocity unless acted upon by a force, the second law holds that the vector sum of the forces F on an object equal the mass m of that object multiplied by the acceleration a of the object (i.e., F=ma), and the third law holds that when one body exerts a force on a second body, the second body simultaneously exerts a force equal in magnitude and opposite in direction on the first body.

Relevant to both the present teachings and Newton's first law, beliefs can be viewed as having inertia. In particular, once a person believes that a particular order is good, they tend to persist in maintaining that belief and resist moving away from that belief. The stronger that belief the more force an argument and/or fact will need to move that person away from that belief to a new belief.

Relevant to both the present teachings and Newton's second law, the "force" of a coherent argument can be viewed as equaling the "mass" which is the perceived Newtonian effort to impose the order that achieves the aforementioned belief in the good which an imposed order brings multiplied by the change in the belief of the good which comes from the imposition of that order. Consider that when a change in the value of a particular order is observed then there must have been a compelling value claim influencing that change. There is a proportionality in that the greater the change the stronger the value argument. If a person values a particular activity and is very diligent to do that activity even when facing great opposition, we say they are dedicated, passionate, and so forth. If they stop doing the activity, it begs the question, what made them stop? The answer to that question needs to carry enough force to account for the change.

And relevant to both the present teachings and Newton's third law, for every effort to impose good order there is an equal and opposite good reaction.

FIG. 1 provides a simple illustrative example in these regards. At block 101 it is understood that a particular person has a partiality (to a greater or lesser extent) to a particular kind of order. At block 102 that person willingly exerts effort to impose that order to thereby, at block 103, achieve an arrangement to which they are partial. And at block 104, this person appreciates the "good" that comes from successfully imposing the order to which they are partial, in effect establishing a positive feedback loop.

Figure 2:
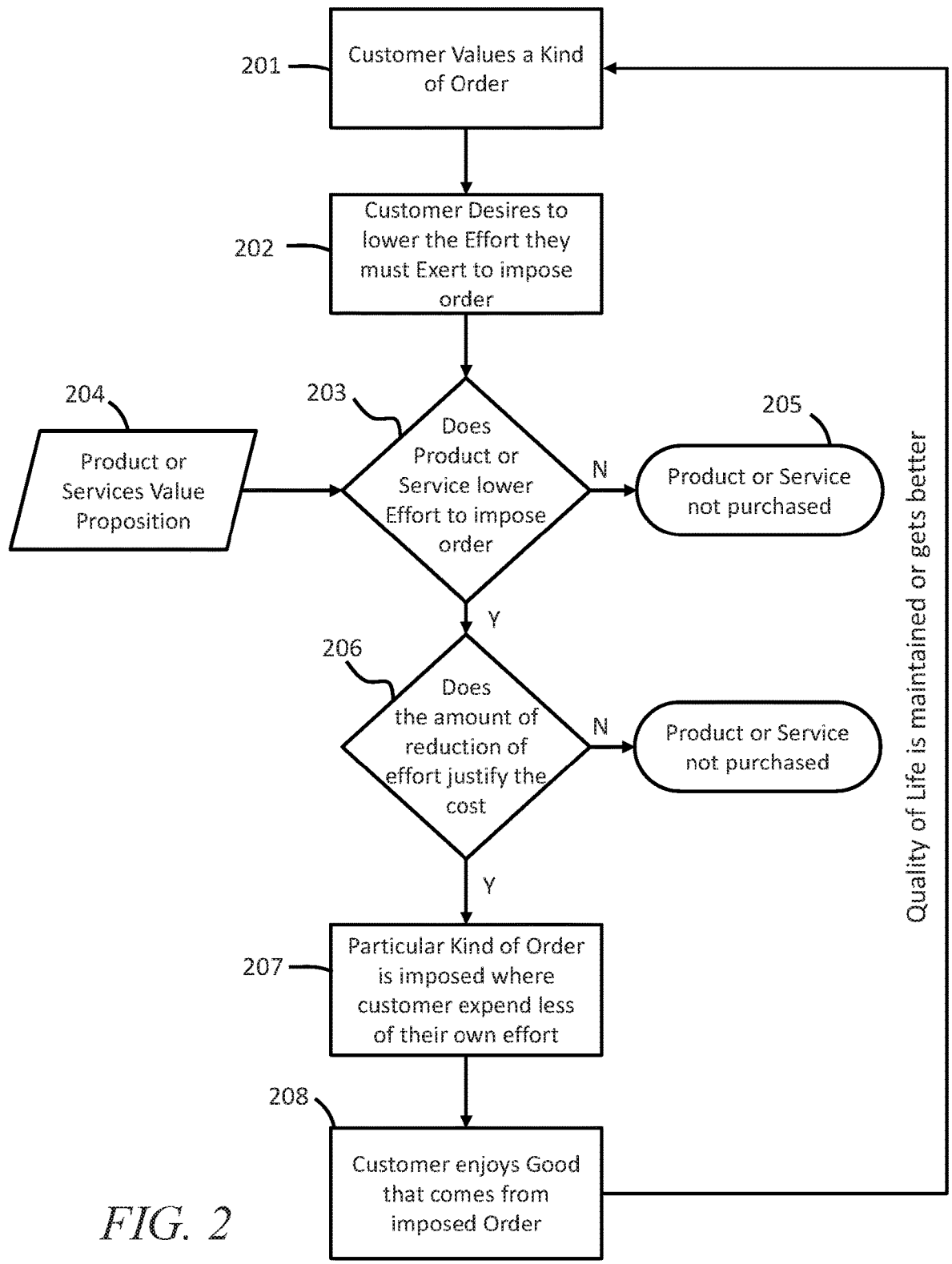
FIG. 2 comprises a flow diagram as configured in accordance with various embodiments of these teachings.

Understanding these partialities to particular kinds of order can be helpful to understanding how receptive a particular person may be to purchasing a given product or service. FIG. 2 provides a simple illustrative example in these regards. At block 201 it is understood that a particular person values a particular kind of order. At block 202 it is understood (or at least presumed) that this person wishes to lower the effort (or is at least receptive to lowering the effort) that they must personally exert to impose that order. At decision block 203 (and with access to information 204 regarding relevant products and or services) a determination can be made whether a particular product or service lowers the effort required by this person to impose the desired order. When such is not the case, it can be concluded that the person will not likely purchase such a product/service 205 (presuming better choices are available).

When the product or service does lower the effort required to impose the desired order, however, at block 206 a determination can be made as to whether the amount of the reduction of effort justifies the cost of purchasing and/or using the proffered product/service. If the cost does not justify the reduction of effort, it can again be concluded that the person will not likely purchase such a product/service 205. When the reduction of effort does justify the cost, however, this person may be presumed to want to purchase the product/service and thereby achieve the desired order (or at least an improvement with respect to that order) with less expenditure of their own personal effort (block 207) and thereby achieve, at block 208, corresponding enjoyment or appreciation of that result.

To facilitate such an analysis, the applicant has determined that factors pertaining to a person's partialities can be quantified and otherwise represented as corresponding vectors (where "vector" will be understood to refer to a geometric object/quantity having both an angle and a length/magnitude). These teachings will accommodate a variety of differing bases for such partialities including, for example, a person's values, affinities, aspirations, and preferences.

A value is a person's principle or standard of behavior, their judgment of what is important in life. A person's values represent their ethics, moral code, or morals and not a mere unprincipled liking or disliking of something. A person's value might be a belief in kind treatment of animals, a belief in cleanliness, a belief in the importance of personal care, and so forth.

An affinity is an attraction (or even a feeling of kinship) to a particular thing or activity. Examples including such a feeling towards a participatory sport such as golf or a spectator sport (including perhaps especially a particular team such as a particular professional or college football team), a hobby (such as quilting, model railroading, and so forth), one or more components of popular culture (such as a particular movie or television series, a genre of music or a particular musical performance group, or a given celebrity, for example), and so forth.

"Aspirations" refer to longer-range goals that require months or even years to reasonably achieve. As used herein "aspirations" does not include mere short term goals (such as making a particular meal tonight or driving to the store and back without a vehicular incident). The aspired-to goals, in turn, are goals pertaining to a marked elevation in one's core competencies (such as an aspiration to master a particular game such as chess, to achieve a particular articulated and recognized level of martial arts proficiency, or to attain a particular articulated and recognized level of cooking proficiency), professional status (such as an aspiration to receive a particular advanced education degree, to pass a professional examination such as a state Bar examination of a Certified Public Accountants examination, or to become Board certified in a particular area of medical practice), or life experience milestone (such as an aspiration to climb Mount Everest, to visit every state capital, or to attend a game at every major league baseball park in the United States). It will further be understood that the goal(s) of an aspiration is not something that can likely merely simply happen of its own accord; achieving an aspiration requires an intelligent effort to order one's life in a way that increases the likelihood of actually achieving the corresponding goal or goals to which that person aspires. One aspires to one day run their own business as versus, for example, merely hoping to one day win the state lottery.

A preference is a greater liking for one alternative over another or others. A person can prefer, for example, that their steak is cooked "medium" rather than other alternatives such as "rare" or "well done" or a person can prefer to play golf in the morning rather than in the afternoon or evening. Preferences can and do come into play when a given person makes purchasing decisions at a retail shopping facility. Preferences in these regards can take the form of a preference for a particular brand over other available brands or a preference for economy-sized packaging as versus, say, individual serving-sized packaging.

Values, affinities, aspirations, and preferences are not necessarily wholly unrelated. It is possible for a person's values, affinities, or aspirations to influence or even dictate their preferences in specific regards. For example, a person's moral code that values non-exploitive treatment of animals may lead them to prefer foods that include no animal-based ingredients and hence to prefer fruits and vegetables over beef and chicken offerings. As another example, a person's affinity for a particular musical group may lead them to prefer clothing that directly or indirectly references or otherwise represents their affinity for that group. As yet another example, a person's aspirations to become a Certified Public Accountant may lead them to prefer business-related media content.

While a value, affinity, or aspiration may give rise to or otherwise influence one or more corresponding preferences, however, is not to say that these things are all one and the same; they are not. For example, a preference may represent either a principled or an unprincipled liking for one thing over another, while a value is the principle itself. Accordingly, as used herein it will be understood that a partiality can include, in context, any one or more of a value-based, affinity-based, aspiration-based, and/or preference-based partiality unless one or more such features is specifically excluded per the needs of a given application setting.

Information regarding a given person's partialities can be acquired using any one or more of a variety of information-gathering and/or analytical approaches. By one simple approach, a person may voluntarily disclose information regarding their partialities (for example, in response to an online questionnaire or survey or as part of their social media presence). By another approach, the purchasing history for a given person can be analyzed to intuit the partialities that led to at least some of those purchases. By yet another approach demographic information regarding a particular person can serve as yet another source that sheds light on their partialities. Other ways that people reveal how they order their lives include but are not limited to: (1) their social networking profiles and behaviors (such as the things they "like" via Facebook, the images they post via Pinterest, informal and formal comments they initiate or otherwise provide in response to third-party postings including statements regarding their own personal long-term goals, the persons/topics they follow via Twitter, the photographs they publish via Picasso, and so forth); (2) their Internet surfing history; (3) their on-line or otherwise-published affinity-based memberships; (4) real-time (or delayed) information (such as steps walked, calories burned, geographic location, activities experienced, and so forth) from any of a variety of personal sensors (such as smart phones, tablet/pad-styled computers, fitness wearables, Global Positioning System devices, and so forth) and the so-called Internet of Things (such as smart refrigerators and pantries, entertainment and information platforms, exercise and sporting equipment, and so forth); (5) instructions, selections, and other inputs (including inputs that occur within augmented-reality user environments) made by a person via any of a variety of interactive interfaces (such as keyboards and cursor control devices, voice recognition, gesture-based controls, and eye tracking-based controls), and so forth.

The present teachings employ a vector-based approach to facilitate characterizing, representing, understanding, and leveraging such partialities to thereby identify products (and/or services) that will, for a particular corresponding consumer, provide for an improved or at least a favorable corresponding ordering for that consumer. Vectors are directed quantities that each have both a magnitude and a direction. Per the applicant's approach these vectors have a real, as versus a metaphorical, meaning in the sense of Newtonian physics. Generally speaking, each vector represents order imposed upon material space-time by a particular partiality.

Figure 3:
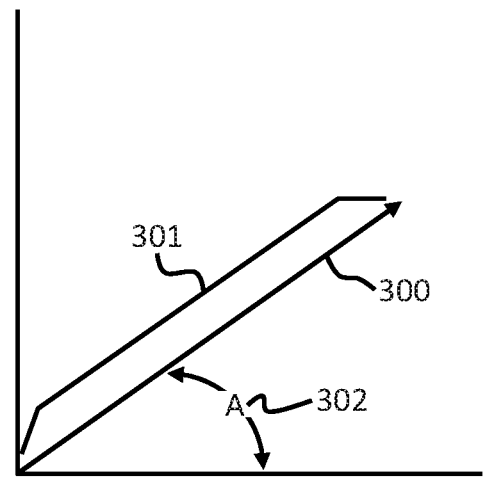
FIG. 3 comprises a graphic representation as configured in accordance with various embodiments of these teachings.

FIG. 3 provides some illustrative examples in these regards. By one approach the vector 300 has a corresponding magnitude 301 (i.e., length) that represents the magnitude of the strength of the belief in the good that comes from that imposed order (which belief, in turn, can be a function, relatively speaking, of the extent to which the order for this particular partiality is enabled and/or achieved). In this case, the greater the magnitude 301, the greater the strength of that belief and vice versa. Per another example, the vector 300 has a corresponding angle A 302 that instead represents the foregoing magnitude of the strength of the belief (and where, for example, an angle of 0° represents no such belief and an angle of 90° represents a highest magnitude in these regards, with other ranges being possible as desired).

Accordingly, a vector serving as a partiality vector can have at least one of a magnitude and an angle that corresponds to a magnitude of a particular person's belief in an amount of good that comes from an order associated with a particular partiality.

Applying force to displace an object with mass in the direction of a certain partiality-based order creates worth for a person who has that partiality. The resultant work (i.e., that force multiplied by the distance the object moves) can be viewed as a worth vector having a magnitude equal to the accomplished work and having a direction that represents the corresponding imposed order. If the resultant displacement results in more order of the kind that the person is partial to then the net result is a notion of "good." This "good" is a real quantity that exists in meta-physical space much like work is a real quantity in material space. The link between the "good" in meta-physical space and the work in material space is that it takes work to impose order that has value.

In the context of a person, this effort can represent, quite literally, the effort that the person is willing to exert to be compliant with (or to otherwise serve) this particular partiality. For example, a person who values animal rights would have a large magnitude worth vector for this value if they exerted considerable physical effort towards this cause by, for example, volunteering at animal shelters or by attending protests of animal cruelty.

While these teachings will readily employ a direct measurement of effort such as work done or time spent, these teachings will also accommodate using an indirect measurement of effort such as expense; in particular, money. In many cases people trade their direct labor for payment. The labor may be manual or intellectual. While salaries and payments can vary significantly from one person to another, a same sense of effort applies at least in a relative sense.

As a very specific example in these regards, there are wristwatches that require a skilled craftsman over a year to make. The actual aggregated amount of force applied to displace the small components that comprise the wristwatch would be relatively very small. That said, the skilled craftsman acquired the necessary skill to so assemble the wristwatch over many years of applying force to displace thousands of little parts when assembly previous wristwatches. That experience, based upon a much larger aggregation of previously-exerted effort, represents a genuine part of the "effort" to make this particular wristwatch and hence is fairly considered as part of the wristwatch's worth.

The conventional forces working in each person's mind are typically more-or-less constantly evaluating the value propositions that correspond to a path of least effort to thereby order their lives towards the things they value. A key reason that happens is because the actual ordering occurs in material space and people must exert real energy in pursuit of their desired ordering. People therefore naturally try to find the path with the least real energy expended that still moves them to the valued order. Accordingly, a trusted value proposition that offers a reduction of real energy will be embraced as being "good" because people will tend to be partial to anything that lowers the real energy they are required to exert while remaining consistent with their partialities.

Figure 4:
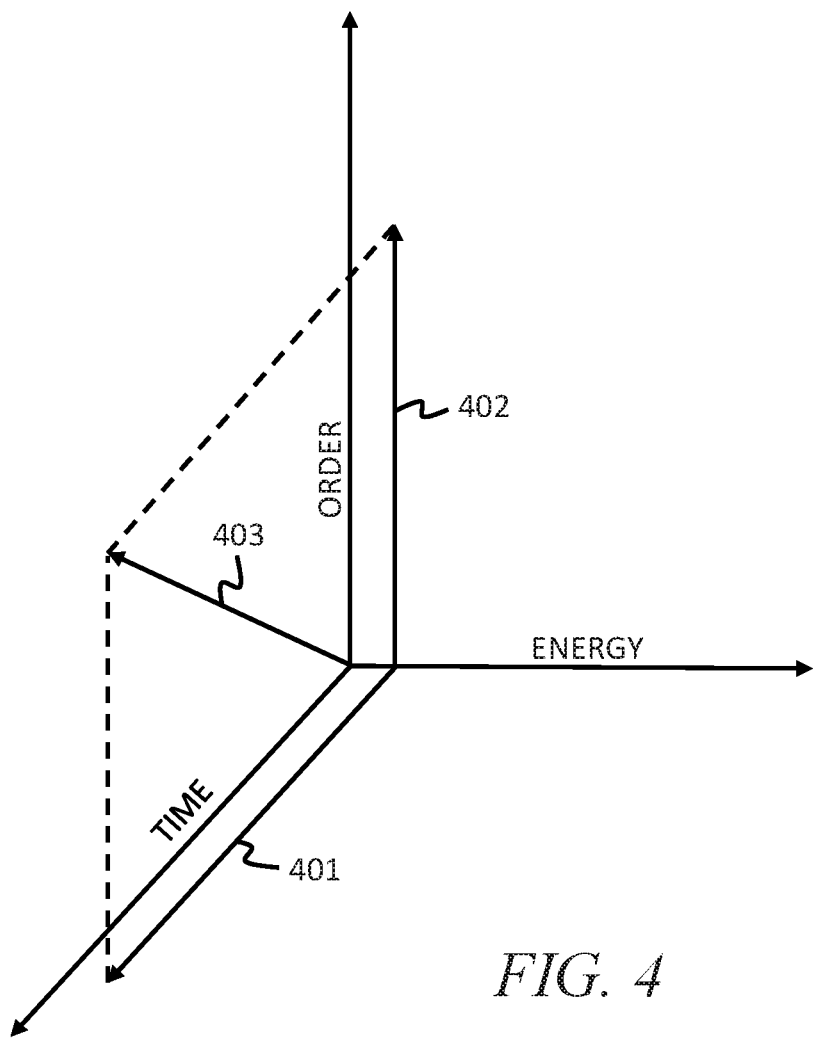
FIG. 4 comprises a graph as configured in accordance with various embodiments of these teachings.

FIG. 4 presents a space graph that illustrates many of the foregoing points. A first vector 401 represents the time required to make such a wristwatch while a second vector 402 represents the order associated with such a device (in this case, that order essentially represents the skill of the craftsman). These two vectors 401 and 402 in turn sum to form a third vector 403 that constitutes a value vector for this wristwatch. This value vector 403, in turn, is offset with respect to energy (i.e., the energy associated with manufacturing the wristwatch).

A person partial to precision and/or to physically presenting an appearance of success and status (and who presumably has the wherewithal) may, in turn, be willing to spend $100,000 for such a wristwatch. A person able to afford such a price, of course, may themselves be skilled at imposing a certain kind of order that other persons are partial to such that the amount of physical work represented by each spent dollar is small relative to an amount of dollars they receive when exercising their skill(s). (Viewed another way, wearing an expensive wristwatch may lower the effort required for such a person to communicate that their own personal success comes from being highly skilled in a certain order of high worth.)

Generally speaking, all worth comes from imposing order on the material space-time. The worth of a particular order generally increases as the skill required to impose the order increases. Accordingly, unskilled labor may exchange $10 for every hour worked where the work has a high content of unskilled physical labor while a highly-skilled data scientist may exchange $75 for every hour worked with very little accompanying physical effort.

Consider a simple example where both of these laborers are partial to a well-ordered lawn and both have a corresponding partiality vector in those regards with a same magnitude. To observe that partiality the unskilled laborer may own an inexpensive push power lawn mower that this person utilizes for an hour to mow their lawn. The data scientist, on the other hand, pays someone else $75 in this example to mow their lawn. In both cases these two individuals traded one hour of worth creation to gain the same worth (to them) in the form of a well-ordered lawn; the unskilled laborer in the form of direct physical labor and the data scientist in the form of money that required one hour of their specialized effort to earn.

This same vector-based approach can also represent various products and services. This is because products and services have worth (or not) because they can remove effort (or fail to remove effort) out of the customer's life in the direction of the order to which the customer is partial. In particular, a product has a perceived effort embedded into each dollar of cost in the same way that the customer has an amount of perceived effort embedded into each dollar earned. A customer has an increased likelihood of responding to an exchange of value if the vectors for the product and the customer's partiality are directionally aligned and where the magnitude of the vector as represented in monetary cost is somewhat greater than the worth embedded in the customer's dollar.

Put simply, the magnitude (and/or angle) of a partiality vector for a person can represent, directly or indirectly, a corresponding effort the person is willing to exert to pursue that partiality. There are various ways by which that value can be determined. As but one non-limiting example in these regards, the magnitude/angle V of a particular partiality vector can be expressed as:

$$V = \begin{bmatrix} X_1 \\ \vdots \\ X_n \end{bmatrix} [W_1 \ldots W_n]$$

where X refers to any of a variety of inputs (such as those described above) that can impact the characterization of a particular partiality (and where these teachings will accommodate either or both subjective and objective inputs as desired) and W refers to weighting factors that are appropriately applied the foregoing input values (and where, for example, these weighting factors can have values that themselves reflect a particular person's consumer personality or otherwise as desired and can be static or dynamically valued in practice as desired).

In the context of a product (or service) the magnitude/angle of the corresponding vector can represent the reduction of effort that must be exerted when making use of this product to pursue that partiality, the effort that was expended in order to create the product/service, the effort that the person perceives can be personally saved while nevertheless promoting the desired order, and/or some other corresponding effort. Taken as a whole the sum of all the vectors must be perceived to increase the overall order to be considered a good product/service.

It may be noted that while reducing effort provides a very useful metric in these regards, it does not necessarily follow that a given person will always gravitate to that which most reduces effort in their life. This is at least because a given person's values (for example) will establish a baseline against which a person may eschew some goods/services that might in fact lead to a greater overall reduction of effort but which would conflict, perhaps fundamentally, with their values. As a simple illustrative example, a given person might value physical activity. Such a person could experience reduced effort (including effort represented via monetary costs) by simply sitting on their couch, but instead will pursue activities that involve that valued physical activity. That said, however, the goods and services that such a person might acquire in support of their physical activities are still likely to represent increased order in the form of reduced effort where that makes sense. For example, a person who favors rock climbing might also favor rock climbing clothing and supplies that render that activity safer to thereby reduce the effort required to prevent disorder as a consequence of a fall (and consequently increasing the good outcome of the rock climber's quality experience).

By forming reliable partiality vectors for various individuals and corresponding product characterization vectors for a variety of products and/or services, these teachings provide a useful and reliable way to identify products/services that accord with a given person's own partialities (whether those partialities are based on their values, their affinities, their preferences, or otherwise).

It is of course possible that partiality vectors may not be available yet for a given person due to a lack of sufficient specific source information from or regarding that person. In this case it may nevertheless be possible to use one or more partiality vector templates that generally represent certain groups of people that fairly include this particular person. For example, if the person's gender, age, academic status/achievements, and/or postal code are known it may be useful to utilize a template that includes one or more partiality vectors that represent some statistical average or norm of other persons matching those same characterizing parameters, see, e.g., step 509 in FIG. 5. (Of course, while it may be useful to at least begin to employ these teachings with certain individuals by using one or more such templates, these teachings will also accommodate modifying (perhaps significantly and perhaps quickly) such a starting point over time as part of developing a more personal set of partiality vectors that are specific to the individual.) A variety of templates could be developed based, for example, on professions, academic pursuits and achievements, nationalities and/or ethnicities, characterizing hobbies, and the like.

Figure 5:
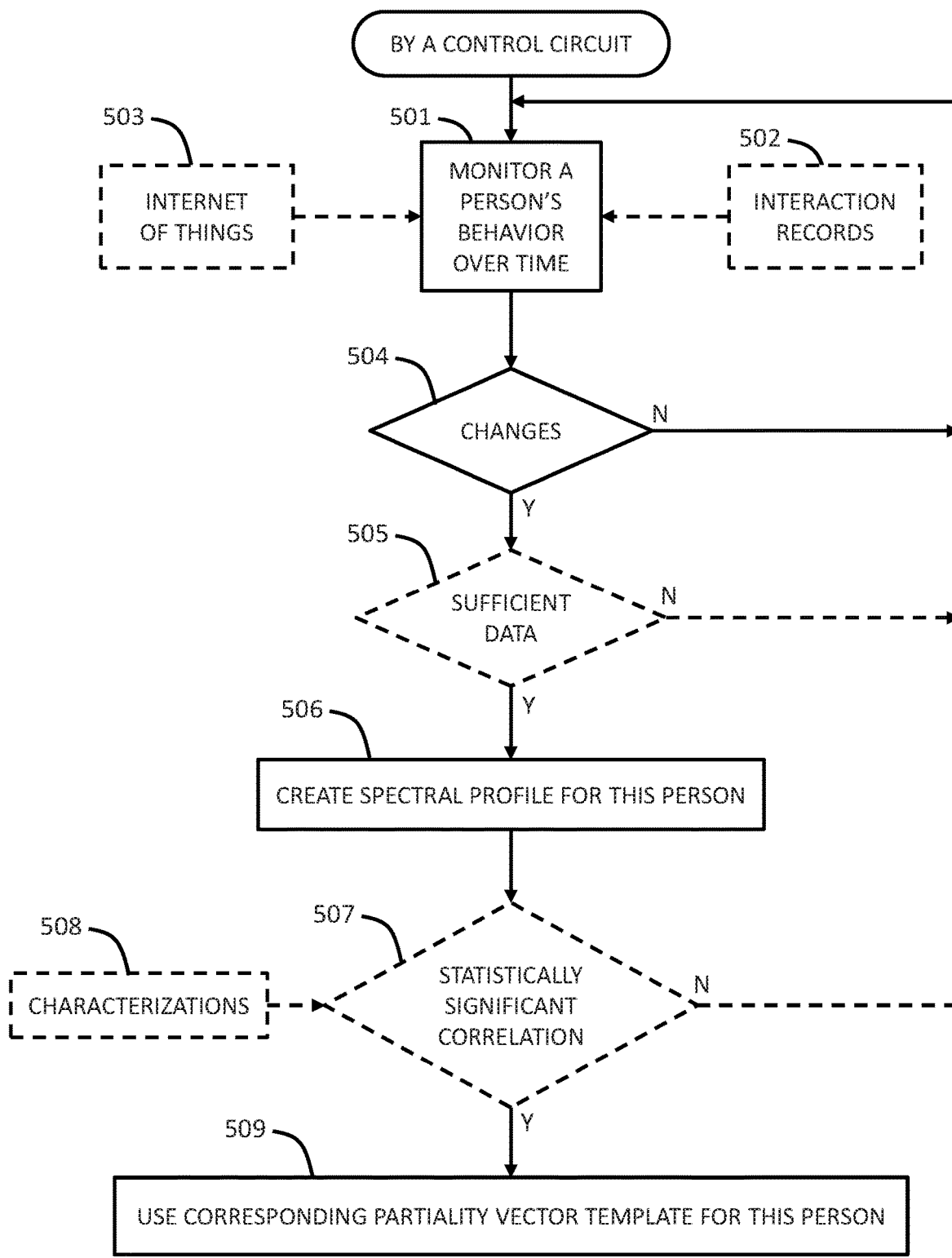
FIG. 5 comprises a flow diagram as configured in accordance with various embodiments of these teachings.

FIG. 5 presents a process 500 that illustrates yet another approach in these regards. For the sake of an illustrative example it will be presumed here that a control circuit of choice (with useful examples in these regards being presented further below) carries out one or more of the described steps/actions.

At block 501 the control circuit monitors a person's behavior over time. The range of monitored behaviors can vary with the individual and the application setting. By one approach, only behaviors that the person has specifically approved for monitoring are so monitored.

As one example in these regards, this monitoring can be based, in whole or in part, upon interaction records 502 that reflect or otherwise track, for example, the monitored person's purchases. This can include specific items purchased by the person, from whom the items were purchased, where the items were purchased, how the items were purchased (for example, at a bricks-and-mortar physical retail shopping facility or via an on-line shopping opportunity), the price paid for the items, and/or which items were returned and when), and so forth.

As another example in these regards the interaction records 502 can pertain to the social networking behaviors of the monitored person including such things as their "likes," their posted comments, images, and tweets, affinity group affiliations, their on-line profiles, their playlists and other indicated "favorites," and so forth. Such information can sometimes comprise a direct indication of a particular partiality or, in other cases, can indirectly point towards a particular partiality and/or indicate a relative strength of the person's partiality.

Other interaction records of potential interest include but are not limited to registered political affiliations and activities, credit reports, military-service history, educational and employment history, and so forth.

As another example, in lieu of the foregoing or in combination therewith, this monitoring can be based, in whole or in part, upon sensor inputs from the Internet of Things (IOT) 503. The Internet of Things refers to the Internet-based inter-working of a wide variety of physical devices including but not limited to wearable or carriable devices, vehicles, buildings, and other items that are embedded with electronics, software, sensors, network connectivity, and sometimes actuators that enable these objects to collect and exchange data via the Internet. In particular, the Internet of Things allows people and objects pertaining to people to be sensed and corresponding information to be transferred to remote locations via intervening network infrastructure. Some experts estimate that the Internet of Things will consist of almost 50 billion such objects by 2020. (Further description in these regards appears further herein.)

Depending upon what sensors a person encounters, information can be available regarding a person's travels, lifestyle, calorie expenditure over time, diet, habits, interests and affinities, choices and assumed risks, and so forth. This process 500 will accommodate either or both real-time or non-real time access to such information as well as either or both push and pull-based paradigms.

By monitoring a person's behavior over time a general sense of that person's daily routine can be established (sometimes referred to herein as a routine experiential base state). As a very simple illustrative example, a routine experiential base state can include a typical daily event timeline for the person that represents typical locations that the person visits and/or typical activities in which the person engages. The timeline can indicate those activities that tend to be scheduled (such as the person's time at their place of employment or their time spent at their child's sports practices) as well as visits/activities that are normal for the person though not necessarily undertaken with strict observance to a corresponding schedule (such as visits to local stores, movie theaters, and the homes of nearby friends and relatives).

At block 504 this process 500 provides for detecting changes to that established routine. These teachings are highly flexible in these regards and will accommodate a wide variety of "changes." Some illustrative examples include but are not limited to changes with respect to a person's travel schedule, destinations visited or time spent at a particular destination, the purchase and/or use of new and/or different products or services, a subscription to a new magazine, a new Rich Site Summary (RSS) feed or a subscription to a new blog, a new "friend" or "connection" on a social networking site, a new person, entity, or cause to follow on a Twitter-like social networking service, enrollment in an academic program, and so forth.

Upon detecting a change, at optional block 505 this process 500 will accommodate assessing whether the detected change constitutes a sufficient amount of data to warrant proceeding further with the process. This assessment can comprise, for example, assessing whether a sufficient number (i.e., a predetermined number) of instances of this particular detected change have occurred over some predetermined period of time. As another example, this assessment can comprise assessing whether the specific details of the detected change are sufficient in quantity and/or quality to warrant further processing. For example, merely detecting that the person has not arrived at their usual 6 PM-Wednesday dance class may not be enough information, in and of itself, to warrant further processing, in which case the information regarding the detected change may be discarded or, in the alternative, cached for further consideration and use in conjunction or aggregation with other, later-detected changes.

Figure 6:
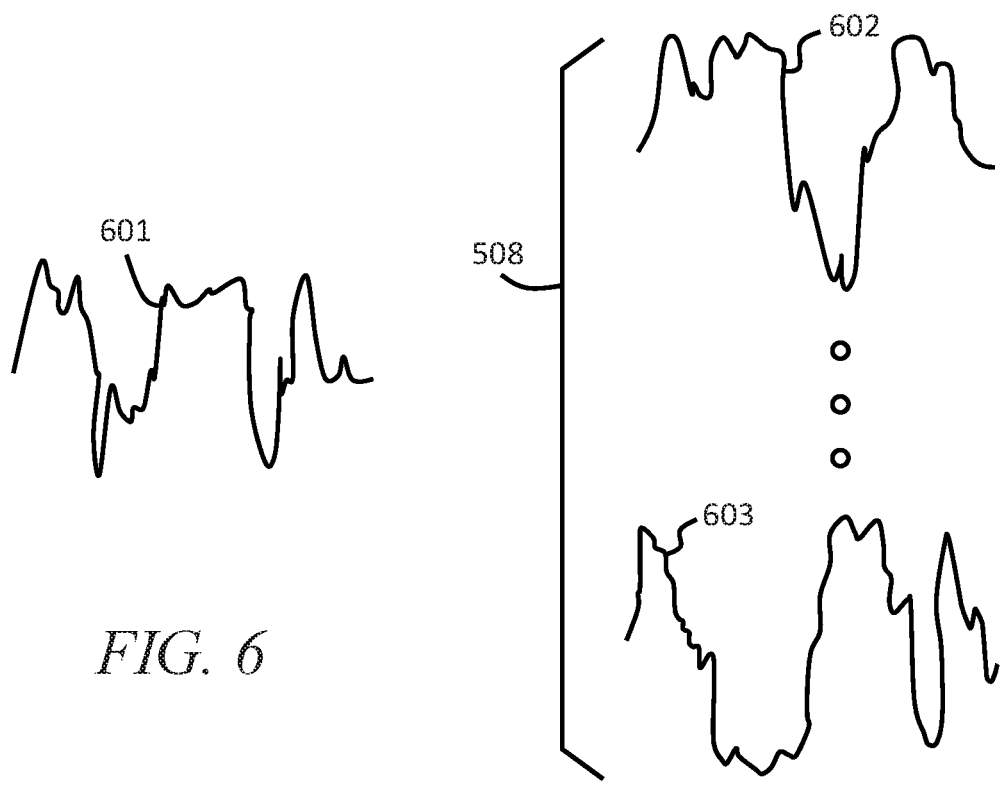
FIG. 6 comprises a graphic representation as configured in accordance with various embodiments of these teachings.

At block 506 this process 500 uses these detected changes to create a spectral profile for the monitored person. FIG. 6 provides an illustrative example in these regards with the spectral profile denoted by reference numeral 601. In this illustrative example the spectral profile 601 represents changes to the person's behavior over a given period of time (such as an hour, a day, a week, or some other temporal window of choice). Such a spectral profile can be as multidimensional as may suit the needs of a given application setting.

At optional block 507 this process 500 then provides for determining whether there is a statistically significant correlation between the aforementioned spectral profile and any of a plurality of like characterizations 508. The like characterizations 508 can comprise, for example, spectral profiles that represent an average of groupings of people who share many of the same (or all of the same) identified partialities. As a very simple illustrative example in these regards, a first such characterization 602 might represent a composite view of a first group of people who have three similar partialities but a dissimilar fourth partiality while another of the characterizations 603 might represent a composite view of a different group of people who share all four partialities.

The aforementioned "statistically significant" standard can be selected and/or adjusted to suit the needs of a given application setting. The scale or units by which this measurement can be assessed can be any known, relevant scale/unit including, but not limited to, scales such as standard deviations, cumulative percentages, percentile equivalents, Z-scores, T-scores, standard nines, and percentages in standard nines. Similarly, the threshold by which the level of statistical significance is measured/assessed can be set and selected as desired. By one approach the threshold is static such that the same threshold is employed regardless of the circumstances. By another approach the threshold is dynamic and can vary with such things as the relative size of the population of people upon which each of the characterizations 508 are based and/or the amount of data and/or the duration of time over which data is available for the monitored person.

Figure 7:
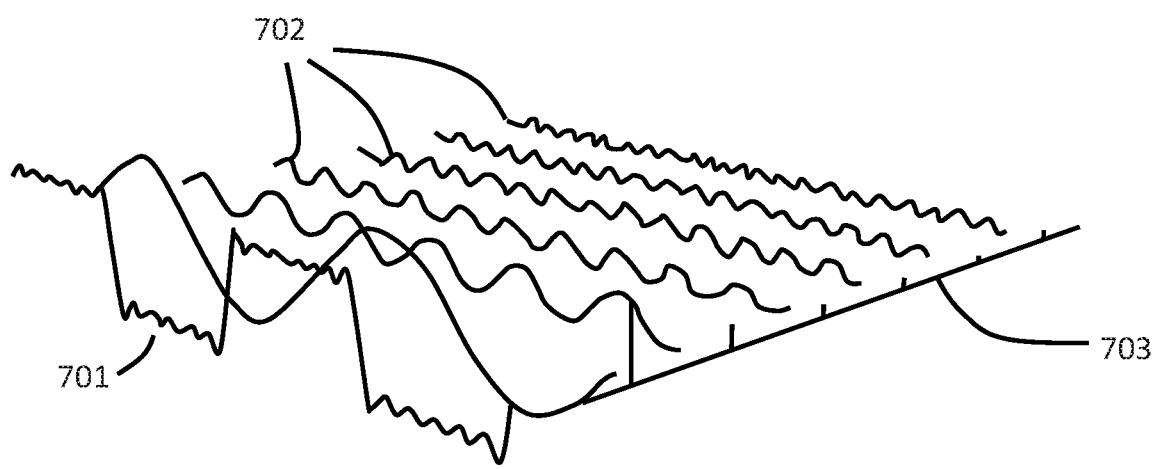
FIG. 7 comprises a graphic representation as configured in accordance with various embodiments of these teachings.

Referring now to FIG. 7, by one approach the selected characterization (denoted by reference numeral 701 in this figure) comprises an activity profile over time of one or more human behaviors. Examples of behaviors include but are not limited to such things as repeated purchases over time of particular commodities, repeated visits over time to particular locales such as certain restaurants, retail outlets, athletic or entertainment facilities, and so forth, and repeated activities over time such as floor cleaning, dish washing, car cleaning, cooking, volunteering, and so forth. Those skilled in the art will understand and appreciate, however, that the selected characterization is not, in and of itself, demographic data (as described elsewhere herein).

More particularly, the characterization 701 can represent (in this example, for a plurality of different behaviors) each instance over the monitored/sampled period of time when the monitored/represented person engages in a particular represented behavior (such as visiting a neighborhood gym, purchasing a particular product (such as a consumable perishable or a cleaning product), interacts with a particular affinity group via social networking, and so forth). The relevant overall time frame can be chosen as desired and can range in a typical application setting from a few hours or one day to many days, weeks, or even months or years. (It will be understood by those skilled in the art that the particular characterization shown in FIG. 7 is intended to serve an illustrative purpose and does not necessarily represent or mimic any particular behavior or set of behaviors).

Generally speaking it is anticipated that many behaviors of interest will occur at regular or somewhat regular intervals and hence will have a corresponding frequency or periodicity of occurrence. For some behaviors that frequency of occurrence may be relatively often (for example, oral hygiene events that occur at least once, and often multiple times each day) while other behaviors (such as the preparation of a holiday meal) may occur much less frequently (such as only once, or only a few times, each year). For at least some behaviors of interest that general (or specific) frequency of occurrence can serve as a significant indication of a person's corresponding partialities.

By one approach, these teachings will accommodate detecting and timestamping each and every event/activity/behavior or interest as it happens. Such an approach can be memory intensive and require considerable supporting infrastructure.

The present teachings will also accommodate, however, using any of a variety of sampling periods in these regards. In some cases, for example, the sampling period per se may be one week in duration. In that case, it may be sufficient to know that the monitored person engaged in a particular activity (such as cleaning their car) a certain number of times during that week without known precisely when, during that week, the activity occurred. In other cases it may be appropriate or even desirable, to provide greater granularity in these regards. For example, it may be better to know which days the person engaged in the particular activity or even the particular hour of the day. Depending upon the selected granularity/resolution, selecting an appropriate sampling window can help reduce data storage requirements (and/or corresponding analysis/processing overhead requirements).

Although a given person's behaviors may not, strictly speaking, be continuous waves (as shown in FIG. 7) in the same sense as, for example, a radio or acoustic wave, it will nevertheless be understood that such a behavioral characterization 701 can itself be broken down into a plurality of sub-waves 702 that, when summed together, equal or at least approximate to some satisfactory degree the behavioral characterization 701 itself (The more-discrete and sometimes less-rigidly periodic nature of the monitored behaviors may introduce a certain amount of error into the corresponding sub-waves. There are various mathematically satisfactory ways by which such error can be accommodated including by use of weighting factors and/or expressed tolerances that correspond to the resultant sub-waves.)

It should also be understood that each such sub-wave can often itself be associated with one or more corresponding discrete partialities. For example, a partiality reflecting concern for the environment may, in turn, influence many of the included behavioral events (whether they are similar or dissimilar behaviors or not) and accordingly may, as a sub-wave, comprise a relatively significant contributing factor to the overall set of behaviors as monitored over time. These sub-waves (partialities) can in turn be clearly revealed and presented by employing a transform (such as a Fourier transform) of choice to yield a spectral profile 703 wherein the X axis represents frequency and the Y axis represents the magnitude of the response of the monitored person at each frequency/sub-wave of interest.

Figure 8:
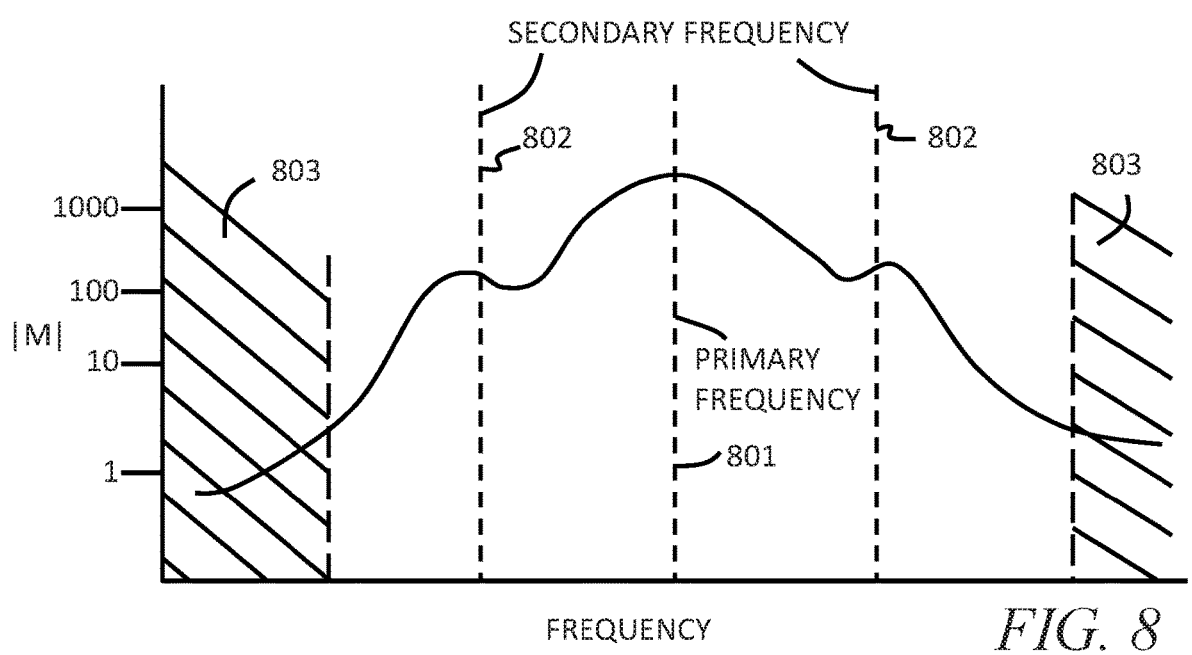
FIG. 8 comprises a graphic representation as configured in accordance with various embodiments of these teachings.

This spectral response of a given individual—which is generated from a time series of events that reflect/track that person's behavior—yields frequency response characteristics for that person that are analogous to the frequency response characteristics of physical systems such as, for example, an analog or digital filter or a second order electrical or mechanical system. Referring to FIG. 8, for many people the spectral profile of the individual person will exhibit a primary frequency 801 for which the greatest response (perhaps many orders of magnitude greater than other evident frequencies) to life is exhibited and apparent. In addition, the spectral profile may also possibly identify one or more secondary frequencies 802 above and/or below that primary frequency 801. (It may be useful in many application settings to filter out more distant frequencies 803 having considerably lower magnitudes because of a reduced likelihood of relevance and/or because of a possibility of error in those regards; in effect, these lower-magnitude signals constitute noise that such filtering can remove from consideration.)

As noted above, the present teachings will accommodate using sampling windows of varying size. By one approach the frequency of events that correspond to a particular partiality can serve as a basis for selecting a particular sampling rate to use when monitoring for such events. For example, Nyquist-based sampling rules (which dictate sampling at a rate at least twice that of the frequency of the signal of interest) can lead one to choose a particular sampling rate (and the resultant corresponding sampling window size).

As a simple illustration, if the activity of interest occurs only once a week, then using a sampling of half-a-week and sampling twice during the course of a given week will adequately capture the monitored event. If the monitored person's behavior should change, a corresponding change can be automatically made. For example, if the person in the foregoing example begins to engage in the specified activity three times a week, the sampling rate can be switched to six times per week (in conjunction with a sampling window that is resized accordingly).

By one approach, the sampling rate can be selected and used on a partiality-by-partiality basis. This approach can be especially useful when different monitoring modalities are employed to monitor events that correspond to different partialities. If desired, however, a single sampling rate can be employed and used for a plurality (or even all) partialities/behaviors. In that case, it can be useful to identify the behavior that is exemplified most often (i.e., that behavior which has the highest frequency) and then select a sampling rate that is at least twice that rate of behavioral realization, as that sampling rate will serve well and suffice for both that highest-frequency behavior and all lower-frequency behaviors as well.

It can be useful in many application settings to assume that the foregoing spectral profile of a given person is an inherent and inertial characteristic of that person and that this spectral profile, in essence, provides a personality profile of that person that reflects not only how but why this person responds to a variety of life experiences. More importantly, the partialities expressed by the spectral profile for a given person will tend to persist going forward and will not typically change significantly in the absence of some powerful external influence (including but not limited to significant life events such as, for example, marriage, children, loss of job, promotion, and so forth).

In any event, by knowing a priori the particular partialities (and corresponding strengths) that underlie the particular characterization 701, those partialities can be used as an initial template for a person whose own behaviors permit the selection of that particular characterization 701. In particular, those particularities can be used, at least initially, for a person for whom an amount of data is not otherwise available to construct a similarly rich set of partiality information.

As a very specific and non-limiting example, per these teachings the choice to make a particular product can include consideration of one or more value systems of potential customers. When considering persons who value animal rights, a product conceived to cater to that value proposition may require a corresponding exertion of additional effort to order material space-time such that the product is made in a way that (A) does not harm animals and/or (even better) (B) improves life for animals (for example, eggs obtained from free range chickens). The reason a person exerts effort to order material space-time is because they believe it is good to do and/or not good to not do so. When a person exerts effort to do good (per their personal standard of "good") and if that person believes that a particular order in material space-time (that includes the purchase of a particular product) is good to achieve, then that person will also believe that it is good to buy as much of that particular product (in order to achieve that good order) as their finances and needs reasonably permit (all other things being equal).

The aforementioned additional effort to provide such a product can (typically) convert to a premium that adds to the price of that product. A customer who puts out extra effort in their life to value animal rights will typically be willing to pay that extra premium to cover that additional effort exerted by the company. By one approach a magnitude that corresponds to the additional effort exerted by the company can be added to the person's corresponding value vector because a product or service has worth to the extent that the product/service allows a person to order material space-time in accordance with their own personal value system while allowing that person to exert less of their own effort in direct support of that value (since money is a scalar form of effort).

By one approach there can be hundreds or even thousands of identified partialities. In this case, if desired, each product/service of interest can be assessed with respect to each and every one of these partialities and a corresponding partiality vector formed to thereby build a collection of partiality vectors that collectively characterize the product/service. As a very simple example in these regards, a given laundry detergent might have a cleanliness partiality vector with a relatively high magnitude (representing the effectiveness of the detergent), a ecology partiality vector that might be relatively low or possibly even having a negative magnitude (representing an ecologically disadvantageous effect of the detergent post usage due to increased disorder in the environment), and a simple-life partiality vector with only a modest magnitude (representing the relative ease of use of the detergent but also that the detergent presupposes that the user has a modern washing machine). Other partiality vectors for this detergent, representing such things as nutrition or mental acuity, might have magnitudes of zero.

As mentioned above, these teachings can accommodate partiality vectors having a negative magnitude. Consider, for example, a partiality vector representing a desire to order things to reduce one's so-called carbon footprint. A magnitude of zero for this vector would indicate a completely neutral effect with respect to carbon emissions while any positive-valued magnitudes would represent a net reduction in the amount of carbon in the atmosphere, hence increasing the ability of the environment to be ordered. Negative magnitudes would represent the introduction of carbon emissions that increases disorder of the environment (for example, as a result of manufacturing the product, transporting the product, and/or using the product).

Figure 9:
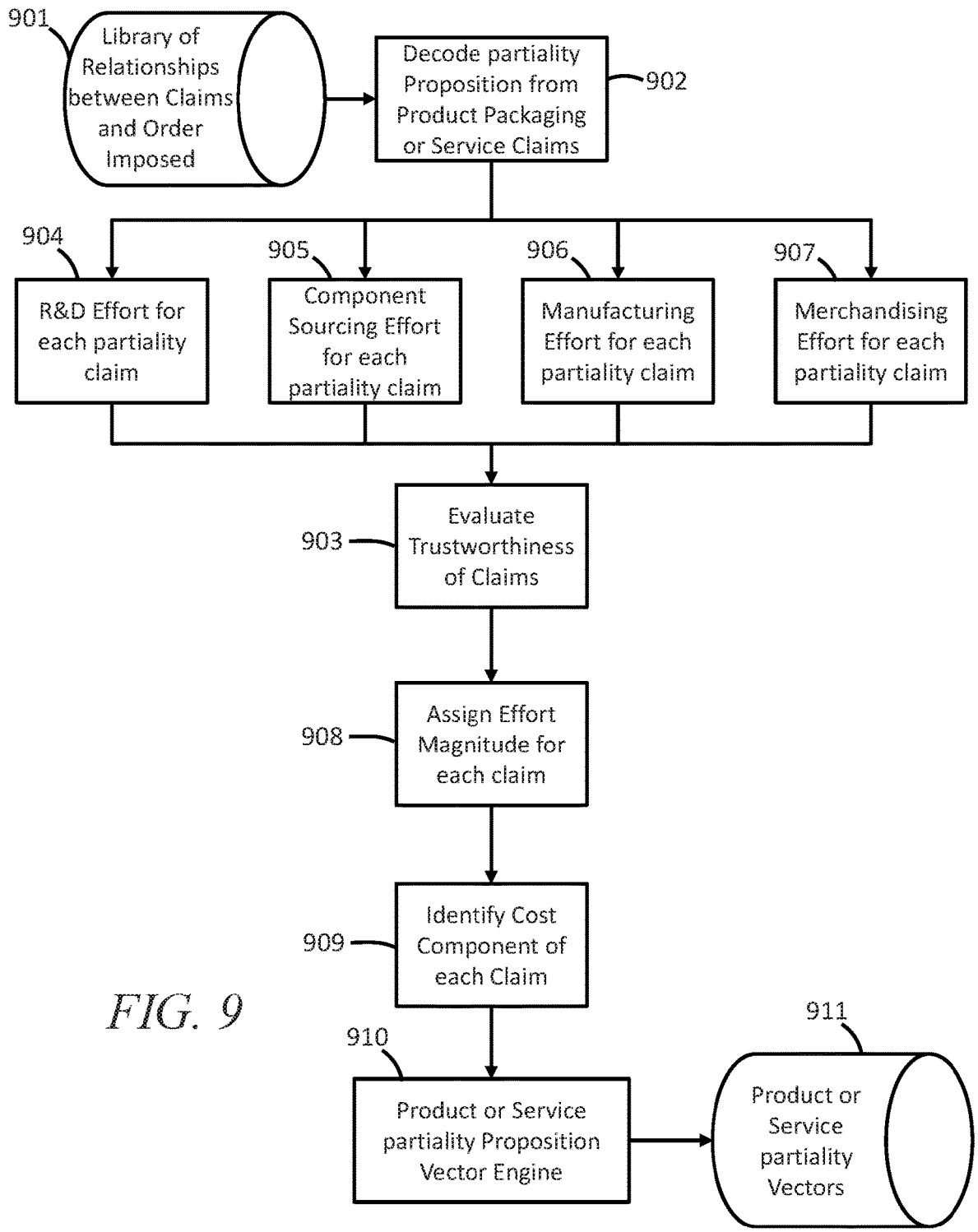
FIG. 9 comprises a flow diagram as configured in accordance with various embodiments of these teachings.

FIG. 9 presents one non-limiting illustrative example in these regards. The illustrated process presumes the availability of a library 901 of correlated relationships between product/service claims and particular imposed orders. Examples of product/service claims include such things as claims that a particular product results in cleaner laundry or household surfaces, or that a particular product is made in a particular political region (such as a particular state or country), or that a particular product is better for the environment, and so forth. The imposed orders to which such claims are correlated can reflect orders as described above that pertain to corresponding partialities.

At block 902 this process provides for decoding one or more partiality propositions from specific product packaging (or service claims). For example, the particular textual/graphics-based claims presented on the packaging of a given product can be used to access the aforementioned library 901 to identify one or more corresponding imposed orders from which one or more corresponding partialities can then be identified.

At block 903 this process provides for evaluating the trustworthiness of the aforementioned claims. This evaluation can be based upon any one or more of a variety of data points as desired. FIG. 9 illustrates four significant possibilities in these regards. For example, at block 904 an actual or estimated research and development effort can be quantified for each claim pertaining to a partiality. At block 905 an actual or estimated component sourcing effort for the product in question can be quantified for each claim pertaining to a partiality. At block 906 an actual or estimated manufacturing effort for the product in question can be quantified for each claim pertaining to a partiality. And at block 907 an actual or estimated merchandising effort for the product in question can be quantified for each claim pertaining to a partiality.

If desired, a product claim lacking sufficient trustworthiness may simply be excluded from further consideration. By another approach the product claim can remain in play but a lack of trustworthiness can be reflected, for example, in a corresponding partiality vector direction or magnitude for this particular product.

At block 908 this process provides for assigning an effort magnitude for each evaluated product/service claim. That effort can constitute a one-dimensional effort (reflecting, for example, only the manufacturing effort) or can constitute a multidimensional effort that reflects, for example, various categories of effort such as the aforementioned research and development effort, component sourcing effort, manufacturing effort, and so forth.

At block 909 this process provides for identifying a cost component of each claim, this cost component representing a monetary value. At block 910 this process can use the foregoing information with a product/service partiality propositions vector engine to generate a library 911 of one or more corresponding partiality vectors for the processed products/services. Such a library can then be used as described herein in conjunction with partiality vector information for various persons to identify, for example, products/services that are well aligned with the partialities of specific individuals.

Figure 10:
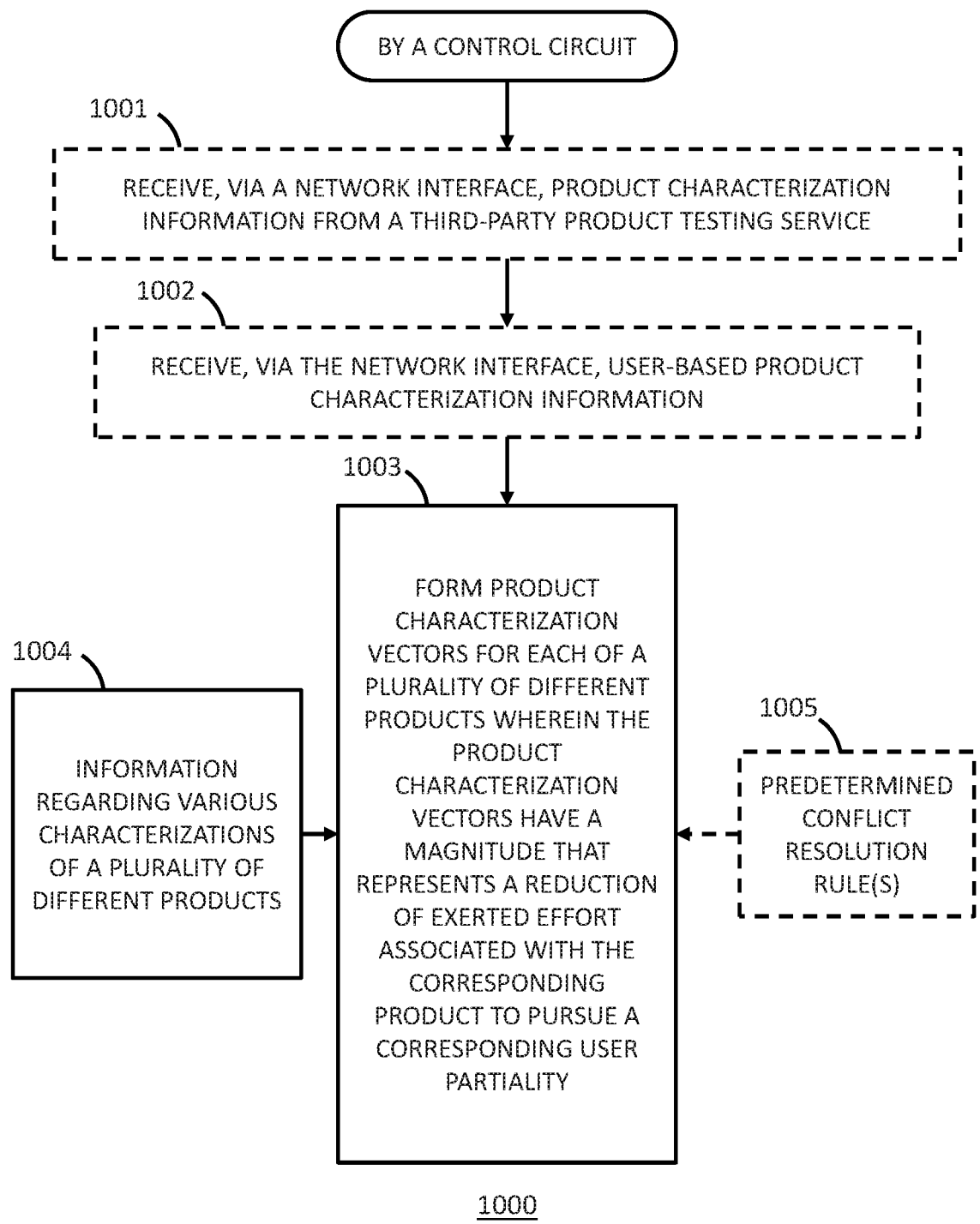
FIG. 10 comprises a flow diagram as configured in accordance with various embodiments of these teachings.

FIG. 10 provides another illustrative example in these same regards and may be employed in lieu of the foregoing or in total or partial combination therewith. Generally speaking, this process 1000 serves to facilitate the formation of product characterization vectors for each of a plurality of different products where the magnitude of the vector length (and/or the vector angle) has a magnitude that represents a reduction of exerted effort associated with the corresponding product to pursue a corresponding user partiality.

By one approach, and as illustrated in FIG. 10, this process 1000 can be carried out by a control circuit of choice. Specific examples of control circuits are provided elsewhere herein.

As described further herein in detail, this process 1000 makes use of information regarding various characterizations of a plurality of different products. These teachings are highly flexible in practice and will accommodate a wide variety of possible information sources and types of information. By one optional approach, and as shown at optional block 1001, the control circuit can receive (for example, via a corresponding network interface of choice) product characterization information from a third-party product testing service. The magazine/web resource Consumers Report provides one useful example in these regards. Such a resource provides objective content based upon testing, evaluation, and comparisons (and sometimes also provides subjective content regarding such things as aesthetics, ease of use, and so forth) and this content, provided as-is or pre-processed as desired, can readily serve as useful third-party product testing service product characterization information.

As another example, any of a variety of product-testing blogs that are published on the Internet can be similarly accessed and the product characterization information available at such resources harvested and received by the control circuit. (The expression "third party" will be understood to refer to an entity other than the entity that operates/controls the control circuit and other than the entity that provides the corresponding product itself.)

As another example, and as illustrated at optional block 1002, the control circuit can receive (again, for example, via a network interface of choice) user-based product characterization information. Examples in these regards include but are not limited to user reviews provided on-line at various retail sites for products offered for sale at such sites. The reviews can comprise metricized content (for example, a rating expressed as a certain number of stars out of a total available number of stars, such as 3 stars out of 5 possible stars) and/or text where the reviewers can enter their objective and subjective information regarding their observations and experiences with the reviewed products. In this case, "user-based" will be understood to refer to users who are not necessarily professional reviewers (though it is possible that content from such persons may be included with the information provided at such a resource) but who presumably purchased the product being reviewed and who have personal experience with that product that forms the basis of their review. By one approach the resource that offers such content may constitute a third party as defined above, but these teachings will also accommodate obtaining such content from a resource operated or sponsored by the enterprise that controls/operates this control circuit.

In any event, this process 1000 provides for accessing (see block 1004) information regarding various characterizations of each of a plurality of different products. This information 1004 can be gleaned as described above and/or can be obtained and/or developed using other resources as desired. As one illustrative example in these regards, the manufacturer and/or distributor of certain products may source useful content in these regards.

These teachings will accommodate a wide variety of information sources and types including both objective characterizing and/or subjective characterizing information for the aforementioned products.

Examples of objective characterizing information include, but are not limited to, ingredients information (i.e., specific components/materials from which the product is made), manufacturing locale information (such as country of origin, state of origin, municipality of origin, region of origin, and so forth), efficacy information (such as metrics regarding the relative effectiveness of the product to achieve a particular end-use result), cost information (such as per product, per ounce, per application or use, and so forth), availability information (such as present in-store availability, on-hand inventory availability at a relevant distribution center, likely or estimated shipping date, and so forth), environmental impact information (regarding, for example, the materials from which the product is made, one or more manufacturing processes by which the product is made, environmental impact associated with use of the product, and so forth), and so forth.

Examples of subjective characterizing information include but are not limited to user sensory perception information (regarding, for example, heaviness or lightness, speed of use, effort associated with use, smell, and so forth), aesthetics information (regarding, for example, how attractive or unattractive the product is in appearance, how well the product matches or accords with a particular design paradigm or theme, and so forth), trustworthiness information (regarding, for example, user perceptions regarding how likely the product is perceived to accomplish a particular purpose or to avoid causing a particular collateral harm), trendiness information, and so forth.

This information 1004 can be curated (or not), filtered, sorted, weighted (in accordance with a relative degree of trust, for example, accorded to a particular source of particular information), and otherwise categorized and utilized as desired. As one simple example in these regards, for some products it may be desirable to only use relatively fresh information (i.e., information not older than some specific cut-off date) while for other products it may be acceptable (or even desirable) to use, in lieu of fresh information or in combination therewith, relatively older information. As another simple example, it may be useful to use only information from one particular geographic region to characterize a particular product and to therefore not use information from other geographic regions.

At block 1003 the control circuit uses the foregoing information 1004 to form product characterization vectors for each of the plurality of different products. By one approach these product characterization vectors have a magnitude (for the length of the vector and/or the angle of the vector) that represents a reduction of exerted effort associated with the corresponding product to pursue a corresponding user partiality (as is otherwise discussed herein).

It is possible that a conflict will become evident as between various ones of the aforementioned items of information 1004. In particular, the available characterizations for a given product may not all be the same or otherwise in accord with one another. In some cases it may be appropriate to literally or effectively calculate and use an average to accommodate such a conflict. In other cases it may be useful to use one or more other predetermined conflict resolution rules 1005 to automatically resolve such conflicts when forming the aforementioned product characterization vectors.

These teachings will accommodate any of a variety of rules in these regards. By one approach, for example, the rule can be based upon the age of the information (where, for example the older (or newer, if desired) data is preferred or weighted more heavily than the newer (or older, if desired) data. By another approach, the rule can be based upon a number of user reviews upon which the user-based product characterization information is based (where, for example, the rule specifies that whichever user-based product characterization information is based upon a larger number of user reviews will prevail in the event of a conflict). By another approach, the rule can be based upon information regarding historical accuracy of information from a particular information source (where, for example, the rule specifies that information from a source with a better historical record of accuracy shall prevail over information from a source with a poorer historical record of accuracy in the event of a conflict).

By yet another approach, the rule can be based upon social media. For example, social media-posted reviews may be used as a tie-breaker in the event of a conflict between other more-favored sources. By another approach, the rule can be based upon a trending analysis. And by yet another approach the rule can be based upon the relative strength of brand awareness for the product at issue (where, for example, the rule specifies resolving a conflict in favor of a more favorable characterization when dealing with a product from a strong brand that evidences considerable consumer goodwill and trust).

It will be understood that the foregoing examples are intended to serve an illustrative purpose and are not offered as an exhaustive listing in these regards. It will also be understood that any two or more of the foregoing rules can be used in combination with one another to resolve the aforementioned conflicts.

By one approach the aforementioned product characterization vectors are formed to serve as a universal characterization of a given product. By another approach, however, the aforementioned information 1004 can be used to form product characterization vectors for a same characterization factor for a same product to thereby correspond to different usage circumstances of that same product. Those different usage circumstances might comprise, for example, different geographic regions of usage, different levels of user expertise (where, for example, a skilled, professional user might have different needs and expectations for the product than a casual, lay user), different levels of expected use, and so forth. In particular, the different vectorized results for a same characterization factor for a same product may have differing magnitudes from one another to correspond to different amounts of reduction of the exerted effort associated with that product under the different usage circumstances.

Figure 11:
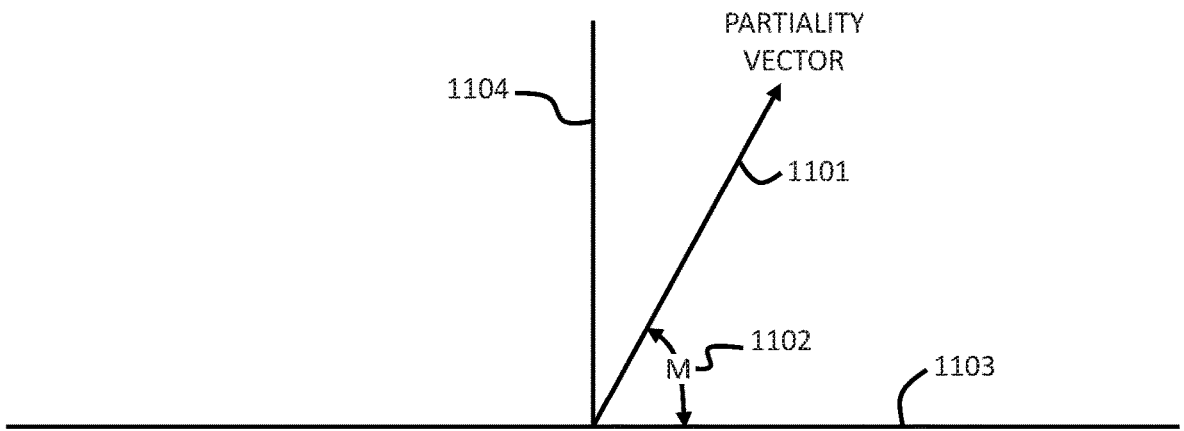
FIG. 11 comprises a graphic representation as configured in accordance with various embodiments of these teachings.

As noted above, the magnitude corresponding to a particular partiality vector for a particular person can be expressed by the angle of that partiality vector. FIG. 11 provides an illustrative example in these regards. In this example the partiality vector 1101 has an angle M 1102 (and where the range of available positive magnitudes range from a minimal magnitude represented by 0° (as denoted by reference numeral 1103) to a maximum magnitude represented by 90° (as denoted by reference numeral 1104)). Accordingly, the person to whom this partiality vector 1001 pertains has a relatively strong (but not absolute) belief in an amount of good that comes from an order associated with that partiality.

Figure 12:
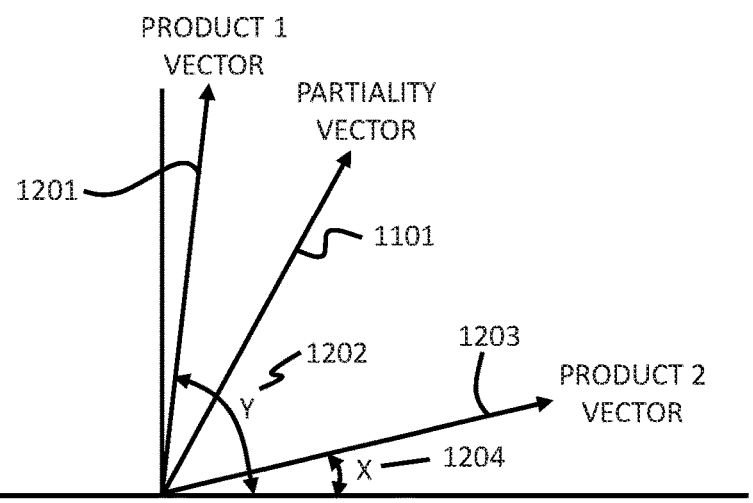
FIG. 12 comprises a graphic representation as configured in accordance with various embodiments of these teachings.

FIG. 12, in turn, presents that partiality vector 1101 in context with the product characterization vectors 1201 and 1203 for a first product and a second product, respectively. In this example the product characterization vector 1201 for the first product has an angle Y 1202 that is greater than the angle M 1102 for the aforementioned partiality vector 1101 by a relatively small amount while the product characterization vector 1203 for the second product has an angle X 1204 that is considerably smaller than the angle M 1102 for the partiality vector 1101.

Since, in this example, the angles of the various vectors represent the magnitude of the person's specified partiality or the extent to which the product aligns with that partiality, respectively, vector dot product calculations can serve to help identify which product best aligns with this partiality. Such an approach can be particularly useful when the lengths of the vectors are allowed to vary as a function of one or more parameters of interest. As those skilled in the art will understand, a vector dot product is an algebraic operation that takes two equal-length sequences of numbers (in this case, coordinate vectors) and returns a single number.

This operation can be defined either algebraically or geometrically. Algebraically, it is the sum of the products of the corresponding entries of the two sequences of numbers. Geometrically, it is the product of the Euclidean magnitudes of the two vectors and the cosine of the angle between them. The result is a scalar rather than a vector. As regards the present illustrative example, the resultant scaler value for the vector dot product of the product 1 vector 1201 with the partiality vector 1101 will be larger than the resultant scaler value for the vector dot product of the product 2 vector 1203 with the partiality vector 1101. Accordingly, when using vector angles to impart this magnitude information, the vector dot product operation provides a simple and convenient way to determine proximity between a particular partiality and the performance/properties of a particular product to thereby greatly facilitate identifying a best product amongst a plurality of candidate products.

By way of further illustration, consider an example where a particular consumer as a strong partiality for organic produce and is financially able to afford to pay to observe that partiality. A dot product result for that person with respect to a product characterization vector(s) for organic apples that represent a cost of $10 on a weekly basis (i.e., Cv·P1v) might equal (1,1), hence yielding a scalar result of $\|1\|$ (where Cv refers to the corresponding partiality vector for this person and P1v represents the corresponding product characterization vector for these organic apples). Conversely, a dot product result for this same person with respect to a product characterization vector(s) for non-organic apples that represent a cost of $5 on a weekly basis (i.e., Cv·P2v) might instead equal (1,0), hence yielding a scalar result of $\|\frac{1}{2}\|$. Accordingly, although the organic apples cost more than the non-organic apples, the dot product result for the organic apples exceeds the dot product result for the non-organic apples and therefore identifies the more expensive organic apples as being the best choice for this person.

To continue with the foregoing example, consider now what happens when this person subsequently experiences some financial misfortune (for example, they lose their job and have not yet found substitute employment). Such an event can present the "force" necessary to alter the previously-established "inertia" of this person's steady-state partialities; in particular, these negatively-changed financial circumstances (in this example) alter this person's budget sensitivities (though not, of course their partiality for organic produce as compared to non-organic produce). The scalar result of the dot product for the $5/week non-organic apples may remain the same (i.e., in this example, $\|\frac{1}{2}\|$), but the dot product for the $10/week organic apples may now drop (for example, to $\|\frac{1}{2}\|$ as well). Dropping the quantity of organic apples purchased, however, to reflect the tightened financial circumstances for this person may yield a better dot product result. For example, purchasing only $5 (per week) of organic apples may produce a dot product result of ||1||. The best result for this person, then, under these circumstances, is a lesser quantity of organic apples rather than a larger quantity of non-organic apples.

In a typical application setting, it is possible that this person's loss of employment is not, in fact, known to the system. Instead, however, this person's change of behavior (i.e., reducing the quantity of the organic apples that are purchased each week) might well be tracked and processed to adjust one or more partialities (either through an addition or deletion of one or more partialities and/or by adjusting the corresponding partiality magnitude) to thereby yield this new result as a preferred result.

The foregoing simple examples clearly illustrate that vector dot product approaches can be a simple yet powerful way to quickly eliminate some product options while simultaneously quickly highlighting one or more product options as being especially suitable for a given person.

Such vector dot product calculations and results, in turn, help illustrate another point as well. As noted above, sine waves can serve as a potentially useful way to characterize and view partiality information for both people and products/services. In those regards, it is worth noting that a vector dot product result can be a positive, zero, or even negative value. That, in turn, suggests representing a particular solution as a normalization of the dot product value relative to the maximum possible value of the dot product. Approached this way, the maximum amplitude of a particular sine wave will typically represent a best solution.

Taking this approach further, by one approach the frequency (or, if desired, phase) of the sine wave solution can provide an indication of the sensitivity of the person to product choices (for example, a higher frequency can indicate a relatively highly reactive sensitivity while a lower frequency can indicate the opposite). A highly sensitive person is likely to be less receptive to solutions that are less than fully optimum and hence can help to narrow the field of candidate products while, conversely, a less sensitive person is likely to be more receptive to solutions that are less than fully optimum and can help to expand the field of candidate products.

Figure 13:
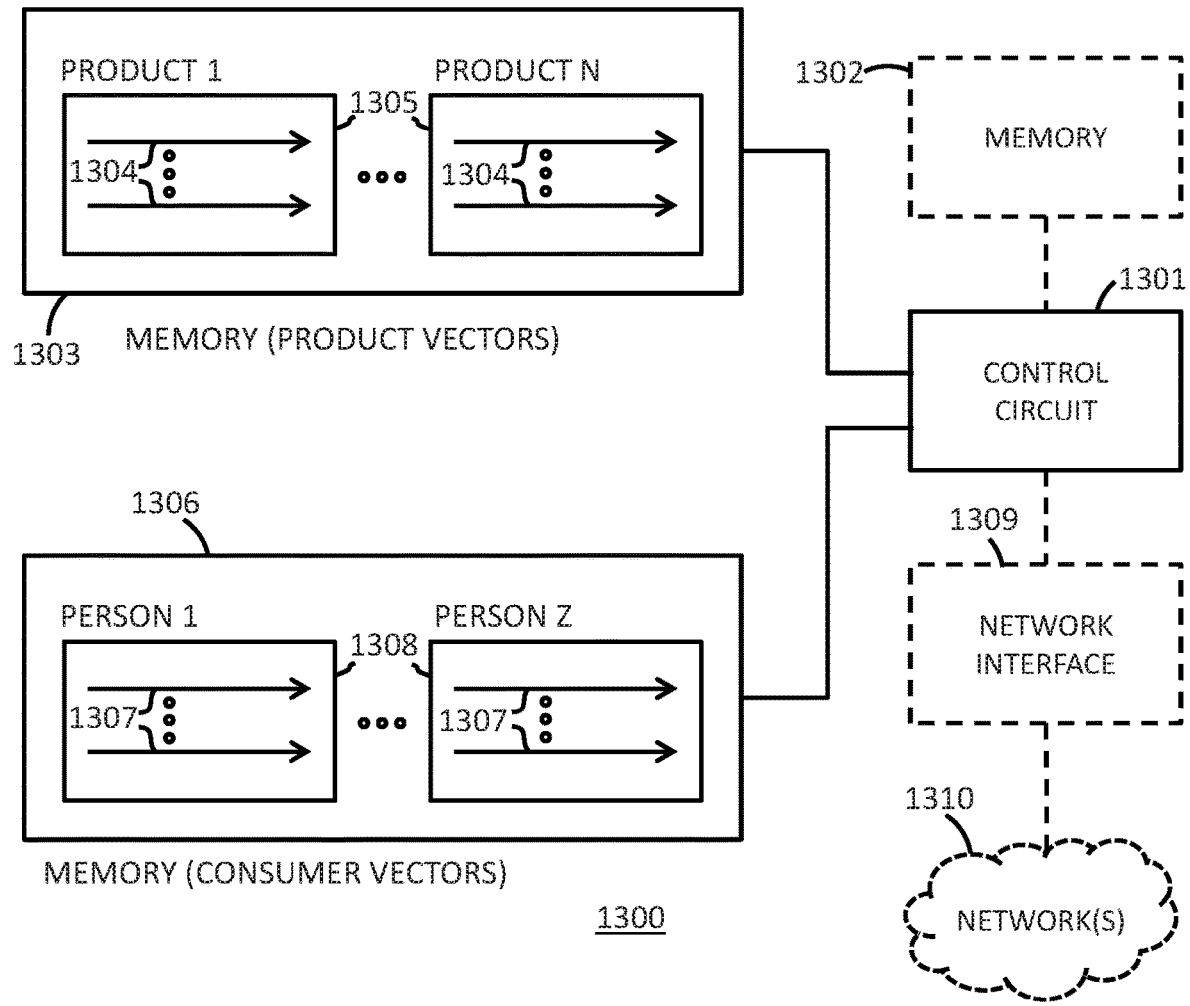
FIG. 13 comprises a block diagram as configured in accordance with various embodiments of these teachings.

FIG. 13 presents an illustrative apparatus 1300 for conducting, containing, and utilizing the foregoing content and capabilities. In this particular example, the enabling apparatus 1300 includes a control circuit 1301. Being a "circuit," the control circuit 1301 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 1301 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 1301 is configured (for example, by using corresponding programming as will be well understood by those skilled in the art) to carry out one or more of the steps, actions, and/or functions described herein.

By one optional approach the control circuit 1301 operably couples to a memory 1302. This memory 1302 may be integral to the control circuit 1301 or can be physically discrete (in whole or in part) from the control circuit 1301 as desired. This memory 1302 can also be local with respect to the control circuit 1301 (where, for example, both share a common circuit board, chassis, power supply, and/or housing) or can be partially or wholly remote with respect to the control circuit 1301 (where, for example, the memory 1302 is physically located in another facility, metropolitan area, or even country as compared to the control circuit 1301).

This memory 1302 can serve, for example, to non-transitorily store the computer instructions that, when executed by the control circuit 1301, cause the control circuit 1301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Either stored in this memory 1302 or, as illustrated, in a separate memory 1303 are the vectorized characterizations 1304 for each of a plurality of products 1305 (represented here by a first product through an Nth product where "N" is an integer greater than "1"). In addition, and again either stored in this memory 1302 or, as illustrated, in a separate memory 1306 are the vectorized characterizations 1307 for each of a plurality of individual persons 1308 (represented here by a first person through a Zth person wherein "Z" is also an integer greater than "1"). It will be appreciated that the number of persons and products for whom such information is stored can be large. Storing partiality-based information in a vectorized format can greatly ease both digital storage requirements and computational resource requirements. Those skilled in the art will appreciate these improvements to the technical capabilities of both the memory and computer capabilities of such a platform.

In this example the control circuit 1301 also operably couples to a network interface 1309. So configured the control circuit 1301 can communicate with other elements (both within the apparatus 1300 and external thereto) via the network interface 1309. Network interfaces, including both wireless and non-wireless platforms, are well understood in the art and require no particular elaboration here. This network interface 1309 can compatibly communicate via whatever network or networks 1310 may be appropriate to suit the particular needs of a given application setting. Both communication networks and network interfaces are well understood areas of prior art endeavor and therefore no further elaboration will be provided here in those regards for the sake of brevity.

Figure 14:
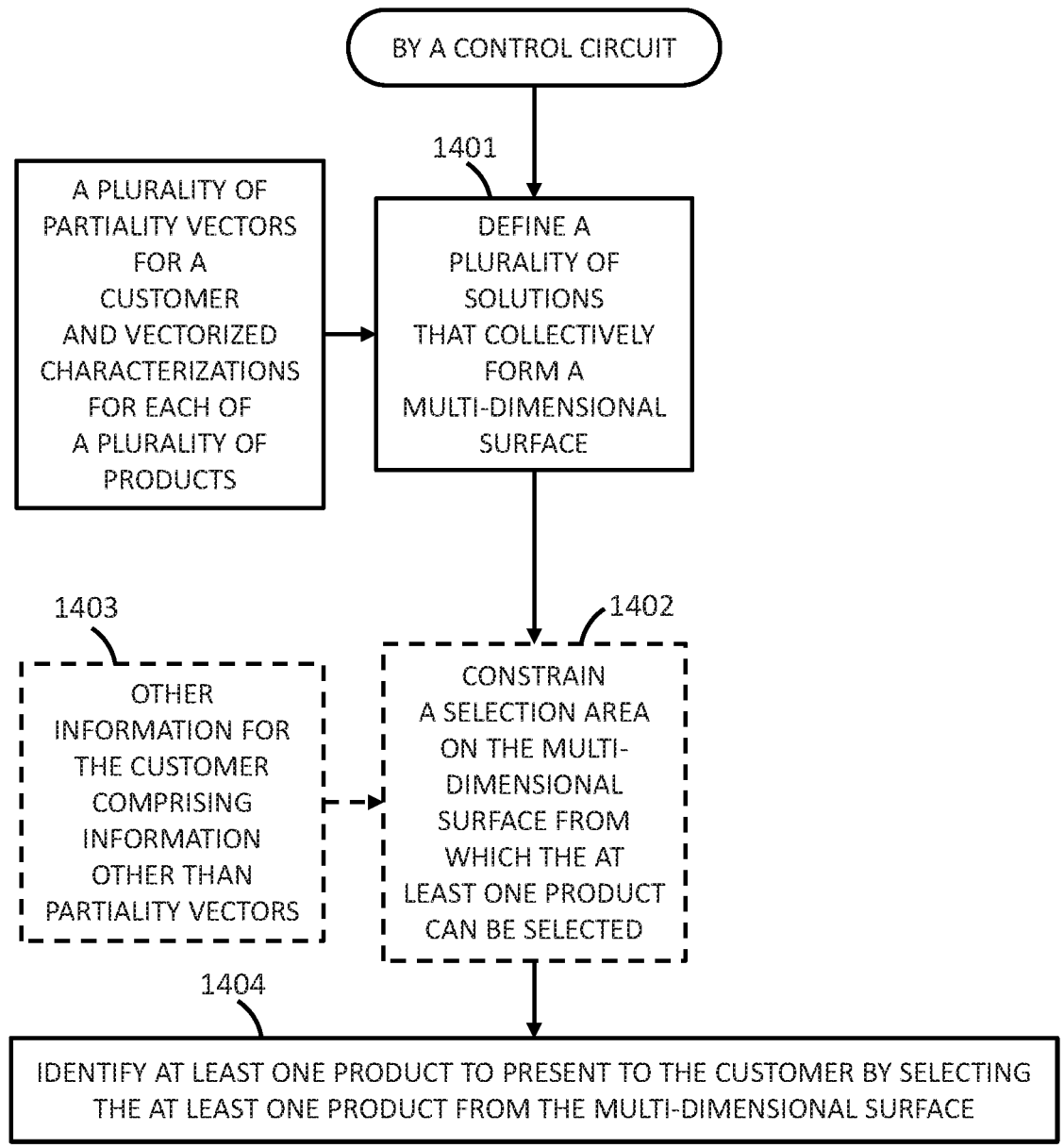
FIG. 14 comprises a flow diagram as configured in accordance with various embodiments of these teachings.
Figure 15:
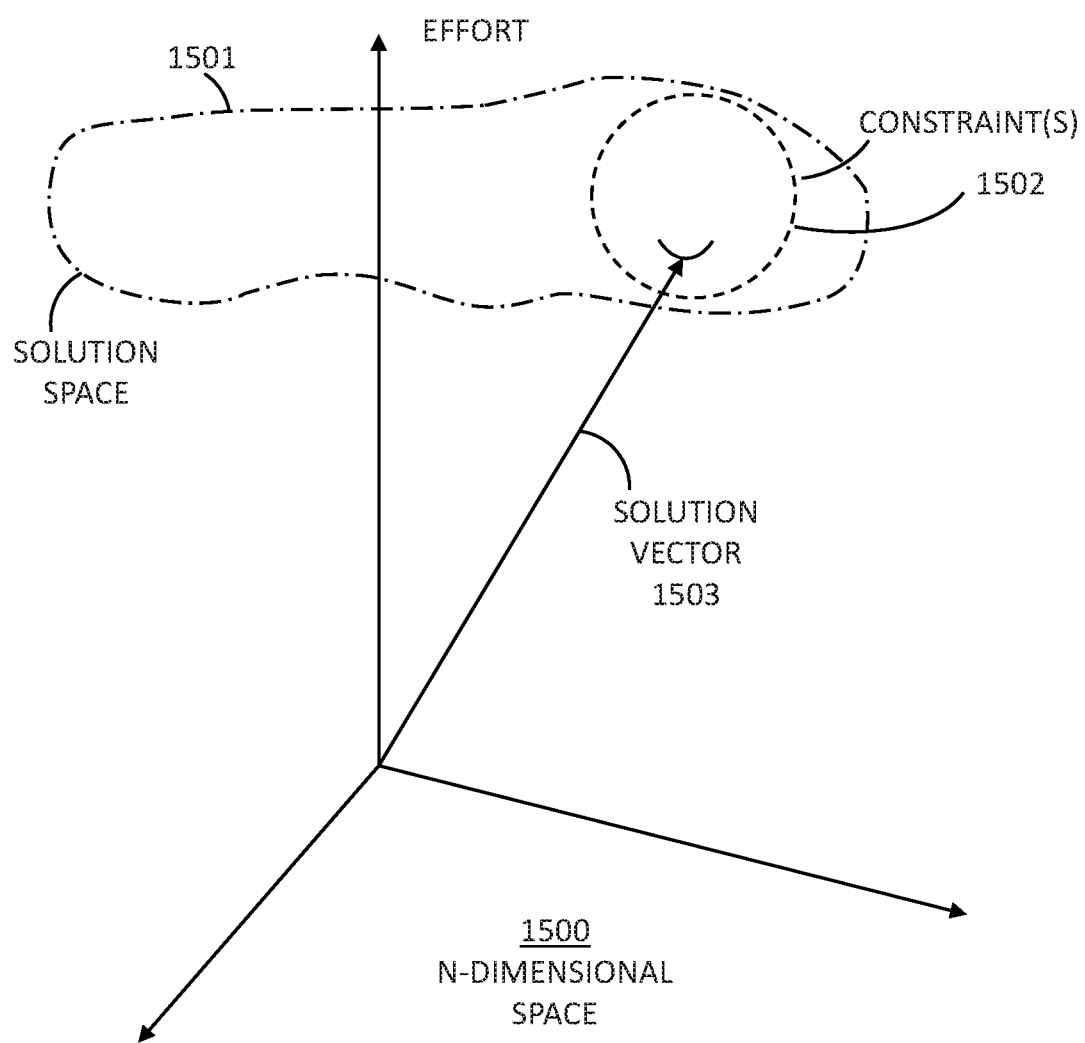
FIG. 15 comprises a graph as configured in accordance with various embodiments of these teachings.

By one approach, and referring now to FIG. 14, the control circuit 1301 is configured to use the aforementioned partiality vectors 1307 and the vectorized product characterizations 1304 to define a plurality of solutions that collectively form a multidimensional surface (per block 1401). FIG. 15 provides an illustrative example in these regards. FIG. 15 represents an N-dimensional space 1500 and where the aforementioned information for a particular customer yielded a multi-dimensional surface denoted by reference numeral 1501. (The relevant value space is an N-dimensional space where the belief in the value of a particular ordering of one's life only acts on value propositions in that space as a function of a least-effort functional relationship.)

Generally speaking, this surface 1501 represents all possible solutions based upon the foregoing information. Accordingly, in a typical application setting this surface 1501 will contain/represent a plurality of discrete solutions. That said, and also in a typical application setting, not all of those solutions will be similarly preferable. Instead, one or more of those solutions may be particularly useful/appropriate at a given time, in a given place, for a given customer.

With continued reference to FIGS. 14 and 15, at optional block 1402 the control circuit 1301 can be configured to use information for the customer 1403 (other than the aforementioned partiality vectors 1307) to constrain a selection area 1502 on the multi-dimensional surface 1501 from which at least one product can be selected for this particular customer. By one approach, for example, the constraints can be selected such that the resultant selection area 1502 represents the best 95th percentile of the solution space. Other target sizes for the selection area 1502 are of course possible and may be useful in a given application setting.

The aforementioned other information 1403 can comprise any of a variety of information types. By one approach, for example, this other information comprises objective information. (As used herein, "objective information" will be understood to constitute information that is not influenced by personal feelings or opinions and hence constitutes unbiased, neutral facts.)

One particularly useful category of objective information comprises objective information regarding the customer. Examples in these regards include, but are not limited to, location information regarding a past, present, or planned/scheduled future location of the customer, budget information for the customer or regarding which the customer must strive to adhere (such that, by way of example, a particular product/solution area may align extremely well with the customer's partialities but is well beyond that which the customer can afford and hence can be reasonably excluded from the selection area 1502), age information for the customer, and gender information for the customer. Another example in these regards is information comprising objective logistical information regarding providing particular products to the customer. Examples in these regards include but are not limited to current or predicted product availability, shipping limitations (such as restrictions or other conditions that pertain to shipping a particular product to this particular customer at a particular location), and other applicable legal limitations (pertaining, for example, to the legality of a customer possessing or using a particular product at a particular location).

At block 1404 the control circuit 1301 can then identify at least one product to present to the customer by selecting that product from the multi-dimensional surface 1501. In the example of FIG. 15, where constraints have been used to define a reduced selection area 1502, the control circuit 1301 is constrained to select that product from within that selection area 1502. For example, and in accordance with the description provided herein, the control circuit 1301 can select that product via solution vector 1503 by identifying a particular product that requires a minimal expenditure of customer effort while also remaining compliant with one or more of the applied objective constraints based, for example, upon objective information regarding the customer and/or objective logistical information regarding providing particular products to the customer.

So configured, and as a simple example, the control circuit 1301 may respond per these teachings to learning that the customer is planning a party that will include seven other invited individuals. The control circuit 1301 may therefore be looking to identify one or more particular beverages to present to the customer for consideration in those regards. The aforementioned partiality vectors 1307 and vectorized product characterizations 1304 can serve to define a corresponding multi-dimensional surface 1501 that identifies various beverages that might be suitable to consider in these regards.

Objective information regarding the customer and/or the other invited persons, however, might indicate that all or most of the participants are not of legal drinking age. In that case, that objective information may be utilized to constrain the available selection area 1502 to beverages that contain no alcohol. As another example in these regards, the control circuit 1301 may have objective information that the party is to be held in a state park that prohibits alcohol and may therefore similarly constrain the available selection area 1502 to beverages that contain no alcohol.

Figure 16:
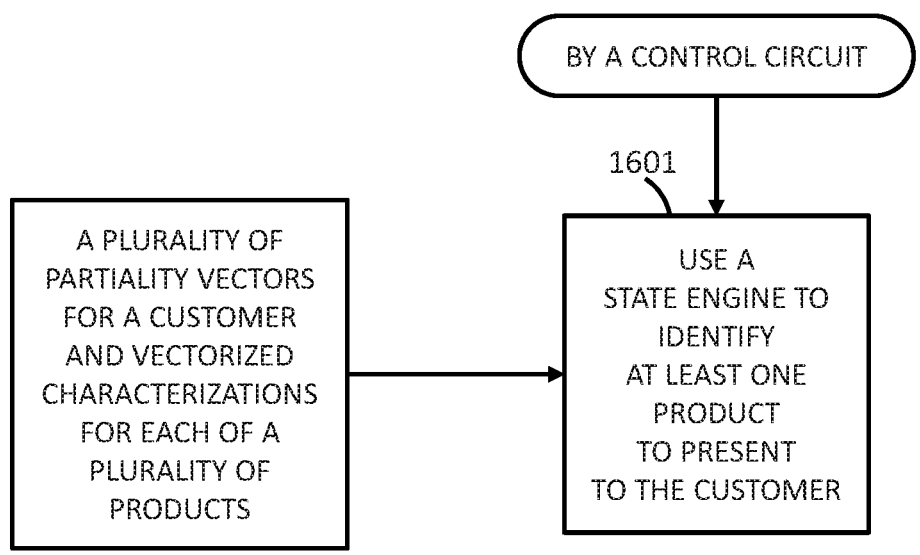
FIG. 16 comprises a flow diagram as configured in accordance with various embodiments of these teachings.

As described above, the aforementioned control circuit 1301 can utilize information including a plurality of partiality vectors for a particular customer along with vectorized product characterizations for each of a plurality of products to identify at least one product to present to a customer. By one approach 1600, and referring to FIG. 16, the control circuit 1301 can be configured as (or to use) a state engine to identify such a product (as indicated at block 1601). As used herein, the expression "state engine" will be understood to refer to a finite-state machine, also sometimes known as a finite-state automaton or simply as a state machine.

Generally speaking, a state engine is a basic approach to designing both computer programs and sequential logic circuits. A state engine has only a finite number of states and can only be in one state at a time. A state engine can change from one state to another when initiated by a triggering event or condition often referred to as a transition. Accordingly, a particular state engine is defined by a list of its states, its initial state, and the triggering condition for each transition.

Figure 17:
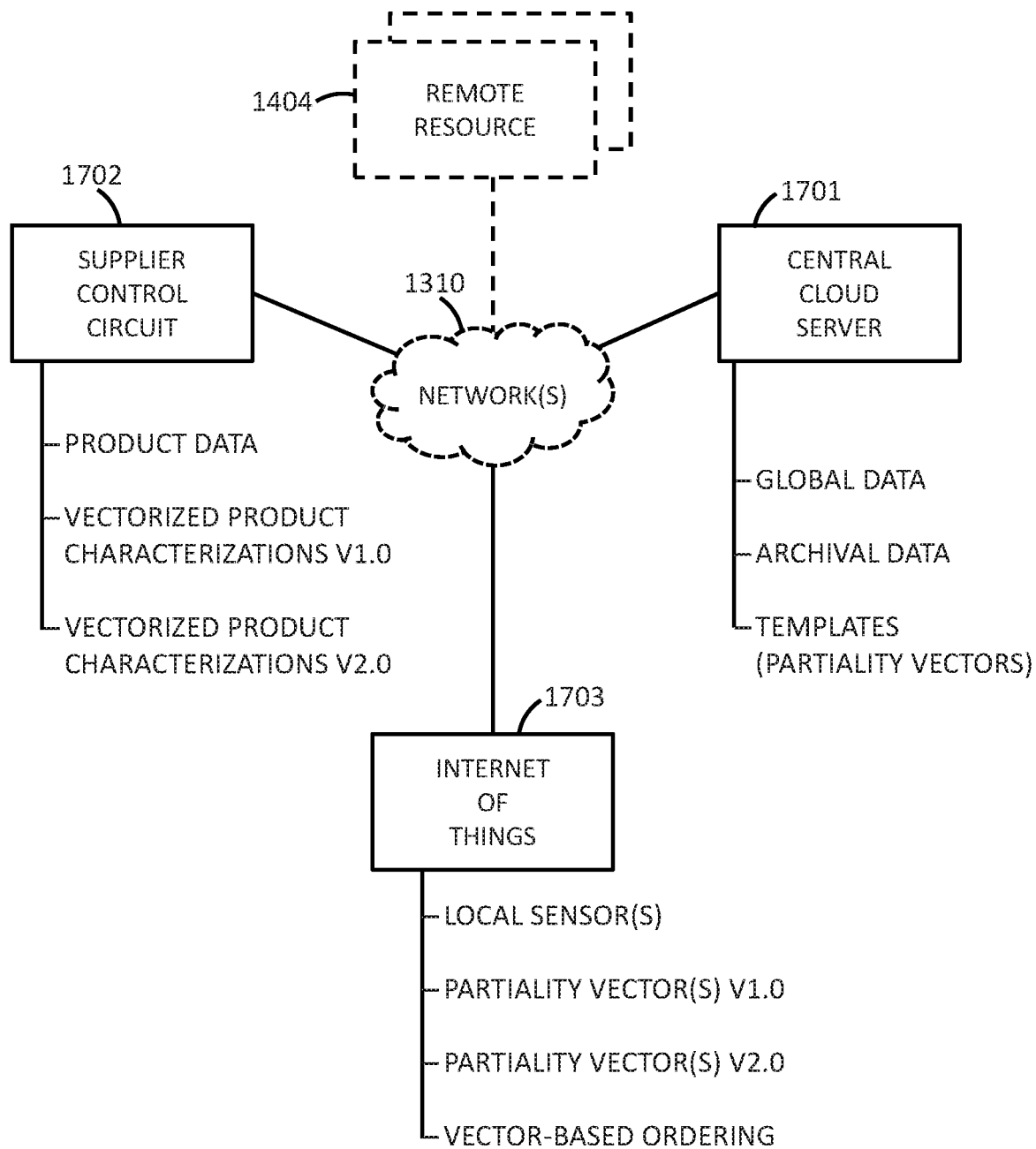
FIG. 17 comprises a block diagram as configured in accordance with various embodiments of these teachings.

It will be appreciated that the apparatus 1300 described above can be viewed as a literal physical architecture or, if desired, as a logical construct. For example, these teachings can be enabled and operated in a highly centralized manner (as might be suggested when viewing that apparatus 1300 as a physical construct) or, conversely, can be enabled and operated in a highly decentralized manner. FIG. 17 provides an example as regards the latter.

In this illustrative example a central cloud server 1701, a supplier control circuit 1702, and the aforementioned Internet of Things 1703 communicate via the aforementioned network 1310.

The central cloud server 1701 can receive, store, and/or provide various kinds of global data (including, for example, general demographic information regarding people and places, profile information for individuals, product descriptions and reviews, and so forth), various kinds of archival data (including, for example, historical information regarding the aforementioned demographic and profile information and/or product descriptions and reviews), and partiality vector templates as described herein that can serve as starting point general characterizations for particular individuals as regards their partialities. Such information may constitute a public resource and/or a privately-curated and accessed resource as desired. (It will also be understood that there may be more than one such central cloud server 1701 that store identical, overlapping, or wholly distinct content.)

The supplier control circuit 1702 can comprise a resource that is owned and/or operated on behalf of the suppliers of one or more products (including but not limited to manufacturers, wholesalers, retailers, and even resellers of previously-owned products). This resource can receive, process and/or analyze, store, and/or provide various kinds of information. Examples include but are not limited to product data such as marketing and packaging content (including textual materials, still images, and audio-video content), operators and installers manuals, recall information, professional and non-professional reviews, and so forth.

Another example comprises vectorized product characterizations as described herein. More particularly, the stored and/or available information can include both prior vectorized product characterizations (denoted in FIG. 17 by the expression "vectorized product characterizations V1.0") for a given product as well as subsequent, updated vectorized product characterizations (denoted in FIG. 17 by the expression "vectorized product characterizations V2.0") for the same product. Such modifications may have been made by the supplier control circuit 1702 itself or may have been made in conjunction with or wholly by an external resource as desired.

The Internet of Things 1703 can comprise any of a variety of devices and components that may include local sensors that can provide information regarding a corresponding user's circumstances, behaviors, and reactions back to, for example, the aforementioned central cloud server 1701 and the supplier control circuit 1702 to facilitate the development of corresponding partiality vectors for that corresponding user. Again, however, these teachings will also support a decentralized approach. In many cases devices that are fairly considered to be members of the Internet of Things 1703 constitute network edge elements (i.e., network elements deployed at the edge of a network). In some case the network edge element is configured to be personally carried by the person when operating in a deployed state. Examples include but are not limited to so-called smart phones, smart watches, fitness monitors that are worn on the body, and so forth. In other cases, the network edge element may be configured to not be personally carried by the person when operating in a deployed state. This can occur when, for example, the network edge element is too large and/or too heavy to be reasonably carried by an ordinary average person. This can also occur when, for example, the network edge element has operating requirements ill-suited to the mobile environment that typifies the average person.

For example, a so-called smart phone can itself include a suite of partiality vectors for a corresponding user (i.e., a person that is associated with the smart phone which itself serves as a network edge element) and employ those partiality vectors to facilitate vector-based ordering (either automated or to supplement the ordering being undertaken by the user) as is otherwise described herein. In that case, the smart phone can obtain corresponding vectorized product characterizations from a remote resource such as, for example, the aforementioned supplier control circuit 1702 and use that information in conjunction with local partiality vector information to facilitate the vector-based ordering.

Also, if desired, the smart phone in this example can itself modify and update partiality vectors for the corresponding user. To illustrate this idea in FIG. 17, this device can utilize, for example, information gained at least in part from local sensors to update a locally-stored partiality vector (represented in FIG. 17 by the expression "partiality vector V1.0") to obtain an updated locally-stored partiality vector (represented in FIG. 17 by the expression "partiality vector V2.0"). Using this approach, a user's partiality vectors can be locally stored and utilized. Such an approach may better comport with a particular user's privacy concerns.

It will be understood that the smart phone employed in the immediate example is intended to serve in an illustrative capacity and is not intended to suggest any particular limitations in these regards. In fact, any of a wide variety of Internet of Things devices/components could be readily configured in the same regards. As one simple example in these regards, a computationally-capable networked refrigerator could be configured to order appropriate perishable items for a corresponding user as a function of that user's partialities.

Presuming a decentralized approach, these teachings will accommodate any of a variety of other remote resources 1704. These remote resources 1704 can, in turn, provide static or dynamic information and/or interaction opportunities or analytical capabilities that can be called upon by any of the above-described network elements. Examples include but are not limited to voice recognition, pattern and image recognition, facial recognition, statistical analysis, computational resources, encryption and decryption services, fraud and misrepresentation detection and prevention services, digital currency support, and so forth.

As already suggested above, these approaches provide powerful ways for identifying products and/or services that a given person, or a given group of persons, may likely wish to buy to the exclusion of other options. When the magnitude and direction of the relevant/required meta-force vector that comes from the perceived effort to impose order is known, these teachings will facilitate, for example, engineering a product or service containing potential energy in the precise ordering direction to provide a total reduction of effort. Since people generally take the path of least effort (consistent with their partialities) they will typically accept such a solution.

As one simple illustrative example, a person who exhibits a partiality for food products that emphasize health, natural ingredients, and a concern to minimize sugars and fats may be presumed to have a similar partiality for pet foods because such partialities may be based on a value system that extends beyond themselves to other living creatures within their sphere of concern. If other data is available to indicate that this person in fact has, for example, two pet dogs, these partialities can be used to identify dog food products having well-aligned vectors in these same regards. This person could then be solicited to purchase such dog food products using any of a variety of solicitation approaches (including but not limited to general informational advertisements, discount coupons or rebate offers, sales calls, free samples, and so forth).

As another simple example, the approaches described herein can be used to filter out products/services that are not likely to accord well with a given person's partiality vectors. In particular, rather than emphasizing one particular product over another, a given person can be presented with a group of products that are available to purchase where all of the vectors for the presented products align to at least some predetermined degree of alignment/accord and where products that do not meet this criterion are simply not presented.

And as yet another simple example, a particular person may have a strong partiality towards both cleanliness and orderliness. The strength of this partiality might be measured in part, for example, by the physical effort they exert by consistently and promptly cleaning their kitchen following meal preparation activities. If this person were looking for lawn care services, their partiality vector(s) in these regards could be used to identify lawn care services who make representations and/or who have a trustworthy reputation or record for doing a good job of cleaning up the debris that results when mowing a lawn. This person, in turn, will likely appreciate the reduced effort on their part required to locate such a service that can meaningfully contribute to their desired order.

These teachings can be leveraged in any number of other useful ways. As one example in these regards, various sensors and other inputs can serve to provide automatic updates regarding the events of a given person's day. By one approach, at least some of this information can serve to help inform the development of the aforementioned partiality vectors for such a person. At the same time, such information can help to build a view of a normal day for this particular person. That baseline information can then help detect when this person's day is going experientially awry (i.e., when their desired "order" is off track). Upon detecting such circumstances these teachings will accommodate employing the partiality and product vectors for such a person to help make suggestions (for example, for particular products or services) to help correct the day's order and/or to even effect automatically-engaged actions to correct the person's experienced order.

When this person's partiality (or relevant partialities) are based upon a particular aspiration, restoring (or otherwise contributing to) order to their situation could include, for example, identifying the order that would be needed for this person to achieve that aspiration. Upon detecting, (for example, based upon purchases, social media, or other relevant inputs) that this person is aspiring to be a gourmet chef, these teachings can provide for plotting a solution that would begin providing/offering additional products/services that would help this person move along a path of increasing how they order their lives towards being a gourmet chef.

By one approach, these teachings will accommodate presenting the consumer with choices that correspond to solutions that are intended and serve to test the true conviction of the consumer as to a particular aspiration. The reaction of the consumer to such test solutions can then further inform the system as to the confidence level that this consumer holds a particular aspiration with some genuine conviction. In particular, and as one example, that confidence can in turn influence the degree and/or direction of the consumer value vector(s) in the direction of that confirmed aspiration.

All the above approaches are informed by the constraints the value space places on individuals so that they follow the path of least perceived effort to order their lives to accord with their values which results in partialities. People generally order their lives consistently unless and until their belief system is acted upon by the force of a new trusted value proposition. The present teachings are uniquely able to identify, quantify, and leverage the many aspects that collectively inform and define such belief systems.

A person's preferences can emerge from a perception that a product or service removes effort to order their lives according to their values. The present teachings acknowledge and even leverage that it is possible to have a preference for a product or service that a person has never heard of before in that, as soon as the person perceives how it will make their lives easier they will prefer it. Most predictive analytics that use preferences are trying to predict a decision the customer is likely to make. The present teachings are directed to calculating a reduced effort solution that can/will inherently and innately be something to which the person is partial.

Pursuant to various embodiments, systems, apparatuses and methods are provided herein useful to provide a more convenient shopping experience by pre-filling a customer's shopping cart according to the customer partialities in a user profile that are compared or matched with products having a similar or compatible identified vectorized product characterizations. These suggested retail items may be those which a consumer or shopper was already likely to purchase, items they might like to purchase given the customer's inclinations, or it may include retail items on which the customer might be interested in receiving additional information. To expedite or facilitate the improved shopping experience, the shopping carts may be loaded or prepared when a customer is within a particular store's vicinity or when a customer is detected within a certain distance from the store. Alternatively, the shopping carts may be prepared in a particular requested time frame at a particular requested location.

By pre-filling a shopping cart, a customer or shopper is able to reduce the amount of time spent shopping in a physical retail facility, which are sometimes quite large and/or sprawling. This can be particularly beneficial if the suggested items loaded into the customer's cart would be out of the way for the customer. In addition, by providing suggested retail items that are loaded into a customer's physical shopping cart, the customer may avoid shopping in certain areas of the store that are inconvenient or maybe problematic for the customer or those accompanying the customer. For example, parents with children may be able to have products pre-loaded into their carts that allow them to avoid visiting areas near or around a toy department of a retail shopping facility.

In some embodiments, a shopping system directed to pre-filling shopping carts with retail items prior to a customer's arrival at the physical retail shopping facility includes a user database of user profiles having one or more partialities associated with the customers or users therein, a product database of retail products with identified vectorized product characterizations, a plurality of physical shopping carts, and a control circuit. By one approach, the control circuit is configured to access the user database and the product database and identify one or more suggested retail items for a particular customer based, in part, on comparisons between the identified partialities for that customer in their user profile and the identified vectorized product characterizations of the retail products. Further, in one embodiment, one of the plurality of the shopping carts designated for a particular customer is filled with one or more suggested retail items prior to the particular customer's arrival at the physical retail facility.

By one approach, the system includes a staging area with numerous shopping carts designated for use by particular customers and having suggested retail items for the particular customers loaded therein. In one illustrative example, the staging area is a location near the entrance or exit, wither inside or outside, of the physical retail facility such that the shoppers or customers may easily retrieve their designated shopping carts just before they begin shopping within the facility.

In one illustrative embodiment, the physical retail facility has a rejection bin where customers may deposit unwanted suggested retail items. By one approach, the rejection bin includes a bin sensor configured to detect placement of the unwanted suggested retail items therein. Furthermore, in one exemplary embodiment, the control circuit is configured to update the one or more partialities for a given customer in the user database, in part, on the particular customer placing one of the unwanted suggested retail items into the rejection bin.

As used herein, the shopping carts may include baskets with wheels, flatbed carts, bins, and handheld baskets, among others that are moved around a retail facility or location. Further, the retail facility may be any type of shopping facility or location in which products are displayed, for sale, and/or distributed at numerous points around the facility such that the customer travels through the space to retrieve desired products. Further, the facility may be any of a number of sizes or formats and may include products from one or more merchants. For example, a facility may be a single store operated by one merchant or may be a collection of stores covering multiple merchants such as a mall.

In one illustrative approach, the system includes one or more point of sale terminals in communication with the control circuit such that the system can update the user profile and the user's partialities associated with the particular customer based, in part, on retail products purchased by the particular customer at the point of sale terminal and the vectorized product characterizations associated with the purchased retail products.

As suggested above, the shopping carts may be loaded or prepared when a customer is within a particular store's vicinity or when a customer is detected within a certain distance from the store. In this manner, the control circuit may receive location information from the particular customer indicating that the customer is approaching the retail facility, such as by indicating that the customer is within a certain distance from the facility or that the customer is in the parking lot of the facility. By another approach, a customer's electronic user device may notify the facility when the device's navigation system has set the facility as a destination.

In another embodiment, the shopping carts may be prepared by a particular time and at a particular requested location. In this manner, the control circuit is configured to receive, from the particular customer, a collection time and a collection location for picking up the customer's designated shopping cart with at least one suggested retail item.

In one approach, the user profiles in the database include a purchase history. Further, in one approach, the purchased retail products have vectorized product characterization associated therewith that impact the partialities associated with the user in the user profile. Accordingly, in one approach, the control circuit is configured to identify the one or more suggested retail items based, in part, on the purchase history of a particular customer.

As used herein the shopping system may be implemented at a number of retail shopping facilities and the control circuit may be configured to update the user database according to purchases at multiple retail facilities. Further, in addition to purchases made at physical retail facilities, the shopping system may update the user database in light of purchases made online, via a mobile application, or over the phone, among other shopping methods.

In one exemplary embodiment, the partialities may be represented by partiality vectors and can include values, preferences, and affinities. Further, the shopping system may identify customer or user partialities using data obtained from other sources outside of a customer's purchase history. For example, partialities may be identified based on calendar appointments, charitable donations, shopping habits, age, and profession, among many others, a few of which are outlined below. Accordingly, the user database may be updated according to the partialities identified outside of the purchase history.

Given the information in the user database and the product database, the control circuit, in one approach, is configured to analyze the partiality vectors and the vectorized product characterizations and identify overlap therebetween. The suggested retail products may be determined based on this overlap. In this manner, the suggested retail products for a given customer may change based on changes in the user and product databases. For example, a change to the product database, such as the addition of a particular new product, may result in the particular new product being a suggested retail item for a particular customer, even though this suggested retail item was not previously purchased by the particular customer.

In operation, the method may include maintaining a database of user profiles with partialities and a product database with identified vectorized product characterizations or product vectors associated therewith. By one approach, the method includes identifying one or more suggested retail items for a particular customer based, in part on comparisons between the identified partialities of the user profile and the identified vectorized product characterizations of the retail products and loading some or all of these suggested retail products into a designated shopping cart before the customer arrives at the physical retail shopping facility.

Figure 18:
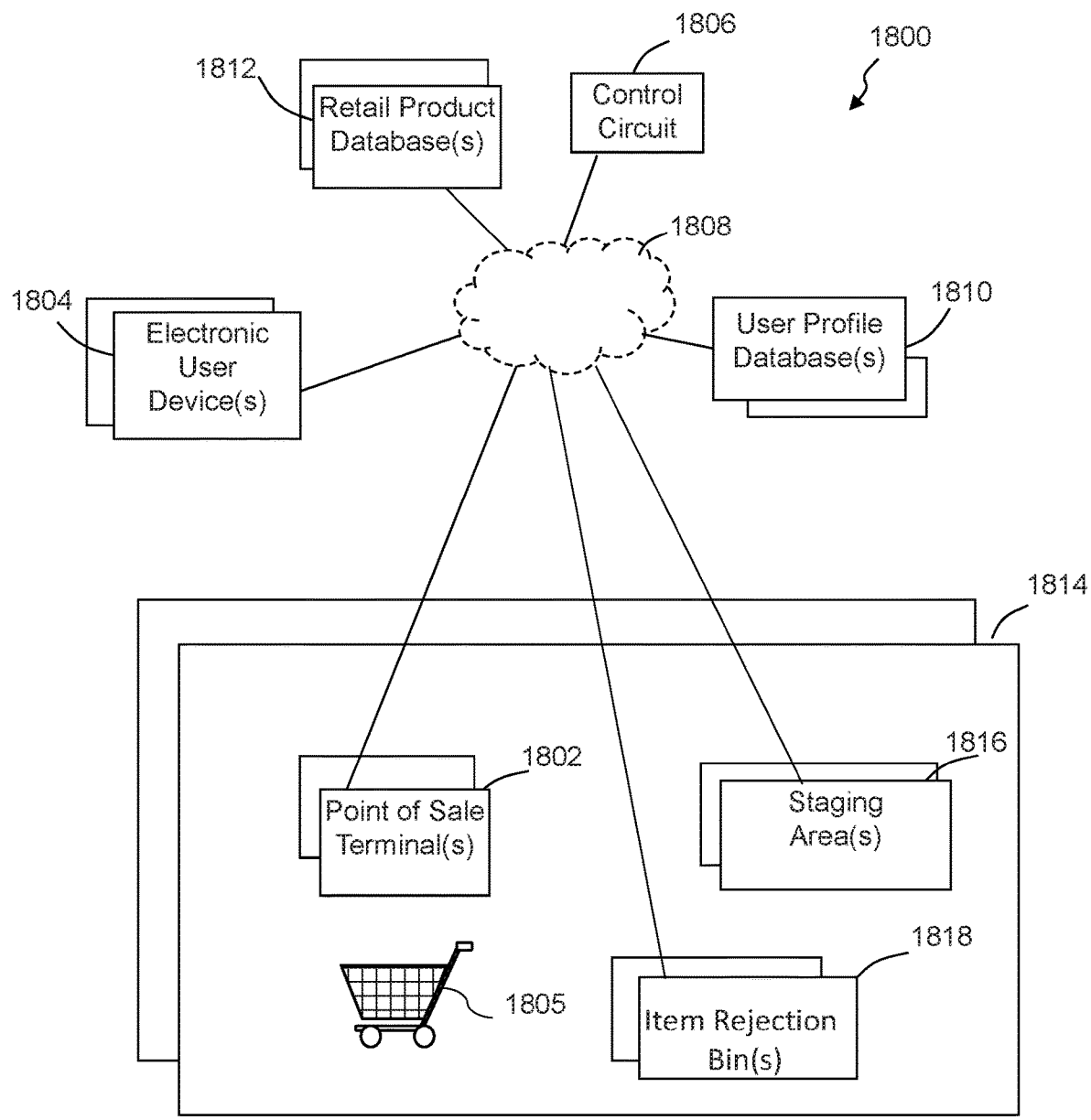
FIG. 18 is schematic diagram in accordance with some embodiments.

FIG. 18 illustrates a simplified block diagram of an exemplary shopping system 1800, according to some embodiments, which provides for pre-filling shopping carts 1805 according to a customer's partialities that can be represented by partiality vectors characterizing a customer's values, preferences, and affinities. The shopping system 1800 includes a user profile database 1810 (which may be similar to the memory 1306 of the vectorized characterizations 1307 of individual persons 1308), a retail product database 1812 with retail products having identified vectorized product characterizations or product vectors (which may be similar to the library 911 or the memory 1303 with vectorized characterizations 1304 for products 1305), and a central computer or a central computer or control circuit 1806 (which may be similar to other control circuits discussed herein). The control circuit 1806 is configured to access the databases 1810, 1812 to identify one or more suggested retail items for a particular customer based, in part, on comparisons with the partialities of a particular customer and the identified vectorized product characterizations of the retail products. Further, one of the shopping carts 1805 at a physical retail facility can be filled with one or more of the suggested retail items prior to the customer arriving at the shopping facility.

In one approach, the user profiles in the user profile database 1810 include a purchase history. Further, one or more of the purchased retail products have at least one identified partiality associated therewith. In one approach, the control circuit is configured to identify the suggested retail items based, in part, on the purchase history of a particular customer by having the partialities identified with the purchased items associated with the customer. The user profiles in the database also may have partialities associated therewith based on other information, such as, for example, the rejection of a suggested item or demographic information, among many others. Other partialities may be identified by receiving specific requests from a customer, such as receiving a notification from a customer that they do not wish to have produce pre-loaded into their cart. By one approach, these request are received from the customer when the customer retrieves the pre-loaded cart or when the customer checks out at a point of sale terminal.

In one illustrative example, a customer may desire not to take a route through the store that brings the customer within the vicinity of the toy department, and this could be indicated in their user profile in the database 1810 such that the suggested retail items may include previously purchased items and other suggested retail items in the vicinity of the toy department. By one approach, indications in the user profile may be specifically provided by the customer or may be inferred based customer actions, such as the time or day of the week in which the customer typically shops.

As used herein the shopping system may be implemented at a number of retail shopping facilities 1814 and the control circuit 1806 may be configured to update the user profile database 1810 according to purchases at multiple retail facilities. As noted above, the partialities may be represented by partiality vectors and can include values, preferences, and affinities. Further, as suggested above, the shopping system 1800 may identify user partialities using data obtained from other sources outside of a customer's purchase history. For example, partialities may be identified based on calendar appointments, charitable donations, age, and profession, among many others. Accordingly, the user database may be updated according to the partialities identified outside of the purchase history.

Given the information in the user database and the product database, the control circuit, in one approach, is configured to analyze the partiality vectors and the vectorized product characterizations and identify overlap therebetween. The suggested retail products may be determined based on this overlap. In this manner, the suggested retail products for a given customer may change based on changes in the user and product databases. For example, a change to the product database or the user database, may result in the different suggested retail items for a particular customer.

By one approach, the system 1800 includes a staging area 1816 with numerous shopping carts 1805 designated for use by particular customers and having suggested retail items for the particular customers loaded therein. In one illustrative example, the staging area is near the entrance or exit, either inside or outside, of the physical retail facility 1814. The staging area 1816 may be the location where the shopping carts 1805 are pre-filled and the area where the shopping carts are held until being retrieved by particular customers.

In one illustrative embodiment, the physical retail facility has a rejection bin 1818 where customers may deposit unwanted suggested retail items. By one approach, the rejection bin 1818 includes a bin sensor configured to detect placement of the unwanted suggested retail items therein. Furthermore, the control circuit may be configured to update the one or more partialities in the user profile database 1810 based, in part, on the particular customer placing one of the unwanted suggested retail items into the rejection bin and the bin sensor detecting the placement and notifying the control circuit 1806 accordingly.

In one illustrative approach, the system 1800 includes one or more point of sale terminals 1802 in communication with the control circuit 1806 such that the system 1800 can update the user profile associated with the particular customer based, in part, on retail products purchased by the particular customer at the point of sale terminal 1802 and the vectorized product characterizations associated with those purchased retail products.

In one illustrative example, the shopping carts 1805 are loaded or prepared when a customer is within a particular store's vicinity or when a customer is detected within a certain distance from the store. In this manner, the control circuit 1806 may receive location information from the particular customer indicating that the customer is approaching the retail facility, such as by indicating that the customer is within a certain distance from the facility or that the customer is in the parking lot of the facility. In one illustrative example, a customer's electronic user device 1804 may notify the facility when the device's navigation system has set the facility as a destination. In yet another illustrative example, a customer or user may notify the control circuit 1806 of arrival information by using an application or mobile feature of an electronic user device 1804. In this manner, the shopping cart 1805 may be prepared for a user by a particular time and at a particular requested location. To that end, the control circuit 1806 is configured to receive, from the particular customer via the electronic user device 1804, a requested collection time and a collection location that the customer wishes to retrieve the shopping cart with suggested retail items.

Alternatively, the control circuit 1806 may analyze the information in the user profile database 1810 to estimate when and where a customer is likely to shop at a particular physical retail facility 1814 and may instruct the staging area 1816 to prepare or load a shopping cart 1805 with suggested retail items according to the overlap between the customer's vectorized partialities and the identified vectorized characterizations of the retail products.

As illustrated in FIG. 18, the control circuit 1806, the electronic user device 1804, the user profile database 1810, the retail product database 1812, the shopping cart staging area 1816, the item rejection bin 1818, and the point of sale terminal 1802, if present, may be communicatively coupled, either directly or indirectly, such as over one or more distributed communication networks 1808, which may include, for example, LAN, WAN, Internet, cellular, Wi-Fi, and other such communication networks or combinations of two or more of such networks.

Figure 19:
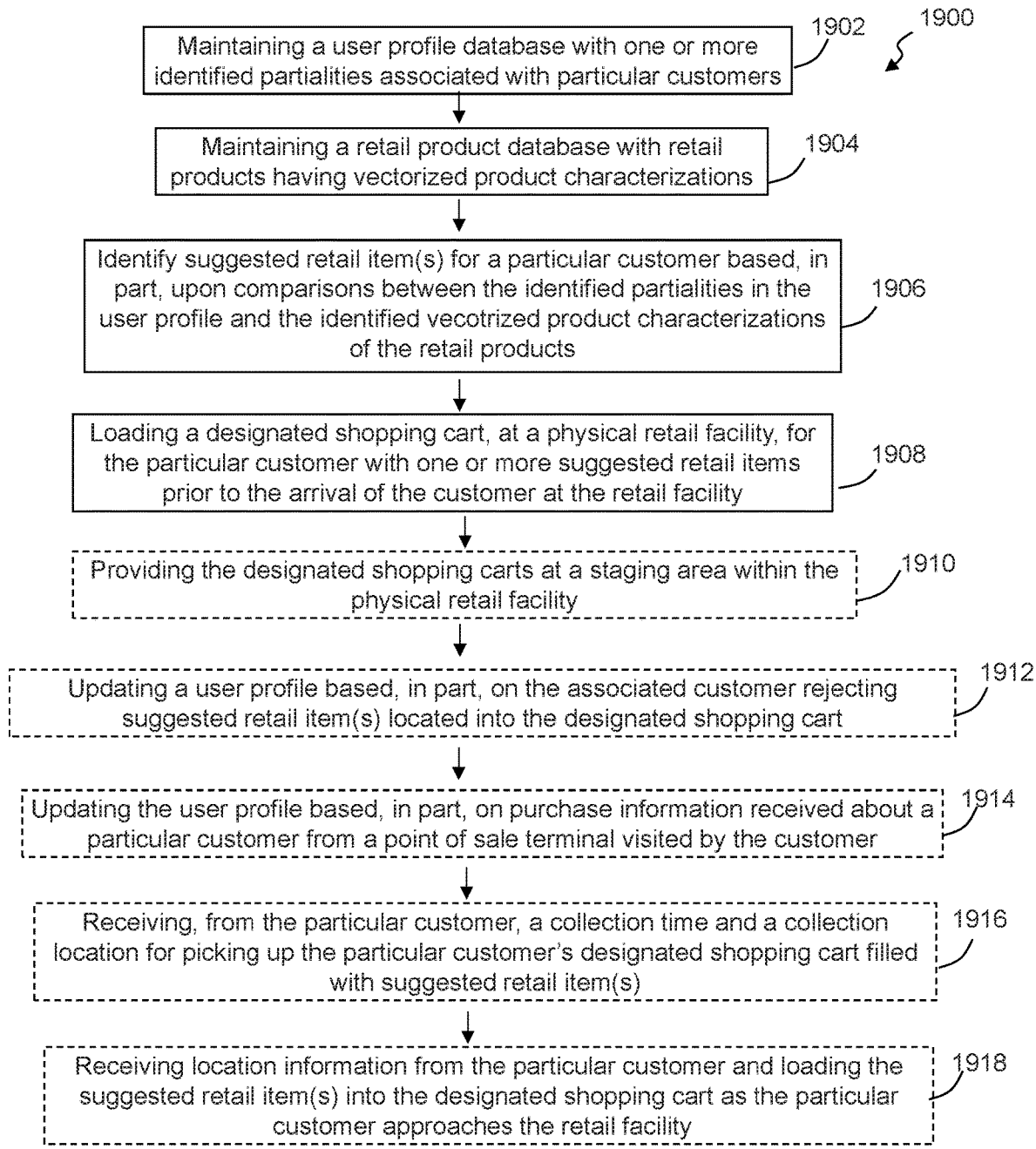
FIG. 19 is a flow diagram in accordance with some embodiments.

Referring now to FIG. 19, a process 1900 for pre-filling shopping carts 1805 within a physical retail facility 1814 according to some embodiments discussed herein is illustrated. The method 1900 includes, for example, maintaining 1902 a user profile database with one or more identified partialities associated with particular customers. As noted above, the partialities may be represented by partiality vectors such that a customer's values, preferences, and affinities are captured in the particular user profile in the database. Also, the user profile may include numerous partiality vectors for a particular customer.

The method 1900 also includes maintaining 1904 a retail product database with retail products having vectorized product characterizations. In one illustrative approach, a particular retail product in the retail product database 1904 may have numerous vectorized product characterizations associated therewith.

By one approach, the method 1900 includes identifying 1906 one or more suggested retail items for a particular customer based, in part, upon comparisons between the identified partialities in the user profile and the identified vectorized product characterizations of the retail products. Furthermore, in step 1908, the method includes loading some or all of these suggested retail products into a designated shopping cart 1805 before the customer arrives at the physical retail shopping facility.

In step 1910, the method may include providing the designated shopping carts at a staging area within the physical retail facility 1814. By one approach, the staging area 1816 is disposed near an entrance or exit of the retail facility 1814.

In step 1912, the method may include updating a user profile based, in part, on the associated customer rejecting a suggested retail item that was pre-loaded into the designated shopping cart. In this manner, the partialities in the user profile are updated to indicate that the customer did not wish to purchase a suggested item.

In step 1914, the method may include updating the user profile based, in part, on purchase information received about a particular customer from a point of sale terminal 1802 at which the customer purchased retail items. By one approach, the control circuit may receive such purchase information from other stores or online shopping services and update the user profile accordingly.

In step 1916, the method may include receiving from a particular customer a collection time and a collection location for picking up a designated shopping cart filled with suggested retail items. As noted above, this can be accomplished a number of ways, such as, for example, through a user's electronic device.

In step 1918, the method may include receiving location information from a customer and loading suggested retail items into a designated shopping cart as the customer approaches the retail facility, which can be determined in a number of manners as discussed above.

Pursuant to various embodiments, systems, apparatuses and methods are described herein that enhance customers' retail shopping experiences at a retail shopping facility. The system comprises a retail environment control system with one or more control circuits that identify customers that are present at a retail shopping facility, and access a customer profile database that maintains customer profiles for each of multiple different customers. Each customer profile includes at least a set of customer partiality vectors corresponding to the customer and are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order. The system further identifies a set of recommended products each having at least a threshold relationship between corresponding product partiality vectors and one or more of a set of partiality vectors associated with a customer. A recommendation listing of the set of recommended products can be generated and communicated to cause the recommendation listing to be presented to the corresponding customer while that customer is still physically at the shopping facility.

Some embodiments utilize the partiality vectors in improving a customer shopping experience. This can be extended to shopping within a retail shopping facility to on-line shopping and beyond. Further, some embodiments utilize the partiality vectors to identify products that are likely to be of interest and/or purchased by a customer and provide information to the customer while the customer is physically at a shopping facility to enhance the customer's shopping experience.

Figure 20:
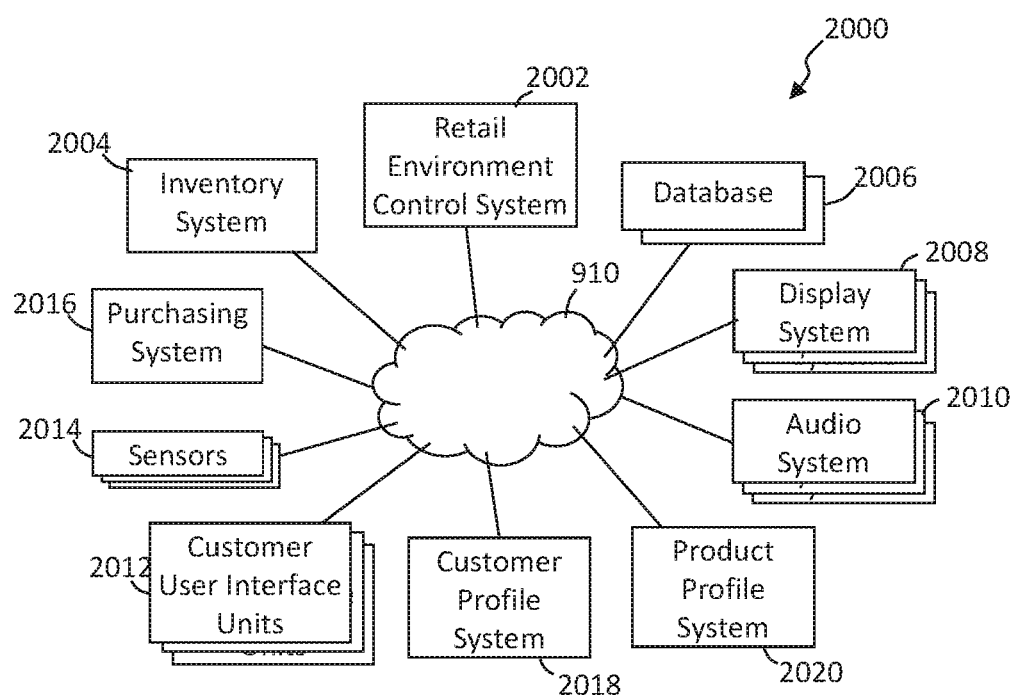
FIG. 20 illustrates a simplified block diagram of a retail system, in accordance with some embodiments.

FIG. 20 illustrates a simplified block diagram of a retail system 2000, in accordance with some embodiments. The retail system 2000 includes a retail environment control system 2002 that is communicatively coupled with one or more inventory systems 2004 and one or more databases 2006 over one or more distributed computer and/or communication networks 1310. The databases 2006 can include one or more product databases storing at least product partiality vectors 1304, and one or more customer databases that include customer partiality vectors 1307. The system 2000 further includes one or more display systems 2008 and audio systems 2010 that are located at the retail shopping facility and typically strategically placed in various locations throughout at least the sales floor of the retail facility. The retail environment control system further communicatively couples with one or more sensor systems 2014 that can detect movement, recognize customers, track customer movement, and the like. For example, the sensor systems may include camera, motion sensors, radio frequency identifier (RFID) sensors, wireless signal sensors (e.g., Wi-Fi access points), other such sensor systems, and typically a combination of two or more of such sensor systems. In some embodiments, the retail environment control system is further configured to wirelessly communicate with customers' user interface units 2012 (e.g., smart phones, tablets, and other such mobile devices).

The retail system 2000 typically include one or more purchasing systems 2016 that enable a retail entity to receive payment from a customer purchasing one or more products through the retail system 2000. In some embodiments, the system includes a customer profile system 2018 that receives, generates, maintains and updates customer information associated with multiple different customers, including customer partiality vector information. The customer profiles generated and/or maintained by the customer profile system may be stored in memory 1306 as part of a customer database and/or customer profile database. The system may include a product profile system 2020 that receives, generates, maintains and updates product information and/or profiles associated with multiple different products, including product partiality vector information. The product information generated and/or maintained by the product profile system 2020 may, in some implementations, be stored in memory 1303 as part of a product database and/or product profile database. In some embodiments, the inventory system 2004 provides some of the product information to be used by the product profile system in assembling and maintaining product profiles and/or partiality vector information.

The retail environment control system 2002, at least in part, controls information provided to customers while the customers are shopping at a retail shopping facility to help the customer identify products of interest and/or products a customer is likely to purchase. Further, in some embodiments, the retail environment control system uses sensor information received from one or more sensors 2014 to determine, in part, when and what product and/or marketing information to present to a particular customer. This information can be presented through the display and/or audio systems 2008, 2010, and/or the customers' user interface units. The customers' user interface units may wirelessly communicate with the retail environment control system through cellular, Wi-Fi, Bluetooth, other such wireless communication methods, or combination of two or more of such methods.

The retail environment control system in part uses customer partiality vectors and their association with one or more product partiality vectors of products to identify products that the customer is likely to purchase, and from those products identify a set of one or more products that system is to recommend or market to a particular customer as the customer travels through the retail shopping facility. Further, the retail environment control system can identify and/or track a customer's location within the shopping facility to identify when a customer is near, within a threshold distance of and/or approaching one or more of the products intended to be recommended to the customer through the display and/or audio systems and/or the customer's user interface unit.

The retail environment control system in part controls aspects of a shopping facility and/or communicates with customers' user interface units 2012 to enhance customers' shopping experiences. In some embodiments, the retail environment control system identifies customers that are present at a retail shopping facility. The identification can be through one or more methods such as facial and/or body image recognition, detecting a communication from a customer's previously registered user interface unit and/or the customer's user interface unit logging into a local area network at the shopping facility (e.g., a Wi-Fi, network, Bluetooth network, etc.), the customer identifying her/himself (e.g., by scanning/swiping a retailer supplied customer card, scanning/swiping a credit card, entering a user name and/or password at a station or kiosk, other such methods, or combination of such methods), RFID detection of a customer assigned RFID tag (e.g., key ring, card, etc.), finger print analysis, voice analysis, other such methods or combination of two or more of such methods.

Using sensor information from the one or more sensors 2014, the retail environment control system can further detect and/or track customers' movements through the shopping facility. Again, the sensor information can include facial and/or body recognition, tracking movement of a customer's user interface unit 2012 (e.g., by tracking Wi-Fi access points with which the user interface unit communicates, receiving GPS coordinates, RFID detection and/or transmission from the user interface unit, other such methods of combination of such methods), RFID signals (e.g., specific to a customer (e.g., customer's keychain, a card specific to a customer, etc.), on a shopping cart that the retail environment control system as identified is associated with one or more specific customers, etc.), other such methods, or combination of two or more of such methods.

The retail environment control system further includes and/or accesses mapping information of the retail shopping facility that includes specific location and/or placement information of products within the shopping facility. In some embodiments, this product location information may be maintained by the inventory system 2004. The system further has specific location and/or placement information of multiple display systems and/or audio systems (or parts of such display systems or audio systems that can be separately controlled). For example, in some embodiments, the system 2000 includes multiple display devices (e.g., televisions, computers, computer monitors, etc.) that are positioned and at various locations distributed throughout at least some portions of the shopping facility. The display devices may be of substantially any size and positioned at substantially any location (including potentially any height). As a further example, relatively small display devices maybe portable and temporarily fixed directly on a shelf in front of products placed on that shelf, other display devices mounted within the floor of an isle with a protective surface over the top allowing customers to walk over and/or push shopping carts over the display, mounted from the ceiling, mounted at the end of isles, and/or placed in other locations. In some instances, the display devices include audio devices as part of the audio system(s). Additionally or alternatively, separate speakers or other such audio output and/or input devices can be positioned at various locations throughout the shopping facility. The precise location of each display device and audio device (whether part of or separate from a display device) can be known and mapped in the mapping of the shopping facility. Additionally or alternatively, some embodiments include display and/or audio systems attached with shopping carts, riding-scooters, or other devices that customers use while moving through the shopping facility. Location information can be communicated from these portable display and/or audio devices to the retail environment control system (e.g., based on GPS, detected locations from encoded light information, scanning of location codes (e.g., location bar codes and/or RFID signals), other such location information, or combination of such information).

Similarly, some embodiments receiving location information and/or track a relative location of customers' user interface units. As described above, the system can receive GPS data from the user interface units, detect access to a wireless network access point, other such methods, or combination of such methods. The retail environment control system can use the customers' locations and/or determined direction of travel, and the location information of products to identify products that are relevant to the customer's location and/or a location the customer is approaching and that the customer is more likely to be interested in and purchase.

In some embodiments, the retail environment control system accesses customer partiality vectors. For example, the retail environment control system may access a customer profile database that maintains a customer profile for each of multiple different customers. The customer profiles may include a set of customer partiality vectors corresponding to the customer. Again, the customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order. In some embodiments, the use of the partiality vectors attempts to minimize stress in customers' lives. Often stress is a function of time that is inefficiently used and/or wasted, wasted physical effort, wasted mental thought, doing things that are in opposition with a customer's partialities, etc. These elements of stress include objective data (e.g., purchase history, weather, standard time needed to prepare a meal, etc.) and subjective data (e.g., looking at social media and other public behavior to determine a consumer profile and/or partiality vectors. By identifying products that have threshold alignment with customers' partiality vectors, the system can identify solutions that may minimize customers' stress, and satisfy the needs of the customers.

The retail environment control system can evaluate product partiality vectors relative to a customer's one or more partiality vectors. A set of one or more recommended products can be identified that each have at least a threshold relationship between corresponding product partiality vectors and one or more of customer partiality vectors associated with the customer. The relationships between customers' partiality vectors and product partiality vectors can be based on the directional aspect, the magnitude aspect, or some combination of the directional and magnitude aspects. In some instances for example, the correlation should satisfy a threshold directional correlation or alignment and a magnitude threshold. The thresholds may vary between customers and/or products. Further, the thresholds may be sliding thresholds such that when a greater correlation between one of the directional aspect or the magnitude aspect is identified, a lower threshold for the other of the magnitude aspect or directional aspect has to be met to consider the product to be sufficiently consistent with that customer and/or the customer's partiality vectors. Again, those products and/or services that align with a customer's partiality vector are typically those products and/or services that are determined to be perceived by a customer as provide a significant benefit or the most benefit to that customer.

Based the identification of products that correspond with the customer's partiality vectors the system can identify one or more products that correspond to a customer's current location or a location that the customer is approaching. For example, the system may identify a set of one or more recommended products that each have at least one product partiality vector that has a threshold relationship with one or more of the customer's partiality vectors, and are further within a threshold distance of the customer's current location and/or is located at a location within the shopping facility where the customer is predicted to be within a threshold period of time based on a previous route travelled by the customer and a rate of travel through the shopping facility. In some embodiments, the retail environment control system generates a recommendation listing of a set of one or more recommended products, which may include and/or define accesses to recommendation content corresponding to one or more products of the recommendation listing. The recommendation content may include information about a product, marketing information, and other such information.

In some embodiments, the retail environment control system causes the recommendation listing and/or other relevant information corresponding to the set of recommended products and causes the recommendation listing to be presented to the corresponding customer while the customer is still physically at the shopping facility. This can include causing the recommendation listing or a portion of the recommendation listing to be communicated to one or more display systems 2008 and/or audio systems 2010 that are within a rendering threshold distance of the customer. For example, the retail environment control system may detect that a customer is entering an isle that includes laundry detergents, and cause a display system at the beginning of the isle to display a recommendation listing and/or other relevant product information regarding an identified laundry detergent that has one or more partiality vectors that are within a threshold alignment of one or more of the customer's partiality vectors.

Additionally or alternatively, in some embodiments, the retail environment control system may wirelessly communicate the recommendation listing or part of the recommendation listing of the set of recommended products to a mobile user interface unit associated with the customer and causes content representative of the recommendation listing to be displayed on the user interface unit. The recommended information and/or listing may be displayed and/or audibly played back through a customer's user interface unit, by accessing a web site, by implementing application software (APP) that receives content, information, instructions and/or code to cause the rendering of the recommendation information, or other such software implemented on a user interface unit. Accordingly, the retail environment control system can cause web pages to be generated and distributed to customers' user interface units, cause content, information, instructions and/or code to be communicated to user interface units, other such communications, or a combination of two or more of such communications. The recommendation content can include the code, graphics information, organization information and the like to be present the recommendation information corresponding to products that have partiality vectors that have at least a threshold alignment with one or more of the customer's partiality vectors.

Again, the information presented to the customer typically corresponds in part to the customer's location within the shopping facility while the recommendation information (e.g., recommendation listing, marketing information, product information, highlighted information, etc.) is displayed and/or audibly played back to the customer. Some embodiments establish one or more boundaries and/or geo-fences relative to and/or about display and/or audio systems and/or strategic locations throughout the shopping facility. The boundaries can in part correspond to one or more threshold distances from a display and/or audio system, a strategic location, or the like. Again, in some embodiments, a series of multiple display systems (and/or audio systems) are each positioned at different locations throughout the shopping facility. The retail environment control circuit can be configured to obtain the location of a customer within the shopping facility. In some instances, sensor information may be received from one or more sensors and/or from other relevant sources that indicate a customer's location within the shopping facility. The system can communicate the recommendation content and/or listing to a display system of the multiple display systems that is within a threshold distance of the obtained location of the customer. The threshold distance relative to a particular display system may vary depending on a direction the customer is traveling. For example, a first threshold distance may be associated with a display system when the customer traveling a first direction with the customer facing the display device, while a second threshold may be defined for the same display device when the customer is traveling in an opposite direction (e.g., the customer cannot see the display system when traveling in the opposite direction until very close to the display system).

Further, the system can include a series of multiple audio output systems 2010 that can be positioned at different locations throughout the shopping facility. The retail environment control system can obtain a location of the customer within the shopping facility communicate the recommendation listing to an audio output system of the multiple audio output systems that is within a threshold distance of the obtained location of the customer. The threshold distance corresponding to an audio system may, in some embodiments, be significantly less than threshold distance for displayed content as the audio may be distracting to other customers.

The recommendation content and/or listing can identify one or more products (e.g., a textually and/or audibly identify, and/or display and/or audibly playback corresponding trademark information, etc.), and display and/or audibly present characteristics of a product, display and/or audibly present marketing information, other such information, or combination of two or more of such information. In some embodiments, the retail environment control system identifies, from product information of a recommended product of the set of recommended products, at least a product partiality vector that has the threshold relationship with at least one of the customer's partiality vectors, and causes marketing information, representative of at least the identified product partiality vector associated with the recommended product, to be displayed as part of the recommendation listing being presented to the customer.

Further, the presentation of recommended product information is typically presented based on a customer's location within the shopping facility. A location of the customer within the shopping facility can be obtained and/or determined. This location information can be determined based on information from one or more sensor (e.g., image recognition based on image and/or video processing of images or video from a known camera directed at a known location within the shopping facility), RFID information from one or more RFID scanners, distance sensors, other such sensor information, and often a combination of sensor information from two or more sensors. Further, the location information may be based on a customer scanning a particular product using their user interface unit or a mobile scanning device may available by the shopping facility. Based in part on the scan, the system can identify the product and estimate a customer's location based on a known location of the scanned product within the shopping facility. In some instances, the system additionally uses other location information in combination with the scanned information to determine a location (e.g., previously identified that a customer was in a first location, and based on that first location determine that the customer is in a second location based on the scan and a relationship between the first location and the determined location of the scanned product).

The recommendation information and/or listing may, in some instances, be limited to emphasize products the retail environment control system anticipates the customer is more likely to purchase and/or for which the correlation between the product partiality vector and the customer's partiality vectors have a threshold correlation. Similarly, the environment control system may, in identifying the set of recommended products, identify each of the recommended products of the set of recommended products that each correspond to at least one product previously selected by the customer during the customer's current visit to the shopping facility. Further, the set of recommended products is typically identified based on the set of partiality vectors and on the location of the customer within the shopping facility.

In some embodiments, the retail environment control system further uses customer actions and/or feedback from the customer to determine a level of agreement between the recommended products, the products purchased, the correlation between product partiality vectors and customer's partiality vectors, and the accuracy of the customer's partiality vectors. The system may receive a response from the customer indicating a level of agreement of the recommendation corresponding to at least one recommended product of the set of recommended products. This feedback may be based on a customer purchasing the recommended product, the customer stopping to consider the recommended product relative to one or more threshold durations, the customer passing the recommended product without considering the product, the customer communicating a notice (e.g., a text message), a customer responding to an inquiry, other such feedback, or a combination of two or more of such feedbacks. In some embodiments, the retail environment control circuit can adjust one or more customer and/or product partiality vectors of a set of partiality vectors based on the level of agreement. In some embodiments, the retail environment control system can track a customer's movements relative to recommendation information provided to the customer (e.g., determine what products a customer looks at and/or considers), to determine whether to adjust partiality vectors, thresholds of alignment between product and customer partiality vectors, and the like. For example, the system can track a customer's behavior relative to recommendation information presented to the customer within the store to adjust partiality vectors.

Some embodiments cause marketing information to be displayed that corresponds to one or more products, and often correspond to products that have a threshold relationship with the customer's partiality vectors. One or more products may be identified, based on and/or from product information for one or more recommended products, that have at least one product partiality vector that has the threshold relationship with at least one of the first customer's partiality vectors. Marketing information consistent with product partiality vector(s) that has/have the relationship with the customer's partiality vector(s) can be identified and accessed. In some implementations, the marketing information may be included in and/or referenced in a product profile, identified in a database and associated with that customer and/or that partiality vector, or the like. Instructions, content and/or information can be communicated to a display and/or audio system, and/or a customer's user interface unit to cause the marketing information representative of at least a corresponding product partiality vector to be displayed in association with the recommendation information and/or listing.

Further, information that is more likely to be considered important to the customer and/or may more likely influence the customer in making a purchasing decision can be provided to the customer to help the customer identify products that are consistent with the customer's partiality vectors. For example, information about a product being developed without animal testing may be displayed in relation to a product when a customer has a strong partiality vector corresponding to animal rights and/or opposition to animal cruelty. The display of the information can simplify shopping for the customer because the customer is more easily able to identify products that customer likely wants to purchase. Further, the information may provide the customer the feeling that there is an emotional relationship with the retailer because the customer may feel that the retailer understands the customer and appreciates the customer's partialities and/or values. Some embodiments may further provide customized incentives to the customer based on an alignment of the incentive with the customer's partiality vectors and/or a prediction that a particular product, which has been identified to have product partiality vectors that align within one or more thresholds of the customer's partiality vectors, in attempt to get the customer to make a purchase. Similarly, the system may incentive the customer to share product information with one or more other potential customers.

The system, in some embodiments, can use subsequent purchases, products viewed and/or considered by the customer, customers' movements through the shopping facility in relation to recommendation information displayed or otherwise played back to the customers, products disregarded and/or ignored by the customer, and other such actions made by the customer to evaluate the impact and/or likelihood that the displayed product information had on the customer's purchases, and when relevant make adjustments to the future display of product information. Further, the actions taken by the customer, the product information, the product organization, and the like can be used as a feedback to the system to additionally or alternatively make adjustments, including adjustments to the directional aspect and/or magnitude aspect of one or more of the customer's partiality vectors and/or product partiality vectors.

In some embodiments, graphics, information, instructions and/or code are communicated to a user interface unit to cause the marketing information to be displayed as an emphasized characteristic of the one or more recommended products. For example, the marketing information may be highlighted, temporarily displayed over a graphically rendered image of the products, other such methods or combination of two or more such methods.

Some embodiments prioritize products relative to at least the customer's partiality vectors. Some embodiments determine product prioritization, at least in part, as a function of a level of correlation between the product partiality vectors of the multiple recommended products and a customer's set of partiality vectors. For example, in some embodiments, define greater priority to products that have a greater correlation with the customer's partiality vectors. Further, the priority is typically different for each customer for which partiality vectors are established. As such, different customers have different prioritized products, and product prioritization information defining a priority, a level of priority, a prioritization class, other such prioritization, or combination of two or more of such prioritization, can be generated based on the correlation between products' partiality vectors and a customer's partiality vectors.

Product prioritization information may further prioritize multiple recommended products of a set of recommended products. Some or all of the product prioritization information can be used in generating the recommendation information. The prioritization may further take into consideration customer's historic purchases, preferences and other aspects. Some embodiments identify, based on customer information (e.g., from the customer profile database, which may be part of the customer database 1306), product preferences corresponding to one or more of the multiple recommended products. The product preferences may, at least in part, correspond to a customer's historic tendency of purchasing one or more products over one or more secondary similar products that the customer has purchased. In some implementations, the product prioritization information can be determined, at least in part, as a function of the product preferences and the level of correlation between the product partiality vectors of multiple recommended products and the customer's set of partiality vectors.

Some embodiments further utilize customer's previous historic purchases and/or a purchase history in customizing the recommendation information and/or listing. For example, a customer's historic purchases can be used to identify customization parameters specific to the customer and correlated to purchased products. The customization parameters can be substantially any relevant parameter that defines aspects or features of products tended to be purchased by a customer. For example, the customization parameters may include one or more sizes of products (e.g., size(s) of pants that are purchased, size(s) of shoes that are purchased), colors that a customer tends to purchase, quantities the customer tends to purchase when products are available in different quantities (e.g., small quantities versus family pack size), and other such customization parameters. The customization parameters may be determined as an average, based on a percentage of purchases, recent changes in purchase patterns, other such aspects or combinations of such aspects. Further, some embodiments apply weightings to some purchases in determining a customization. For example, more recent purchases may be given greater weight than older purchases, consistent purchases may be given greater weight over individual or small number purchases, and other such weightings.

The retail environment control system can use the customization parameters to determine and/or modify recommendation information and/or listings corresponding to one or more of the set of recommended products and/or other products to be consistent with customization parameters and with available actual products. In some embodiments, the retail environment control system communicates with the inventory system 2004 to determine whether a recommended product (or other product) is available with characteristics that are consistent with the customization parameters. For example, the system may identify a pair of shoes that the system wants to recommend, and can access the inventory system and/or an inventory database to determine whether the recommended shoes are available in the size the customer typically purchases and/or in what colors are available. When the product is not available in a particular size the retail environment control system may not include the product as a recommended product or may cause a notification to be displayed in association with the displayed recommended product that the customer would have to wait for shipment.

In some embodiments, the retail environment control system 2002 accesses the databases 2006 to obtain the customer partiality vectors and product partiality vectors. The databases may be maintained by one or more retail entities, or maintained by a third party and accessible to the retail environment control system. The databases, in some applications, optimize the data storage and/or association between various partiality vectors. The databases may include one or more tables that increase flexibility, provide faster search times, and smaller memory requirements. For example, some embodiments the databases comprise series of interdependent cells, with a first set of cells associated with or defining a specific customer with a second set of customer partialities vectors that associate specific customers to relevant partiality vectors with magnitudes for each of the relevant partiality vectors specified within the cell associated between the specific customer and the relevant partiality vectors. In some embodiments, the same database further includes a set of cells associated with or defining a specific product that similarly cross reference the partiality vectors with magnitudes for each of the relevant partiality vectors specified within the cell associated between the specific product and the relevant partiality vectors. As such, cells are interdepending while reducing storage space, and speeding access to the relationships between customers, products and partiality vectors. In other embodiments, a separate product database is maintained with the cells defining the association between the specific products and the product partiality vectors. The system in evaluating products relative to customers can implement an optimized correlation analysis between the customer partiality database and the product partiality database to identify one of a correlation between one or more defined customer partiality vectors for a customer, and product partiality vectors for one or more products, and to further identify a threshold correlation between one of the directional aspect and the magnitude aspect of the customer's partiality vectors and the correlated one or more products. Further, in some applications, the database organization reduces memory by having customer partialities and product partialities reference the same direction and magnitude cells when they are the same.

The product partiality vectors may be provided and/or defined by a product manufacturer, distributor, supplier or other third party service. Further, in some applications, the retail environment control system 2000 may learn over time product partiality vectors. For example, the system may identify over time customers that purchase a particular product. Based on a commonality of one or more customer partiality vectors between customers purchasing the particular product, the retail environment control system may associate one or more product partiality vectors consistent with one or more of the common one or more customer partiality vectors. In some implementations, the retail environment control system may further receive input from one or more customers and/or workers identifying that a product should be associated with a particular product partiality vector. The retail environment control system may further consider the customer or worker submitting the request, and provide different levels of authority to different customers and workers to identify potential product partiality vectors.

Figure 21:
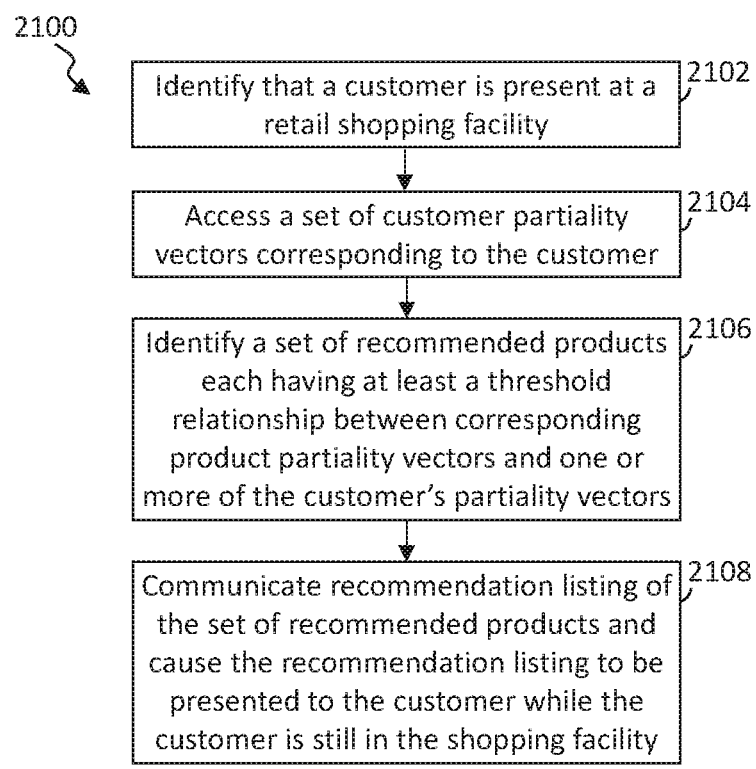
FIG. 21 illustrates a simplified flow diagram of a process of enhancing customers' retail shopping experiences, in accordance with some embodiments.

FIG. 21 illustrates a simplified flow diagram of a process 2100 of enhancing customers' retail shopping experiences, in accordance with some embodiments. In step 2102, one or more customer that are present at a retail shopping facility are identified. In step 2104, a customer profile database is accessed. In some embodiments, the customer profile database maintains a customer profile for each of multiple different customers, and each customer profile comprises a set of customer partiality vectors corresponding to the customer.

In step 2106, a set of one or more recommended products are identified that each have at least a threshold relationship between corresponding one or more product partiality vectors and one or more of a set of partiality vectors associated with the one or more customers. In step 2108, a recommendation listing of the set of recommended products is communicated causing the recommendation listing to be presented to the customer while the customer is still in the shopping facility. Some embodiments receive a response from the customer indicating a level of agreement of the recommendation corresponding to at least one recommended product of the set of recommended products. One or more partiality vector of the set of partiality vectors may, in some instances, be adjusted based on the level of agreement.

In some embodiments, the recommendation information, which may comprise a recommendation listing of the set of recommended products, is wirelessly communicated to a mobile user interface unit associated with an intended customer, and causes content representative of the recommendation information and/or listing to be displayed on the user interface unit. Some embodiments obtain a location of a customer within the shopping facility, and the recommendation listing can be communicated to one or more display systems that are within one or more threshold distances of the location of the customer. The system may include a series of multiple display systems that are each positioned at different locations throughout the shopping facility. Similarly, some embodiments communicate some or all of the recommendation information and/or listing to one or more audio output systems that are within one or more threshold distances of the location of the customer. In some embodiments, the system may include a series of multiple audio output systems each positioned at different locations throughout the shopping facility.

Some embodiments identify, from product information of one or more recommended product of the set of recommended products, at least one product partiality vector that has the threshold relationship with at least one of the customer's partiality vectors. The system can cause marketing information, representative of at least the product partiality vector associated with the recommended product, to be displayed as part of the recommendation information and/or listing being presented to the customer. In some embodiments, the customer's location can further be considered in identifying relevant products. The location of the customer within the shopping facility can be obtained, and one or more products of the set of recommended products may be identified based on the set of partiality vectors and on the location of the customer within the shopping facility. In some embodiments, the system in identifying the set of recommended products may identify each of the recommended products of the set of recommended products that each correspond to at least one product previously selected by the customer during the customer's current visit to the shopping facility.

In some embodiments, systems, apparatus and corresponding methods, comprise: a retail environment control circuit coupled with memory storing instructions that when executed by the control circuit cause the control circuit to: identify that a first customer is present at a retail shopping facility; access a customer profile database, wherein the customer profile database maintains a customer profile for each of multiple different customers, and each customer profile comprises a set of customer partiality vectors corresponding to the customer, wherein the customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order; identify a first set of recommended products each having at least a threshold relationship between corresponding product partiality vectors and one or more of a set of partiality vectors associated with the first customer; and communicate a recommendation listing of the first set of recommended products and causing at least a portion of the recommendation listing to be presented to the first customer while the first customer is still physically at the shopping facility.

Some embodiments comprise methods of enhancing customers' retail shopping experiences, comprising: by a retail environment control circuit: identifying that a first customer is present at a retail shopping facility; accessing a customer profile database, wherein the customer profile database maintains a customer profile for each of multiple different customers, and each customer profile comprises a set of customer partiality vectors corresponding to the customer, wherein the customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order; identifying a first set of recommended products each having at least a threshold relationship between corresponding product partiality vectors and one or more of a set of partiality vectors associated with the first customer; and communicating a recommendation listing of the first set of recommended products and causing the recommendation listing to be presented to the first customer while the first customer is still in the shopping facility.

Pursuant to various embodiments, systems, apparatuses and methods are provided herein useful to enhance customers' shopping experiences. Some embodiments provide a retail product presentation system associated with one or more retail shopping facilities where customers enter to purchase different retail products. The system includes a central control system that is communicatively coupled with one or more product attribute databases associated with the retail shopping facility. The product attribute database at least in part associates products available for purchase through the retail shopping facility with one or more product attributes that each define an attribute of the product (e.g., type of product, size of product, weight of product, quantity within a package, flavor, flavors, color, colors, shape, dimensions, materials, manufacturing and/or development attributes (e.g., where made, claim of no child labor, claim of no animal testing, etc.), claims of health and/or marketing (e.g., claim of not genetically modified, claim of "organic", etc.), other products that can use the product, other products that the product can use, other products that the product can be used with, other products that are associated with the product, etc.). The system can receive requested product information from a customer regarding one or more product attributes corresponding to a first type of product for which the customer is shopping. A set of products can be identified from the product attribute database that have product attributes that correspond to the received product attributes. A set or assortment of one or more different products can be selected from the set of products in response to the request. Based on the selected products, the system can cause at least one of each of the assortment of different products to be physically collected and positioned on at least one product support system of a plurality of product support systems at the shopping facility each configured to receive and support multiple products. The product support system and at least the assortment of the different products can be physically presented to the customer while at the shopping facility.

Figure 22:
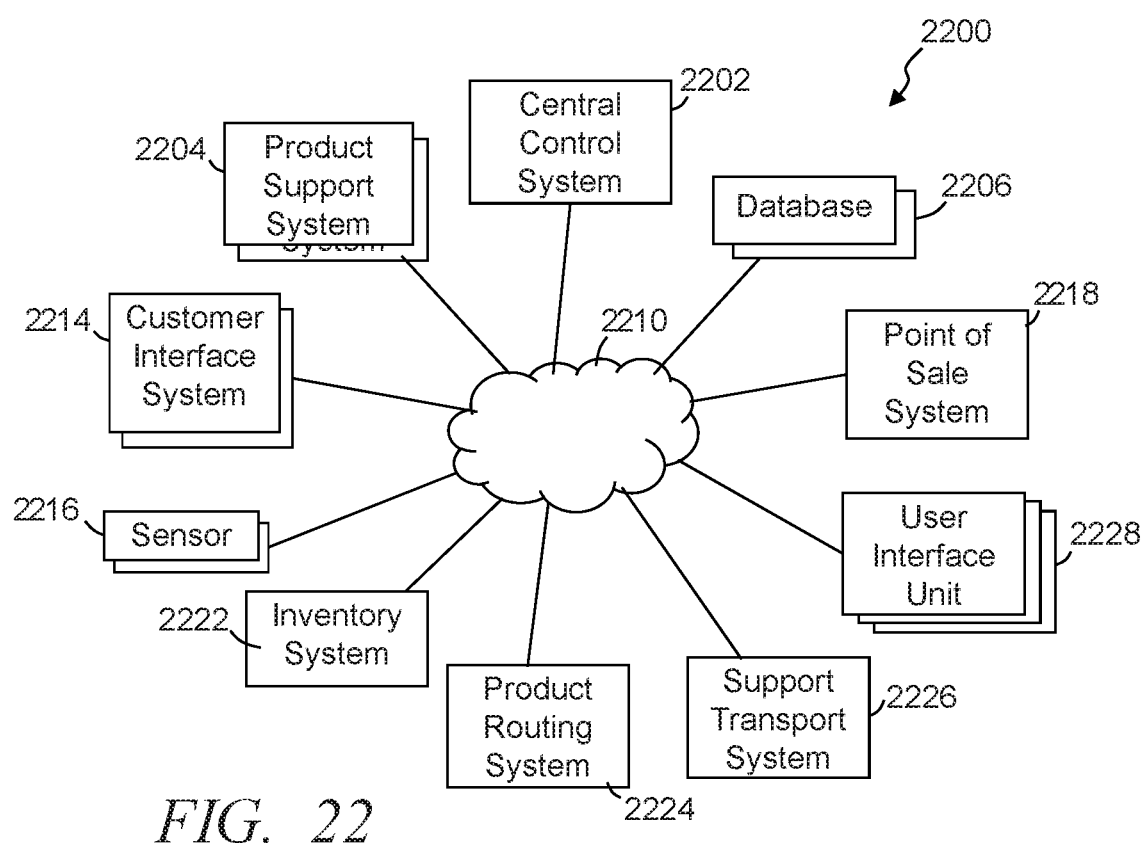
FIG. 22 illustrates a simplified block diagram of an exemplary retail system configured to physically present an assortment of products to customers, in accordance with some embodiments.

FIG. 22 illustrates a simplified block diagram of an exemplary retail system 2200 configured to physically present an assortment of products to customers, in accordance with some embodiments. The system includes one or more central control systems 2202 and multiple product support systems 2204. The central control system is communicatively coupled with one or more databases 2206 over a computer and/or communication network 2210. The databases can store and maintain substantially any relevant information for use by the system such as but not limited to one or more product attribute databases 2206, one or more partiality vector databases, one or more customer databases, one or more inventory databases, other such databases, and typically a combination of two or more of such databases.

In some embodiments, the retail system 2200 includes multiple customer or user interface systems 2214 that allow customers to interact with the system, such as entering product information and/or product attribute information of products that customers are interested in purchasing. Multiple sensors and/or sensor systems 2216 are typically included in the system and positioned at multiple different locations throughout a shopping facility (e.g., proximate entrances and exits, proximate customer interface systems 2214, proximate locations where product support systems are presented to customers, on product support systems, proximate product staging areas, distributed throughout a product storage area, other such locations, and typically two or more of such locations). One or more points of sale systems 2218 are further included in some embodiments to complete sales of products purchased by customers. Some embodiments include an inventory system 2222 that tracks quantities and/or locations of inventory throughout the shopping facility. The inventory system may, in some applications, further assist and implement product orders from a distribution center, fulfillment center, suppliers, manufacturers and/or other sources.

In some embodiments, the system may include one or more product routing systems 2224. The product routing system can direct the retrieval and routing of products from storage locations, such as in a back storage area of the shopping facility, to staging areas where products are to be positioned on product support systems 2204, to locations on the sales floor, from a loading bay to a storage location, from a loading bay to a location on the sales floor, and/or other such product routing. Routing instructions may be communicated to workers regarding a location where a product can be retrieved, quantity of the product, and/or instructions on where the product is to be routed. In some implementations, the product routing system can include one or more conveyor systems that can transport products, retrieval systems that can place products in storage locations and retrieve products from storage locations, forklift, drones and/or other such vehicles, and other such systems. Further, the product routing system can direct workers regarding the retrieval and placement of products in desired locations. One or more support transport system 2226 are included in some embodiments and are configured to transport the product support systems 2204 to and from storage locations, staging areas and product display locations. In some embodiments, some or all of the databases 2206, the point of sale systems 2218, support transport system 2226, product routing system 2224, inventory system 2222, customer interface system 2214, and/or other systems can be implemented through the central control system 2202.

Further, some embodiments enable communication with and/or include user interface units 2228 of workers of the shopping facility and/or customers. The user interface units can be one or more of a variety of user interface units including, but not limited to, mobile and/or handheld electronic devices such as so-called smart phones and portable computers such as tablet/pad-styled computers, laptops, computers, custom shopping facility units (e.g., scanners, two-way communication devices, etc.), and other such devices.

The product support systems 2204 are each configured to receive and physically support multiple products to be presented to the customers. The product support systems may include one or more shelves, racks, clamps, ramps and/or other such supports that can receive and support products. In some embodiments, the product support systems are configured to be transported between at least a staging area where products are loaded onto the product support systems and one or more viewing locations where a customer can be positioned to view selected products that have been placed onto one or more product support systems for consideration of purchase. In some embodiments, the product support systems are configured to cooperate with and be transported by the support transport system 2226, which may include one or more conveyor systems, drones, forklift type devices, and/or other such methods of transport. For example, the product support systems may include one or more couplers to at least temporarily couple with an overhead conveyor system that can move the product support system to an intended location, which may be based on instructions from the product routing system 2224, central control system 2202, customer interface systems 2214, or other source.

Some embodiments access and/or maintain one or more product attribute databases that associate products available for purchase through one or more retail shopping facilities with one or more product attributes that each define an attribute of the product. As presented above, these attributes define characteristics, features, marketing, claims and other such information about a product. Further, the attribute information in part can be used to identify products based on input from customers requesting products that have certain attributes or attributes that relate to certain attributes.

The central control system 2202 is configured to receive requested product information from customers regarding one or more product attributes corresponding to one or more types of products for which a customer is shopping and/or may be interested in purchasing. Such information may include, but is not limited to, categories of a product (e.g., breakfast cereal, produce, ice cream, frozen pizza, meat, drinks, etc.), sub-categories of products (e.g., fruit, vegetables, carbonated drink, sports drink, chicken, ground beef, ice cream bars, sugary breakfast cereal, high fiber breakfast cereal, etc.), information about an intended consumer, information about size, information about advertising claims, information about claimed benefits of a product, and/or other such attribute information. The product information and/or attribute information may be received through one or more customer interface systems 2214 at a shopping facility, a customer's user interface unit 2228, or other such source. In some embodiments, the system 2200 includes a plurality of customer interface systems 2214 distributed throughout the shopping facility and each configured to enable customers to enter product attributes and/or characteristics about products the customer is interested in purchasing and based on which assortments are selected. One or more customer interface systems may be located proximate locations where product support systems are presented to customers, while one or more other customer interface systems may be located away from an area where a product support system is presented to customers. The customer interface systems can include a user interface 216, which can include for example one or more displays, touchscreens, inputs (e.g., buttons, trackball, mouse, keyboard, etc.), and the like to allow the customer to view and enter information, select information, and/or select options presented to the customer.

The central control system can use the product attribute information to cause a search through the attribute database. A set of products can be identify from the product attribute database that have product attributes that correspond to the received product attributes and/or have at least one attribute of the customer specified attributes. In some instances, other related attributes can be identified based on the customer specified attributes. For example, a customer specified attribute may be closely related to one or more other attributes (e.g., a sub-category specified by a customer is closely related to one or more categories of which the sub-category is specified as being part of). Accordingly, one or more related attributes may further be identified and used in implementing a search through the product attribute database. Some embodiments may further access customer information corresponding to the customer submitting the request and identify one or more other attributes that correspond to or may relate to one or more attributes specified by the customer. The other attributes may be identified based on a customer's purchase history, previous product searches, previously specified product attributes, partiality vector associations, preferences, other such information, and often a combination of such information. Further, the set of products may be products the customer has purchased in the past, products the system identifies as products that the customer would be interested in, and/or other such products.

In some embodiments, an assortment of different products are selected from the set of products, which may include all of the set of products or a sub-set of one or more products of the set of products. The selection can be based on one or more factors such as but not limited to customer partiality vectors, customer's purchase history, customer's preferences, emphasis applied by a customer to one or more attributes, order attributes are entered, number of products within the set of products, number of products the system predicts the customer would want to consider, expected size of the product support system with which the products are to be positioned, number of products of one or more other selected assortments of yet other products that are to be supported by the product support system, other such factors, or a combinations of two or more of such factors. Typically, the different products of an assortment each have a relationship to one or more of the product attributes being considered, and often have a relationship with each of multiple product attributes. For example, the product attributes identified by the customer may specify: breakfast cereal, whole grain, and with fruit. Accordingly, multiple different products may be identified that each are a breakfast cereals (or a breakfast cereal bar, or other such product when relevant), that have a threshold quantity of whole grains and/or advertise whole grain or grains as a feature, and further include fruit (e.g., raisins, dried cranberries, dried apples, a paste of from dates, etc.). From the set of multiple products that have a threshold association with one or more of the product attributes, the system can select one or more of these product to define an assortment of products. Further, the system may identify multiple different sizes of boxes of product of the assortment (e.g., cereal). Accordingly, the selection of the assortment may further select product size, quantity, color, and/or other attributes, which may correspond to attributes specified and/or may be determined based on one or more factors, such as described above and further below.

Some embodiments maintain and/or access one or more partiality vector databases. These partiality databases can associates different customer identifiers each specific to a different customer and a set of customer partiality vectors corresponding to a respective one of the customer identifiers. Customer partiality vectors are directed quantities that each have both a magnitude and a direction. The direction represents a determined order imposed upon material space-time by a particular partiality. The magnitude represents a determined magnitude of a strength of the belief, by the corresponding customer, in a benefit that comes from that imposed order. Similarly, the partiality databases can includes product identifiers and corresponding product partiality vectors that can define an order that may be affected by the product and a magnitude of that affect. In selecting the assortment of different products, the central control system may access the one or more partiality vector databases and select the assortment of different products that each have at least a threshold relationship between corresponding product partiality vectors and one or more of the customer's partiality vectors. Further, in some embodiments, the central control system may consider inquiries from other customers in selecting products of an assortment.

As introduced above, some embodiments maintain and/or access a plurality of customer profiles each associated with a different customer. The customer profiles can, in part, maintain purchase history information. The central control system can use the purchase history information in selecting assortments of different products. Accordingly, the central control system can accesses a customer profile associated with a customer that is to be shown products, and can select an assortment of different products based on the purchase history information of that customer in accordance with the corresponding customer profile.

Some embodiments may further identify one or more products that are not part of the set of products but is considered to be related to and/or relevant to one or more products of a selected assortment of products. For example, the customer may specify an attribute of a "sleeping bag", and the system may use other information to determine that the customer is interested in camping and present other products related to camping onto the product support system to be presented to the customer in addition to the products of the assortment. Similarly, the central control system can identify common attributes across multiple different types of products that the customer is interested in. For example, the customer may have requested "tents" and "lanterns", and based on these requests can determine the customer may further be interested in bug spray. Accordingly, the central control system may select an assortment of bug stray and present the bug spray to the customer separate from or in cooperation with the tents and/or lanterns.

Based on the selected assortment, the central control system can cause at least one of each of the different products of the selected assortment to be physically collected and positioned on one or more product support systems. The number of products of each of the different products can depend on the number of products the customer indicated he/she is interested in purchasing, a predicted number of the product the customer is expected to purchase (e.g., based on purchase history, cost, duration between purchases, duration between visits to a shopping facility, etc.), size of the product support systems, and other such factor. The selected products are placed onto the product support system loading the product support system with specific products that the customer is interested in and/or predicted to be interested in viewing. When space permits, different assortments of products can be loaded onto a single product support system.

The central control system can further direct and cause the loaded product support system with the different products of the selected assortment of products to be physically presented to the customer while the customer is at the shopping facility and allowing the customer to physically interact with the products on the product support system. In some embodiments, the products can be loaded by workers and/or an automated system onto a product support system in view of the customer. In other implementations, a loaded product support system can be transported by the support transport system 2226 (e.g., a conveyor system, a worker, rotated, etc.) to a location where the customer is waiting or other location to which the customer is directed. For example, the customer may be standing at a customer interface system 2214, and one or more product support systems can be transported to a location behind and/or adjacent the customer interface system. In some instances, for instance, a staging area may be below a sales floor on which the customer is interacting with the customer interface system, and the one or more product support systems may be raised to the level of the sales floor. Similarly, the product support system may simply rotate to present the physical products to a customer. Further, the product support systems are typically transported to a location that is readily accessible to the customer so that the customer can look, pickup and consider the multiple different products of the assortment, as well as to easily reach and retrieve a desired number a product selected by the customer. In some instances, the customer may indicate through the customer interface system and/or an interface on the product support system the desire for one or more additional of a selected product when there is an insufficient number of the customer selected product.

Typically, the system enables multiple different customers to be simultaneously supported so that different assortments of products can be presented different customers. As such, one or more other assortments of different products can be physically collected for another customer. The central control system can cause the one or more other assortments of the different products to be physically presented to the other customer while the first assortment is physically presented to the first customer and at a physical location within the shopping facility that is different than a physical location where the first assortment is being presented to the first customer.

In some embodiments, the customer may indicate through the customer interface system, user interface unit 2228, and/or the system can detect through one or more sensors that the customer has completed consideration of the one or more assortments of products that were positioned on the product support system. The central control system can cause the product support system and/or the unselected products to be returned to a staging area and/or a reallocation area. In some instances, the central control system and/or the product routing system in cooperation with the inventory system can direct the products to be put into relevant storage locations. These locations can be recorded by the inventory system to be used in subsequent retrieval of products. In other embodiments, depending on the one or more assortments of products, the products may be left on the product support system, such as when the system knows and/or anticipates one or more other customers being interested in viewing the assortment of products. The anticipated interest can be based on one or more other customers that are in the shopping facility and/or expected to be visiting the shopping facility, and the customer profile, partiality vectors, purchase history, etc. of those one or more customers. Further, one or more products on the product support system may be replaced with other products based on a subsequent customer and/or attributes identified by the subsequent customer.

In some embodiments, one or more sensors 2216 are positioned relative to the product support system and configured to detect one or more product of one or more assortments of the different products selected from the product support system by the customer. The sensors can include substantially any relevant sensor, such but not limited to optical based scanning sensors to sense and read optical patterns (e.g., bar codes), radio frequency identification (RFID) tag reader sensors capable of reading RFID tags in proximity to the sensor, motion sensors, scales, cameras, image processing systems, other such sensors or combination of two or more of such sensors. The sensor systems can communicate product identifier information of the one or more products selected by the customer to the central computer system. The product identification information can be communicated to a point of sale system 2218 that can charge the customer for the product and obtain payment from the customer for at least the selected one or more products (e.g., based on a credit card previously or subsequently provided by the customer, based on a customer account, etc.). Further, some embodiments use the selection in subsequent evaluations in selecting products of an assortment.

As presented above, the customers can submit requests to view products having one or more product attributes. The customers can specify attributes through the customer interface systems 2214, customers' user interface units 2228, and/or other such subsystems. In some embodiments, customers can submit requests while remote from the shopping facility. Based on the request, the system can identify the set of one or more products corresponding to the attributes and select the assortment of one or more products. The assortment of products can be pre-staged prior to the customer entering the shopping facility and/or while the customer shops in one or more other areas of the shopping facility. In some embodiments, the central control system can receive, from a customer and prior to the customer entering the shopping facility, a listing of multiple different types of products that the customer is interested in purchasing. For each of the multiple different types of products, a separate assortment of one or more different products of that type of product can be selected. Each of the different assortments of the different products are directed to be physically collected. In some instances, when the customer submits the request with sufficient time, the assortments of different products can be collected prior to the customer entering the shopping facility, and positioned on one or more product support systems. These loaded product support systems can be stages in a staging area or other area to await the customer. Further, the system may enable the customer to schedule at time to visit the shopping facility, and the central control system can coordinate the staging of products for one or more customers based on the appointments of different customers. Customers scheduled to arrive at a later time and the product attributes submitted by these scheduled customers may further be considered in selecting products of an assortment for a first customer. For example, the system may select a product of an assortment for a first customer because it also corresponds with one or more attributes of a second customer.

The central control system may identify when the customer has entered and/or is in the shopping facility. This may be based on a communication from the customer, detecting the presence of a mobile user interface unit associated with the customer, detecting an RFID chip associated with a customer (e.g., in a customer card carried by the customer), the customer registering (e.g., through a customer interface system), voice recognition, facial recognition, other methods, or combination of two or more of such methods. In some instances, the central control system may communicate with the customer providing instructions on where the customer is to go within the shopping facility where the loaded one or more product support systems can be presented to the customer. Some embodiments may have a limited number of product presentation locations where loaded product support systems can be presented to customers. Further, some presentation locations may be larger than others, with smaller areas used to present a threshold number of products to a customer, while other larger presentation locations may be intended to present customers other threshold numbers of products. For example a first set of presentation locations may be configured to present less than 225 products, a second set of presentation location may be configured to present less than 230 products, and a third presentation location may be configured to present less than 2200 products. Further, while products are presented to a customer at a presentation location, further products may be staged on subsequent product support systems so that even when a customer intends to view more products than the threshold, one or more subsequent product support systems can be sequentially removed once a customer has selected from that product support system and be replaced with another loaded product support system, which can allow a customer to be presented with substantially any number of products. In some instances, for example, a display, customer interface system, kiosk, notification to a customer's user interface system and/or other such system can notify the customer of a location where the customer can be presented the loaded products. In other embodiments, the customer may proceed to an open presentation location and the central control system can receive a notification and/or detect that the customer is at the open location (e.g., based on sensor data, the customer submitting a notification through a customer interface system or user interface unit, etc.).

The central control system can cause the loaded one or more product support systems and the different assortments of the different products can be physically presented to the customer. In some instances, the central control system waits for the customer to be at a location, while in other instances can issue instructions to cause one or more loaded product support systems to be transported to the location prior to the customer being at the location (e.g., as the customer walks to the location in the shopping facility). In some embodiments, the product support systems are able to support more than a single assortment of products and/or multiple product support systems can be used to support multiple different assortments of products. Accordingly, in some instances, the central control system can cause multiple different assortments of the different products to be simultaneously presented to the customer. Further, the presented products are typically organized according to the different assortments to allow the customer to readily identify the different assortments.

By physically moving and presenting products to customer, the sales floor space occupied by the presentation location can be used to present any number of different products, and thus is not limited to a single product or single type of product. This can allow the shopping facility to carry a greater number of products than might otherwise be presented because products can be more efficiently stored in a storage area that does not have to be readily accessible to customers and products do not have to be positioned in the back storage at heights that can be reached by an adult human standing on the floor. The movement of products to the customer simplifies the customer's shopping experience, in part, because the customer is provided with options for the products the customer is interested in without having to navigate through the shopping facility to various locations to obtain desired products. Further, in some instances, the size of the sales floor can be reduced because less space is needed while still allowing customers to physically access the large number of different and varying products.

The one or more product storage areas can store the large numbers of products. The inventory system 2222 can be configured to track the precise location of each product within the back storage area and can provide location information to the product routing system 2224, which can direct the retrieval of the products from the storage locations to a staging area or one of multiple staging areas. Further, the inventory system can implement a strategic retrieval of products, such as considering expiration dates to select the oldest product to be presented, consider an expected freshness of products, consider location of products, and the like. In some embodiments, the product routing system can include one or more conveyor systems positioned in the storage area. The conveyor system(s) can include a series of conveyor roller systems, belt systems, trolley systems, hook systems, and/or other such conveyor systems that are configured to transport products between storage locations (or proximate storage locations) and one of the staging areas where products are placed onto the product support systems. The conveyor system can include one or more routing devices (e.g., arms, guide rollers, etc.) that can be controlled to direct product along various conveyors. Further, some embodiments include retrieval devices, which may be part of the conveyor system and/or separate from the conveyor system. The retrieval devices that can be configured to move vertically and/or horizontally (e.g., along and/or into storage racks) to retrieve products to be deposited onto a conveyor and/or transported by the retrieval devices to the staging area. Additionally or alternatively workers can be directed to retrieve products from storage locations and placed onto the conveyor system or otherwise routed to one of multiple staging areas. In some embodiments, the central control system causes the different products of an assortment to be physically collected by issuing one or more instructions to the conveyor system, one or more retrieval devices, one or more workers, etc. with a product identifier and a storage location of each of the different products of the assortment. The instructions can further instruct the conveyor system, one or more retrieval devices, one or more workers, etc. to retrieve each of the different products of the assortment.

Figure 23:
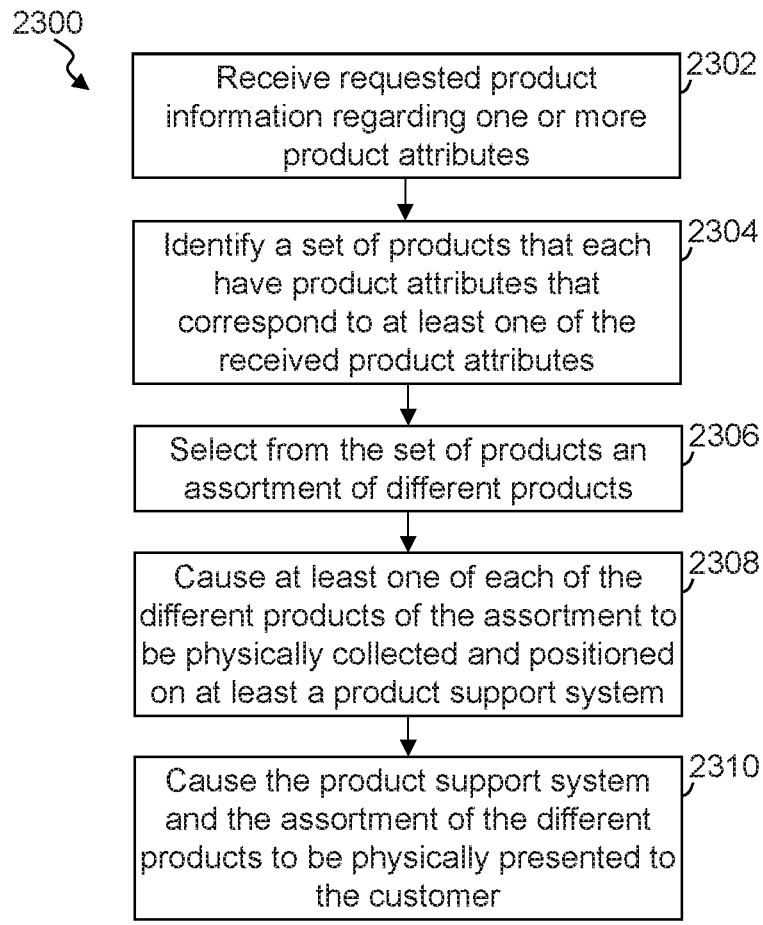
FIG. 23 illustrates a simplified flow diagram of an exemplary process of providing a customized shopping experience for customers and presenting retail products to customers at a shopping facility, in accordance with some embodiments.

FIG. 23 illustrates a simplified flow diagram of an exemplary process 2300 of providing a customized shopping experience for customers and presenting retail products to customers at a shopping facility, in accordance with some embodiments. In step 2302, the central control system receives requested product information regarding one or more product attributes corresponding to at least one type of product for which a customer is shopping. The product information may be specified attributes, may be product names, generic name for a product, and/or other such information from which product attributes can be identified. For example, the attributes database may further associate product names with specific attributes, and associate other product information with types of products from which attributes can be identified, types of attributes, and/or other such identification of attributes.

In step 2304, a set of products is identified from the product attribute database with each product corresponding to one or more of the received product attributes. In some embodiments, each product has one or more product attributes of the received product attributes. In step 2306, an assortment of one or more different products is selected from the set of products. Often the set of products may be more products than a customer would want to view. As such, the assortment may have less than all of the set of products. In other instances, however, each product of the set of products may be selected as part of the assortment.

In step 2308, at least one of each of different products of the assortment of products are caused to be physically collected and positioned on a product support system at the shopping facility. For example, instructions may be sent to a worker to retrieve one or more products from one or more locations, the product routing system may activate an automated system to retrieve and convey one or more products, other such methods of retrieval and transport may be used, or a combination of two or more of such methods. In step 2310, the central control system causes the loaded product support system and at least the assortment of the different products to be physically presented to the customer while at the shopping facility.

In selecting the assortment of different products some embodiments access a partiality vector database that associates different customer identifiers each specific to a different customer and a set of customer partiality vectors corresponding to a respective one of the customer identifiers, and select the assortment of different products that each have at least a threshold relationship between corresponding product partiality vectors and one or more of the customer's partiality vectors. Additionally or alternatively, some embodiments access, from a plurality of customer profiles each associated with a different customer and maintaining at least purchase history information, a customer profile associated with the customer, and selects the assortment of different products based on at least the purchase history information of the customer profile.

In some embodiments, the system receives, from a customer and prior to the customer entering the shopping facility, a listing of multiple different types of products that the customer is interested in purchasing. A separate assortment of different products is selected for each of the multiple different types of products. The central control system can cause each of the different assortments of the different products to be physically collected prior to the customer entering the shopping facility. Further, it can be identified when the customer is in the shopping facility, and the system can cause the different assortments of the different products to be physically presented to the customer. Further, the presentation of products is not limited to a single assortment. Some embodiments cause multiple different assortments of different products to be simultaneously presented to the customer. In some embodiments the products are organized according to the different assortments. Similarly, some embodiments cause one or more other assortments of different products to be physically collected. The other assortment can be physically presented to another customer, while a first assortment is physically presented to a first customer, at a physical location within the shopping facility that is different than a physical location where the first assortment is being presented to the first customer.

Some embodiments detect the selection of a product of the assortment of the different products from the product support system by the customer. A point of sale system can receive an identification of the product and obtains payment from the customer for at least that product. User interface systems may be provided to allow customer to enter attributes, submit requests, submit queries, make payments, and/or other such actions. In some embodiments, requested product information is received from a customer interface system of a plurality of customer interface systems distributed throughout the shopping facility that are each configured to enable customers to enter product attributes of products the customer is interested in purchasing and based on which assortments are selected. In collecting products, some embodiments issue an instruction to a conveyor system with a product identifier and a storage location of each of the different products of the first assortment and instructing the conveyor system to retrieve each of the different products of the first assortment.

In some embodiments, systems, apparatus and a corresponding method performed by the systems, comprises: a plurality of product support systems at a retail shopping facility in which customers enter to purchase different retail products, wherein each of the product support systems is configured to receive and support multiple products; a central control circuit associated with the retail shopping facility; and a product attribute database associating products available for purchase through the retail shopping facility with one or more product attributes that each define an attribute of the product; wherein the central control circuit is configured to: receive requested product information regarding one or more product attributes corresponding to a first type of product for which a first customer is shopping, identify from the product attribute database a set of products with each product having product attributes that correspond to at least one of the received product attributes, select from the set of products a first assortment of different products, cause at least one of each of the different products of the first assortment to be physically collected and positioned on at least a first product support system, and cause the first product support system and at least the first assortment of the different products to be physically presented to the first customer while at the shopping facility.

Some embodiments provide methods of presenting retail products to customers at a shopping facility, comprising: receiving, through a central control circuit of a retail shopping facility, requested product information regarding one or more product attributes corresponding to a first type of product for which a first customer is shopping; identifying a set of products that each have product attributes that correspond to at least one of the received product attributes; selecting from the set of products a first assortment of different products; causing at least one of each of the different products of the first assortment to be physically collected and positioned on at least a first product support system at the shopping facility; and causing the first product support system and at least the first assortment of the different products to be physically presented to the first customer while at the shopping facility.

Pursuant to various embodiments, systems, apparatuses and methods are provided herein useful to provide a customer with additional purchase options beyond items physically adjacent to the customer. More specifically, the embodiments described herein allow a store to provide purchase options for items based on a customer's location within the store within a virtual catalog. This advantageously provides the functionality of a virtual store to a customer at a brick-and-mortar location.

The various embodiments described herein can present purchase options on a mobile communication device, such as a mobile telephone, tablet, laptop, or the like, based on a customer's location within the store. To achieve this, the location of the customer within the store can be determined using one of several methods and then modular and product location information for the store can be referenced to determine items adjacent to the customer. Based on selection of one of the items or narrowing of the options, the embodiments described herein can focus on one item adjacent to the customer and provide purchase options for items within a hierarchy of that item. The hierarchy can take any desired form, such as products commonly purchased with the item, other options for the type of item, other sizes for the item, other choices within the same product category, and so forth.

Figure 24:
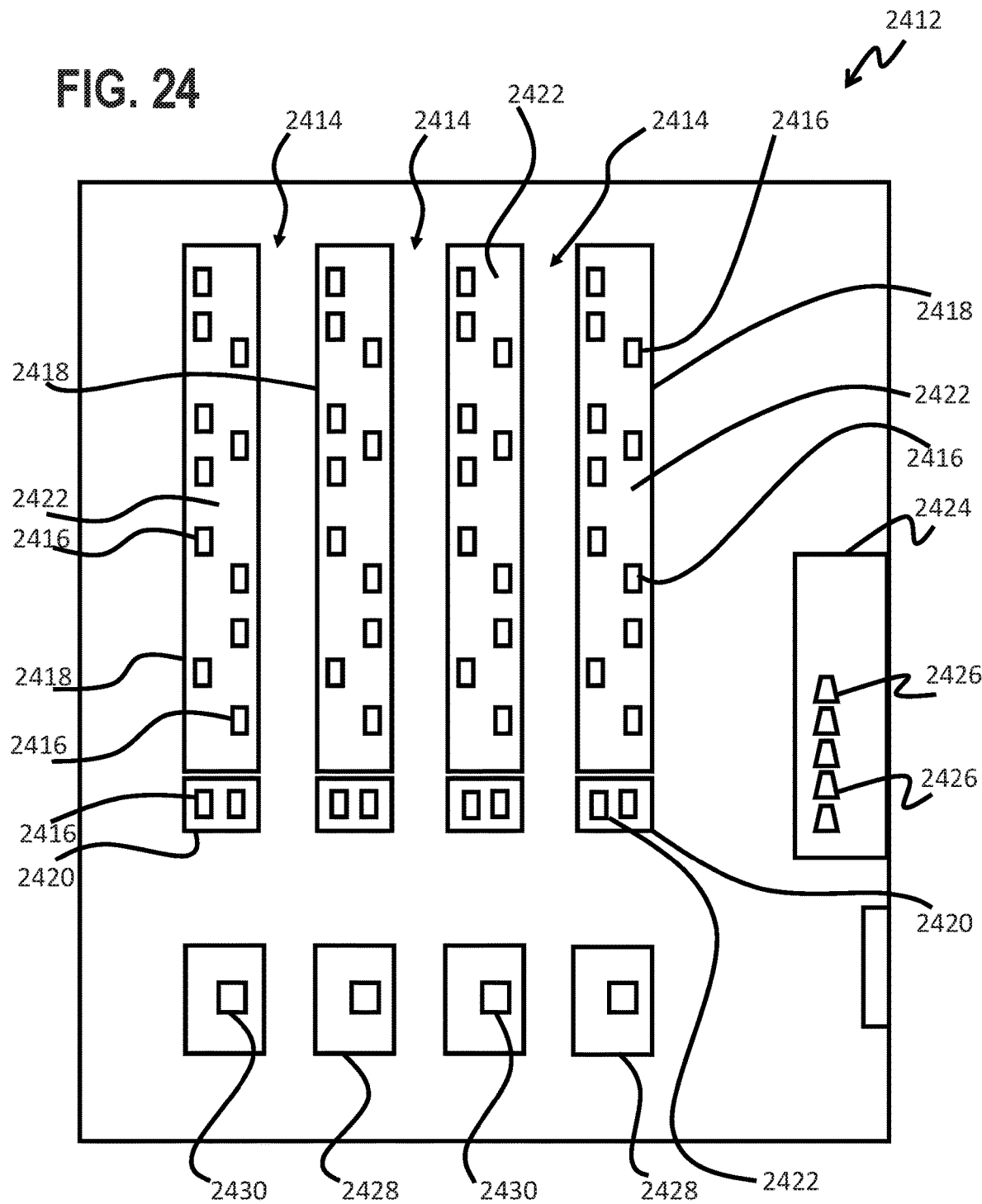
FIG. 24 is a diagrammatic top view of a retail location in accordance with some embodiments.

As illustrated in FIG. 24, a retail location 2412 can typically include a plurality of aisles 2414 having products 2416 disposed therealong on various displays 2418, such as shelving units, coolers, and the like, and on feature locations 2420, which can be located at the end of the aisles 2414, in free-standing displays, or the like. The displays 2418 and feature locations 2420 include product support members 2422, such as shelves and the like, configured to receive the products 2416 thereon for display. A cart corral 2424 is typically located near an entrance to the retail location 2412 with carts 2426 generally contained therein. As a customer enters the retail location 2412, the customer can therefore get one of the carts 2426 for the shopping trip. Thereafter, the customer will travel through the retail location 2412 collecting products 2416 and proceed to one or more point-of-sale locations 2428 having point-of-sale devices 2430.

Figure 26:
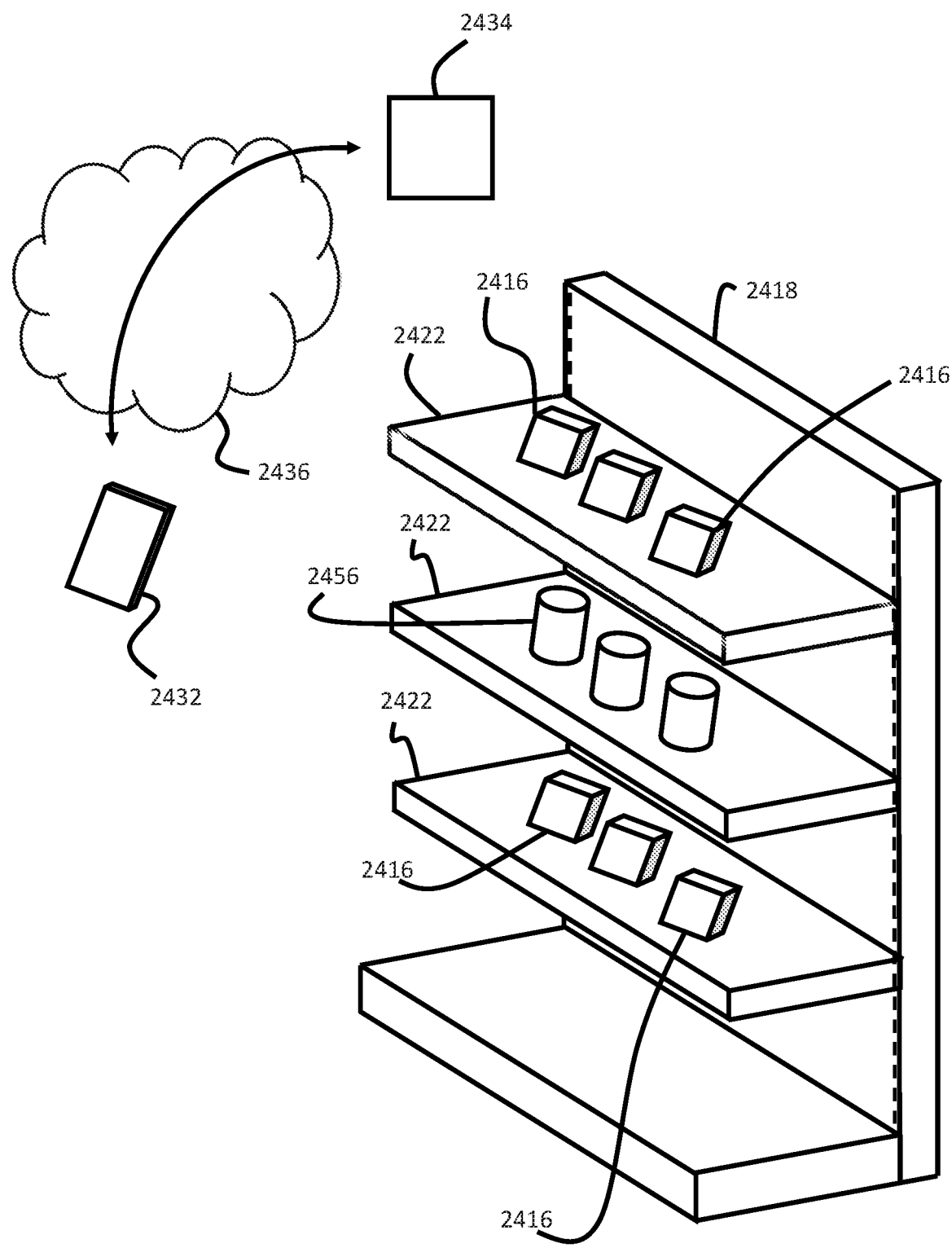
FIG. 26 is a perspective view of a shelving unit and the mobile communication device of FIG. 25 communicating with a computing device over a network in accordance with some embodiments.

Details of the interacting components and structure of the embodiments described herein are shown in FIG. 26. As illustrated, a mobile communication device 2432 is configured to communicate with a computing device 2434 of the retail location 2412, such as a server or database device 2434, through one or more communication networks 2436.

The computing device 2434 can be local within the retail location 2412 and/or can be remote therefrom, such as a centralized system. Suitable communication networks 2436 can include, without limitation, the Internet, a cellular network, Bluetooth, or other communication medium, or a combination thereof. The mobile communication device 2432 can be any suitable communication device, such as a mobile phone, tablet, laptop, E-reader, or the like.

Software operating on the mobile communication device 2432 can provide the various functionalities and operations described herein. By one approach, the software can be in the form of an application running on the mobile communication device 2432. The application can be available for purchase and/or download from any website, online store, or vendor over any suitable communication network 2436. Alternatively, a user can download the application onto a personal computer and transfer the application to the mobile communication device 2432. In this instance, the user downloads and installs the app on the mobile communication device 2432. When operation is desired, the user runs the application on the mobile communication device 2432 by a suitable selection.

Figure 25:
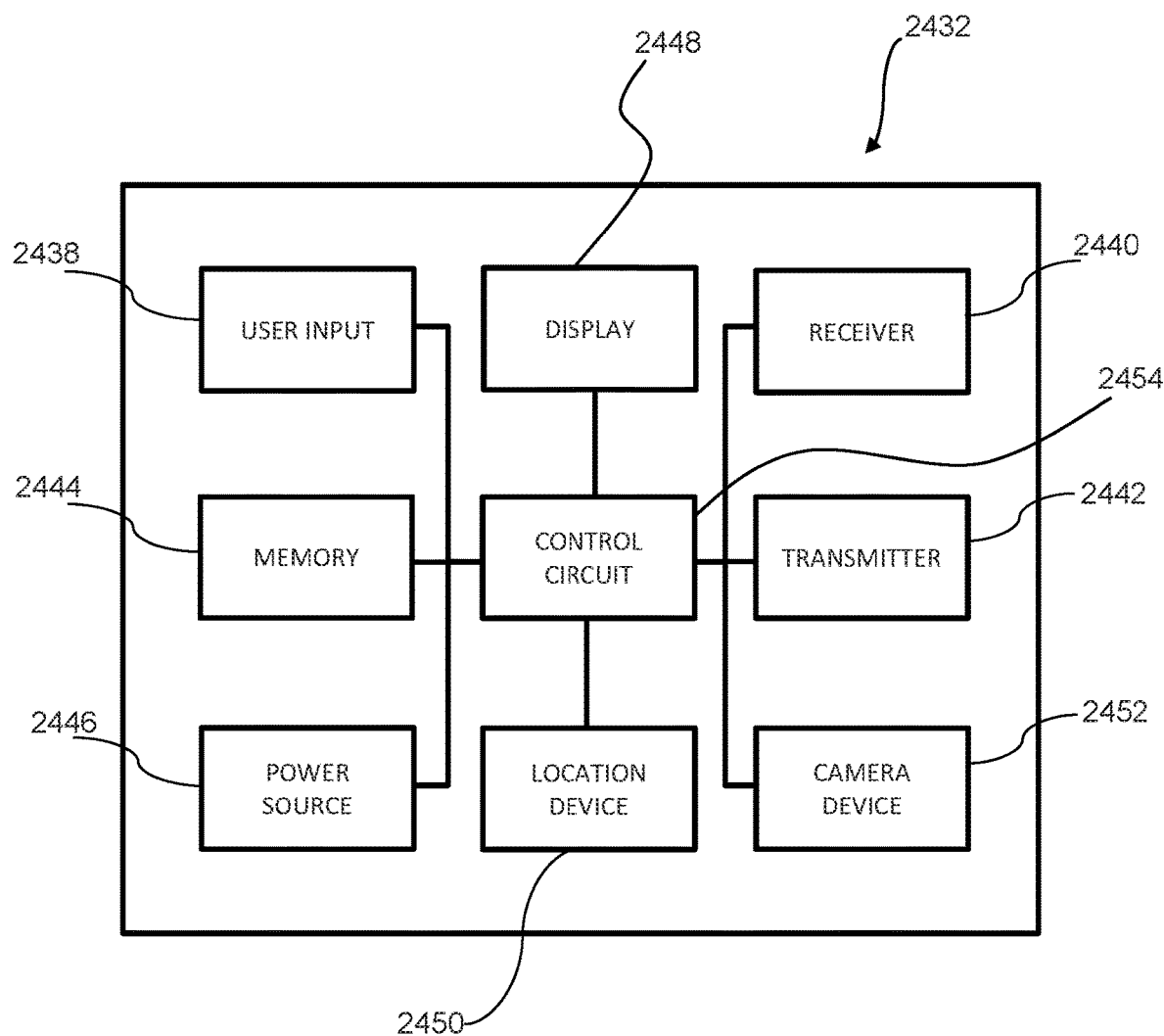
FIG. 25 is a diagrammatic view of a mobile communication device in accordance with several embodiments.

Moreover, many mobile communication devices can be locked when not currently in use, and, in some instances, can require the entry of a passcode or a biometric entry, such as a fingerprint scan, to unlock the mobile communication device. In such a case, the application can bypass the lock screen to perform one or more of the various functions described herein in response to determining that the user is in the retail location 2412 or can present the various display options in front of the lock screen. Additionally, if desired, selecting the display can direct the user to a passcode and/or biometric entry screen, and the application can be configured to display after correct entry of the passcode or biometric entry As shown in FIG. 25, the mobile communication device 2432 can include a user input 2438, such as a touch screen, keypad, switch device, voice command software, or the like, a receiver 2440, a transmitter 2442, which can both be incorporated within a transceiver, a memory 2444, a power source 2446, which can be replaceable or rechargeable as desired, a display 2448, a location determination device 2450, a camera device 2452 and a control circuit 2454 controlling the operation thereof. As commonly understood, the components are connected by electrical pathways, such as wires, traces, circuit boards, and the like.

The term control circuit refers broadly to any microcontroller, computer, or processor-based device with processor, memory, and programmable input/output peripherals, which is generally designed to govern the operation of other components and devices. It is further understood to include common accompanying accessory devices. These architectural options are well known and understood in the art and require no further description here. The control circuit 2454 may be configured (for example, by using corresponding programming stored in a memory as will be well understood by those skilled in the art) to carry out one or more of the steps, actions, and/or functions described herein.

The control circuit 2454, via the location determination device 2450, can be configured to determine a location of a user. As such, by one approach, the control circuit 2454 can monitor the location of the mobile device 2432 and perform the functions described herein in response to determining that the location corresponds to a location of the retail location 2412. By another approach, the control circuit 2454 can be configured to receive a signal from the store computing device 2434 to identify when the customer enters the retail location 2412. Further, the control circuit 2454 can operate the location determination device 2450 to determine where the customer is located within the retail location 2412.

Next, the control circuit 2454, via the transceiver 2440, 2442, can be configured to retrieve or receive modular data and product location data for the retail location 2412 from the server 2434. The modular data can include the layout, as well as, the types and configurations of product displays 2418 within the retail location 2412. The product location data can include identifications of the products 2416 within the retail location 2412 and the locations of the products 2416 on the various displays 2418, which can include details such as which shelf 2422 the products are located on or the portion of the shelf 2422 where the products 2416 are intended to be stocked.

So configured, when the user enters the retail location 2412, the control circuit 2454 can track the location of the user. The location determination device 2450 can be any suitable device. By one approach, the location determination device 2450 can use micro or geo-locationing. By another approach, the location determination device 2450 can utilize beacon signals received from the product displays 2418 within the retail location 2412. By another approach, the location determination device 2450 can utilize a non-visible modulation of lights within the retail location 2412. By another approach, the control circuit 2454 can receive location information from the store computing device 2434, which can utilize camera devices or other locationing devices within the retail location 2412.

Subsequently, or simultaneously, the control circuit 2454 can access the modular data to determine which product display 2418 is adjacent to the current location of the user and access the product location data to determine which products 2416 are intended to be stocked in that product display 2418. Thereafter, the control circuit 2454 can determine a particular product 2456 of the products 2416 intended to be stocked on the product display 2418 and present products 2416 in a virtual catalog within a hierarchy of the particular product 2456 on the display 2448 of the mobile communication device 2432. The virtual catalog can be used, for example, to offer products for sale that are stocked at larger format stores or available online. Advantageously, by using the modular and product location data, the functionalities described herein can be utilized even in a given product 2416 is out of stock. The computing device 2434, which can be local or a remote central system as described above, can be a host and provide hierarchies for each product 2416 within the retail location 2412.

By one approach, the control circuit 2454 can narrow the product options based on movement of the mobile communication device 2432. For example, categories of products can scroll through the phone, such as by largest to smallest, within the immediate area. By another approach, the user can operate the camera device 2452, as described in more detail below, to capture media of the particular product 2456. By another approach, the control circuit 2454 can be configured to read a machine readable code, such as a UPC, QR code, or the like, captured by the camera device 2452.

The hierarchy of the particular product 2456 can include products 2416 commonly purchased with the particular product 2456, other available sizes for the particular product 2456, other product options or brands for the type of the particular product, products 2416 associated with the particular product 2456, and so forth. For example, if the particular product 2456 is a ketchup bottle of a first brand, the hierarchy presented can include one or more of: other ketchup brands, other sizes for the first brand of ketchup, associated condiments, including mustard, relish, and the like. The control circuit 2454 can further be configured to broaden the range of the products 2416 presented within the hierarchy, for example, the products 2416 presented on the display can start with other sizes, proceed to other brands, proceed to other condiments, and proceed to broader products, such as ground beef, buns, table clothes, grills, picnic furniture, etc. The products 2416 within the hierarchy can be sequentially broadened based on a predetermined amount of time elapsing, based on an input to the user input 2438, or both.

If desired, a user can input a filter for the hierarchy that, if applicable, will filter products 2416 within the hierarchy for the particular product 2456 for presentation on the display 2448 of the mobile communication device 2432. For example, the filter can be a shopping list identified by the user, value information indicating at least one partiality possessed by the user, described in more detail below, products that the user doesn't like, and so forth.

As set forth above, the mobile communication device 2432 includes the camera device 2452. The control circuit 2454 can analyze media, including video and/or images, captured by the camera device 2452. The camera device 2452 can be operated by user or can be automatically operated while the user is in the retail location 2412, viewing the virtual catalog, or the like. So configured, the control circuit 2452 can analyze the media captured by the camera device 2452 to identify products 2416 on the product display 2418. As such, this functionality can be used to narrow the products 2416 to identify the particular product 2456. Moreover, if desired, the control circuit 2452 can analyze stock levels for the various products 2416 identified and can be configured to generate a signal indicating that a product 2416 has a low stock in response to determining that the product support structure 2422 has a stock level below a predetermined amount, such as ¾, half, ¼, or the like, or that the number of products 2416 is below a predetermined number.

Further, the user can select one of the products 2416 in the hierarchy for purchase via the user input 2438. If the product 2416 is stocked in the retail location 2412, the purchase selection can send a signal to the computing device 2434 to generate a task for an associate to bring the product 2416 to one of the point-of-sale locations 28, to a customer service location, or the like. The selection of the one or more products 2416 can further be added to a virtual cart compiled by the control circuit 2454 and sent to the computing device 2434. The computing device 2434 can then forward the virtual cart to the point-of-sale devices 2430 so that a customer can purchase both the virtual products 2416 and any products 2416 selected in the retail location 2412 at the same time. Alternatively, the customer can purchase the virtual items using the mobile communication device 2432 and the user input 2438 thereof. By either approach, the control circuit 2454 can present an option to the customer to receive the products 2416 by delivery or pick-up.

In some embodiments, a virtual catalog apparatus is described that includes a memory having modular and product location data for a retail location stored thereon; a location determining device; a display; and a control circuit coupled to the location determining device and the display. The control circuit is configured to: determine a location of a user with the location determining device; access modular data of the retail location to determine a product display adjacent to the user; access product location data of the retail location to determine which products are intended to be stocked on the product display; determine a particular product of the products intended to be stocked on the product display; and present products within a hierarchy of the particular product on the display.

By some approaches, the hierarchy of the particular product can include products commonly purchased with the particular product. By further approaches, the hierarchy of the particular product can include other available sizes for the particular product.

By several approaches, the control circuit is configured to present products within increasingly broader aspects of the hierarchy based on time elapsed.

By some approaches, the control circuit is configured to apply a filter to the products within the hierarchy to be presented on the display. By further approaches, the filter can include a shopping list identified by the user. By further approaches, the filter can include value information indicating at least one partiality possessed by the user.

By several approaches, the apparatus can further include a camera device; and wherein the control circuit can be configured to analyze video captured by the camera device to identify products on the product display.

By some approaches, the control circuit can further be configured to analyze stock levels on the product display in the video captured by the camera device and send a signal in response to determining that a product has a low stock.

By several approaches, the control circuit can be configured to receive a selection of one or more of the products within the hierarchy of the particular product for purchase. By further approaches, the control circuit can be configured to add the selected products to a virtual cart for purchase at a point of sale of the retail location along with any physical products. By further approaches, the control circuit can be configured to receive a selection of delivery or pick-up of the selected products.

Figure 27:
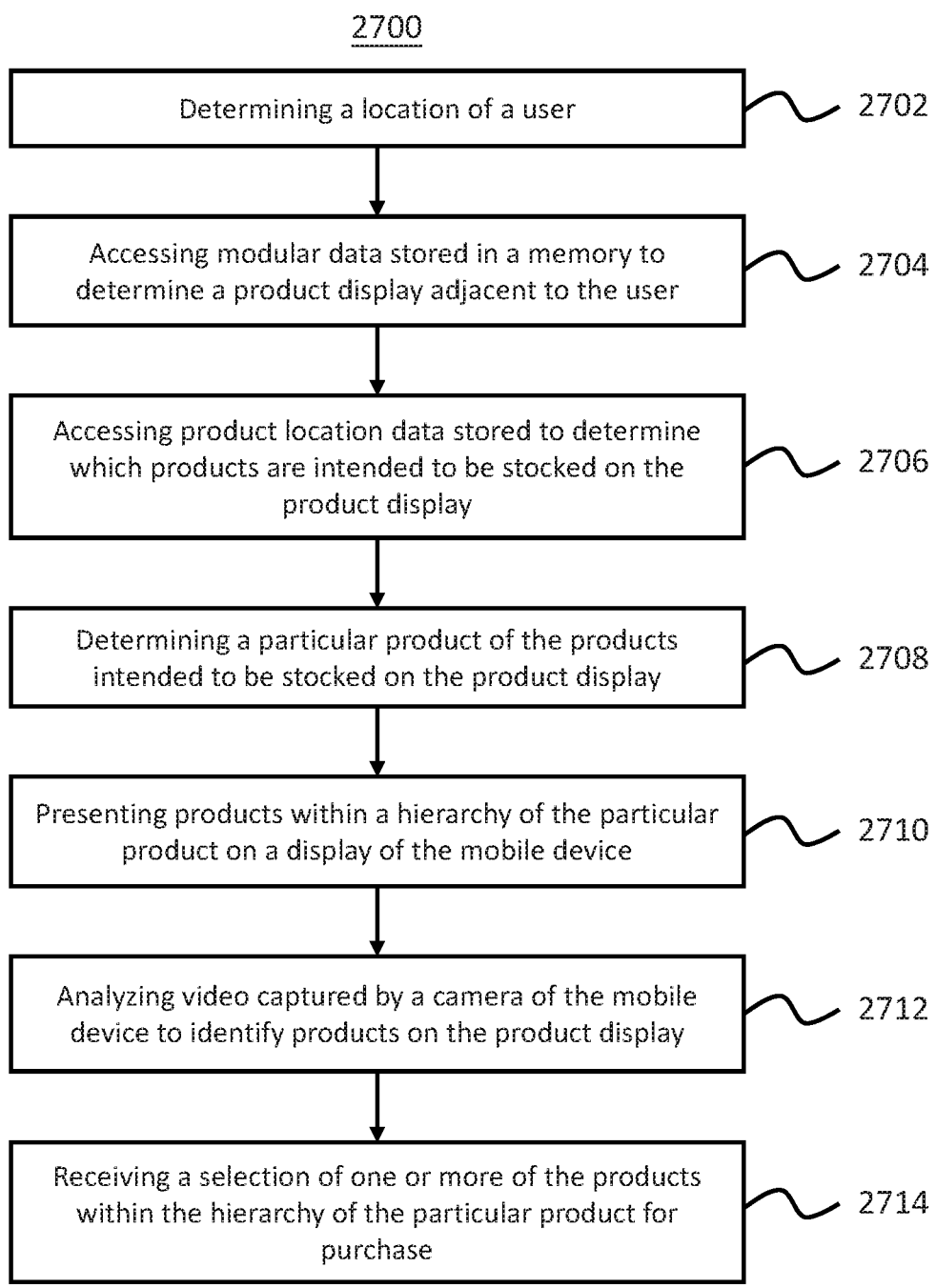
FIG. 27 is a flow diagram in accordance with several embodiments.

In several embodiments and as shown in FIG. 27, a method 2700 of providing a virtual catalog with a mobile device is described herein that includes determining 2702 a location of a user with a location determining device of the mobile device; accessing 2704 modular data stored in a memory with a control circuit of the mobile device to determine a product display adjacent to the user; accessing 2706 product location data stored in the memory with the control circuit to determine which products are intended to be stocked on the product display; determining 2708 a particular product of the products intended to be stocked on the product display within the control circuit; and presenting 2710 products within a hierarchy of the particular product on a display of the mobile device.

By some approaches, presenting the products within the hierarchy of the particular product can include presenting products commonly purchased with the particular product; and/or presenting products within increasingly broader aspects of the hierarchy based on time elapsed;

By several approaches, presenting products within the hierarchy of the particular product can further include applying a filter to the products within the hierarchy to be presented on the display. By further approaches, applying the filter can include presenting products identified in a shopping list. By further approaches, applying the filter can include filtering products within the hierarchy based on value information indicating at least one partiality possessed by the user.

By some approaches, the method 2700 can further include analyzing 2712 video captured by a camera of the mobile device to identify products on the product display with the control circuit.

By several approaches, the method 2700 can further include analyzing stock levels on the product display in the video captured by the camera device with the control circuit; and sending a signal in response to determining that a product has a low stock.

By some approaches, the method 2700 can further include receiving 2714 a selection of one or more of the products within the hierarchy of the particular product for purchase. By further approaches, the method can include adding the selected products to a virtual cart with the control circuit for purchase at a point of sale of the retail location along with any physical products.

Figure 28:
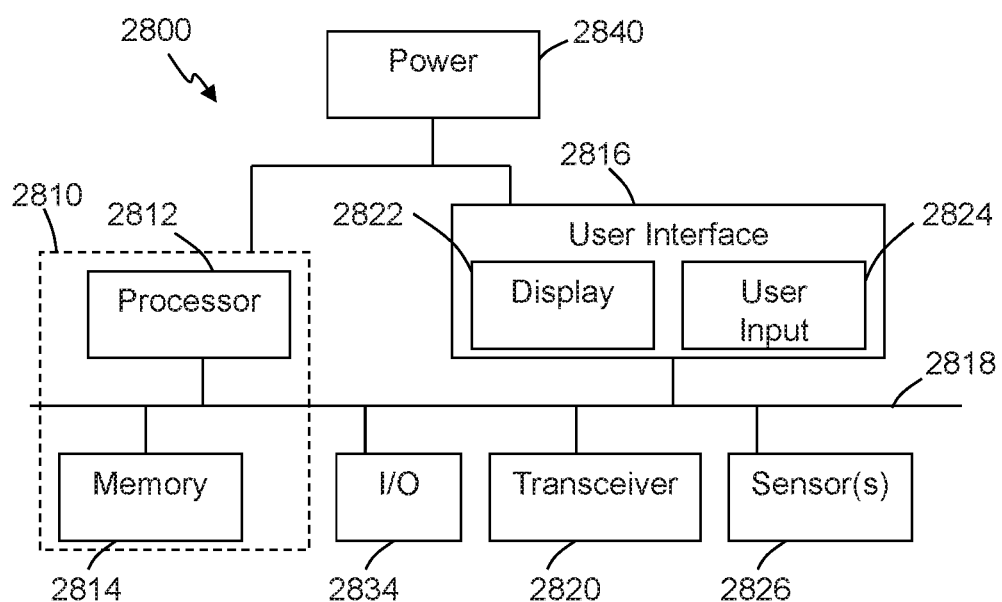
FIG. 28 illustrates an exemplary system for use in implementing methods, techniques, devices, apparatuses, systems, servers, sources and providing enhanced customer experiences, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 28 illustrates an exemplary system 2800 that may be used for implementing any of the components, circuits, circuitry, systems, functionality, apparatuses, processes, devices, or parts of such circuits, circuitry, functionality, systems, apparatuses, processes, or devices mentioned herein. However, the use of the system 2800 or any portion thereof is certainly not required.

By way of example, the system 2800 may comprise a control circuit or processor module 2812, memory 2814, and one or more communication links, paths, buses or the like 2818. Some embodiments may include one or more user interfaces 2816, and/or one or more internal and/or external power sources or supplies 2840. The control circuit 2812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 2812 can be part of control circuitry and/or a control system 2810, which may be implemented through one or more processors with access to one or more memory 2814 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 2800 may be used to implement one or more of the above or below, or parts of, components, circuits, systems, processes and the like.

The user interface 2816 can allow a user to interact with the system 2800 and receive information through the system. In some instances, the user interface 2816 includes a display 2822 and/or one or more user inputs 2824, such as buttons, touch screen, track ball, keyboard, mouse, etc., which can be part of or wired or wirelessly coupled with the system 2800. Typically, the system 2800 further includes one or more communication interfaces, ports, transceivers 2820 and the like allowing the system 2800 to communicate over a communication bus, a distributed computer and/or communication network (e.g., a local area network (LAN), the Internet, wide area network (WAN), etc.), communication link 2818, other networks or communication channels with other devices and/or other such communications or combination of two or more of such communication methods. Further the transceiver 2820 can be configured for wired, wireless, optical, fiber optical cable, satellite, or other such communication configurations or combinations of two or more of such communications. Some embodiments include one or more input/output (I/O) ports 2834 that allow one or more devices to couple with the system 2800. The I/O ports can be substantially any relevant port or combinations of ports, such as but not limited to USB, Ethernet, or other such ports. The I/O interface 2834 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 2826 and/or couple with the sensor systems (e.g., sensory systems 2216) to provide information to the system and/or sensor information that is communicated to another component, such as the central control system, product routing system, etc. The sensors can include substantially any relevant sensor, such as optical based scanning sensors to sense and read optical patterns (e.g., bar codes), radio frequency identification (RFID) tag reader sensors capable of reading RFID tags in proximity to the sensor, distance measurement sensors (e.g., optical units, sound/ultrasound units, etc.), cameras and image processing systems, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 2800 comprises an example of a control and/or processor-based system with the control circuit 2812. Again, the control circuit 2812 can be implemented through one or more processors, controllers, central processing units, logic, software and the like. Further, in some implementations the control circuit 2812 may provide multiprocessor functionality.

The memory 2814, which can be accessed by the control circuit 2812, typically includes one or more processor readable and/or computer readable media accessed by at least the control circuit 2812, and can include volatile and/or non-volatile media, such as RAM, ROM, EEPROM, flash memory and/or other memory technology. Further, the memory 2814 is shown as internal to the control system 2810; however, the memory 2814 can be internal, external or a combination of internal and external memory. Similarly, some or all of the memory 2814 can be internal, external or a combination of internal and external memory of the control circuit 2812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 2814 can store code, software, executables, scripts, data, content, lists, programming, programs, log or history data, user information, customer information, product information, and the like. While FIG. 28 illustrates the various components being coupled together via a bus, it is understood that the various components may actually be coupled to the control circuit and/or one or more other components directly.

Some embodiments provide systems comprising: a database of user profiles, the user profiles having one or more partialities associated therewith; a database of retail products, at least some of the retail products having identified vectorized product characterizations; a control circuit configured to access the database of user profiles and the database of retail products and configured to identify one or more suggested retail items for a particular customer based, in part, on comparisons between the identified partialities of the user profile associated with the particular customer and the identified vectorized product characterizations of the retail products; and a plurality of physical shopping carts at a retail shopping facility, one of the plurality of shopping carts being designated for the particular customer and filled with at least one of the one or more suggested retail items prior to the particular customer arriving at the retail shopping facility. In some implementations, the system further comprising a staging area within the retail shopping facility with numerous shopping carts designated for use by particular customers, the designated shopping carts filled with at least one of the one or more suggested retail items for the particular customers, the staging area being where the particular customers retrieve their designated shopping carts.

The retail shopping facility may further include a rejection bin where the particular customer may deposit unwanted suggested retail items. In some embodiments, the control circuit is further configured to update the one or more partialities in the database of user profiles based, in part, on the particular customer associated with the user profile placing one of the unwanted suggested retail items in the rejection bin and the rejection bin having a bin sensor configured to detect placement of the unwanted suggested retail items. A user profile, in some instances, has purchased retail products associated therewith and at least one identified partiality associated with the purchased retail products.

In some embodiments, the system further comprising one or more point of sale terminals and the control circuit is further configured to update the user profile associated with the particular customer based, in part, on retail products purchased by the particular customer at the point of sale terminal and the identified vectorized product characterizations associated with the purchased retail products. The control circuit, in some applications, is configured to receive, from the particular customer, a collection time and a collection location for picking up the particular customer's designated shopping cart filled with the at least one of the one or more suggested retail items. The control circuit may further receive location information from the particular customer and the at least one of the one or more suggested retail items are loaded into the designated shopping cart as the particular customer approaches the retail shopping facility. In some implementations, the database of user profiles further includes a purchase history and the control circuit is further configured to identify the one or more suggested retail items based, in part, on the purchase history of the particular customer.

The control circuit, in some embodiments, is configured to update the database of user profiles according to purchases at multiple retail facilities. In some implementations, the partialities are represented by partiality vectors and can include values, preferences, and affinities. The control circuit may further be configured to analyze the partiality vectors and the vectorized product characterizations and identify an overlap therebetween.

Some embodiments provide methods comprising: maintaining a database of a plurality of user profiles having and one or more identified partialities associated therewith;

maintaining a database of retail products, at least some of the retail products having identified vectorized product characterizations; identifying one or more suggested retail items for a particular customer based, in part, on comparisons between the identified partialities of the user profile associated with the particular customer and the identified vectorized product characterizations of the retail products; and loading a designated shopping cart, at a retail shopping facility, for the particular customer with at least one of the one or more suggested retail items prior to the particular customer arriving at the retail shopping facility. In some implementations, the method further comprising providing the designated shopping cart at a staging area within the retail shopping facility. The method may further comprise updating the user profile based, in part, on the particular customer rejecting one of the suggested retail items loaded into the designated shopping cart.

In some embodiments, the method further comprises updating the user profile based, in part, on information received about the particular customer from a point of sale terminal visited by the particular customer before exiting the retail shopping facility. Some applications further comprise receiving, from the particular customer, a collection time and a collection location for picking up the particular customer's designated shopping cart filled with the one or more suggested retail items. In some implementations, the method further comprises receiving location information from the particular customer and loading the one or more suggested retail items into the designated shopping cart as the particular customer approaches the retail shopping facility.

Some embodiments provide systems to enhance customers' retail shopping experiences, comprising: a retail environment control circuit coupled with memory storing instructions that when executed by the control circuit cause the control circuit to: identify that a first customer is present at a retail shopping facility; access a customer profile database, wherein the customer profile database maintains a customer profile for each of multiple different customers, and each customer profile comprises a set of customer partiality vectors corresponding to the customer, wherein the customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order; identify a first set of recommended products each having at least a threshold relationship between corresponding product partiality vectors and one or more of a set of partiality vectors associated with the first customer; and communicate a recommendation listing of the first set of recommended products and causing at least a portion of the recommendation listing to be presented to the first customer while the first customer is still physically at the shopping facility. In some implementations the control circuit is configured to receive a response from the customer indicating a level of agreement of the recommendation corresponding to at least one recommended product of the first set of recommended products. Further, the control circuit can be configured to adjust at least one partiality vector of the first set of partiality vectors based on the level of agreement.

In some applications, the control circuit in communicating the recommendation listing wirelessly communicates the recommendation listing of the first set of recommended products to a mobile user interface unit associated with the first customer and causes content representative of the recommendation listing to be displayed on the user interface unit. In some embodiments, the system further comprises a series of multiple display systems each positioned at different locations throughout the shopping facility, wherein the control circuit is further configured to obtain a location of the first customer within the shopping facility. The control circuit in communicating the recommendation listing can, in some instances, communicate the recommendation listing to a first display system of the multiple display systems that is within a threshold distance of the obtained location of the first customer.

In some embodiments, the system further comprises a series of multiple audio output systems each positioned at different locations throughout the shopping facility, wherein the control circuit is further configured to obtain a location of the first customer within the shopping facility; and wherein the control circuit in communicating the recommendation listing communicates the recommendation listing to a first audio output system of the multiple audio output systems that is within a threshold distance of the obtained location of the first customer. In some instances, the control circuit is configured to identify, from product information of a first recommended product of the first set of recommended products, at least a first product partiality vector that has the threshold relationship with at least one of the first customer's partiality vectors; and cause marketing information, representative of at least the first product partiality vector associated with the first recommended product, to be displayed as part of the recommendation listing being presented to the first customer. The control circuit, in some implementations, is configured to: obtain a location of the first customer within the shopping facility, wherein control circuit in identifying the first set of recommended products identifies each of the recommended products of the first set of recommended products based on the first set of partiality vectors and on the location of the first customer within the shopping facility. In some embodiments, the control circuit in identifying the first set of recommended products identifies each of the recommended products of the first set of recommended products that each correspond to at least one product previously selected by the first customer during the first customer's current visit to the shopping facility.

Some embodiments provide methods of enhancing customers' retail shopping experiences, comprising: by a retail environment control circuit: identifying that a first customer is present at a retail shopping facility; accessing a customer profile database, wherein the customer profile database maintains a customer profile for each of multiple different customers, and each customer profile comprises a set of customer partiality vectors corresponding to the customer, wherein the customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order; identifying a first set of recommended products each having at least a threshold relationship between corresponding product partiality vectors and one or more of a set of partiality vectors associated with the first customer; and communicating a recommendation listing of the first set of recommended products and causing the recommendation listing to be presented to the first customer while the first customer is still in the shopping facility. In some applications, the method further comprises receiving a response from the customer indicating a level of agreement of the recommendation corresponding to at least one recommended product of the first set of recommended products. The method may further comprise adjusting at least one partiality vector of the first set of partiality vectors based on the level of agreement. The communicating of the recommendation listing, in some implementations, comprises wirelessly communicating the recommendation listing of the first set of recommended products to a mobile user interface unit associated with the first customer and causing content representative of the recommendation listing to be displayed on the user interface unit.

In some embodiments, the method further comprises: obtaining a location of the first customer within the shopping facility; and wherein the communicating the recommendation listing comprises communicating the recommendation listing to a first display system, of a series of multiple display systems each positioned at different locations throughout the shopping facility, that is within a threshold distance of the location of the first customer. In some embodiments, the method further comprises: obtaining a location of the first customer within the shopping facility; wherein the communicating the recommendation listing comprises communicating the recommendation listing to a first audio output system, of a series of multiple audio output systems each positioned at different locations throughout the shopping facility, that is within a threshold distance of the location of the first customer. The method may further comprise: identifying, from product information of a first recommended product of the first set of recommended products, at least a first product partiality vector that has the threshold relationship with at least one of the first customer's partiality vectors; and causing marketing information, representative of at least the first product partiality vector associated with the first recommended product, to be displayed as part of the recommendation listing being presented to the first customer. In some applications, the method further comprises: obtaining a location of the first customer within the shopping facility; wherein the identifying the first set of recommended products comprises identifying each of the recommended products of the first set of recommended products based on the first set of partiality vectors and on the location of the first customer within the shopping facility. The identifying of the first set of recommended products can comprise identifying each of the recommended products of the first set of recommended products that each correspond to at least one product previously selected by the first customer during the first customer's current visit to the shopping facility.

Some embodiments provide retail product presentation systems, comprising: a plurality of product support systems at a retail shopping facility in which customers enter to purchase different retail products, wherein each of the product support systems is configured to receive and support multiple products; a central control circuit associated with the retail shopping; and a product attribute database associating products available for purchase through the retail shopping facility with one or more product attributes that each define an attribute of the product; wherein the central control circuit when implementing code stored in memory is configured to: receive requested product information regarding one or more product attributes corresponding to a first type of product for which a first customer is shopping, identify from the product attribute database a set of products with each product having product attributes that correspond to at least one of the received product attributes, select from the set of products a first assortment of different products, cause at least one of each of the different products of the first assortment to be physically collected and positioned on at least a first product support system, and cause the first product support system and at least the first assortment of the different products to be physically presented to the first customer while at the shopping facility. The system may further comprise: at least one sensor positioned relative to the first product support system and configured to detect a first product of the first assortment of the different products selected from the first product support system by the first customer, and communicate identifier information of the first product to the central computer system; and a point of sale system configured to receive an identification of the first product and to obtain payment from the first customer for at least the first product.

In some implementations, the system further comprises: a partiality vector database that associates different customer identifiers each specific to a different customer and a set of customer partiality vectors corresponding to a respective one of the customer identifiers, wherein customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order; wherein the central control circuit in selecting the first assortment of different products accesses the partiality vector database and selects the first assortment of different products that each have at least a threshold relationship between corresponding product partiality vectors and one or more of the first customer's partiality vectors. In some embodiments the system further comprises: a customer database storing a plurality of customer profiles each associated with a different customer, wherein each customer profile maintains purchase history information; wherein the central control circuit in selecting the first assortment of different products accesses a first customer profile associated with the first customer and selects the first assortment of different products based on the purchase history information of the first customer profile. In some applications, the central control circuit is further configured to: receive, from the first customer and prior to the first customer entering the shopping facility, a listing of multiple different types of products that the first customer is interested in purchasing; select, for each of the multiple different types of products, a separate assortment of different products of that type of product; cause each of the different assortments of the different products to be physically collected prior to the first customer entering the shopping facility; identify when the first customer is in the shopping facility; and cause the different assortments of the different products to be physically presented to the first customer.

In some embodiments, the central control circuit in causing the different assortments of the different products to be physically presented to the first customer further causes the different assortments of the different products to be simultaneously presented to the first customer, with the products organized according to the different assortments. The central control circuit, in some implementations, is further configured to: cause a second assortment of different products to be physically collected; and cause the second assortment of the different products to be physically presented to a second customer while the first assortment is physically presented to the first customer and at a physical location within the shopping facility that is different than a physical location where the first assortment is being presented to the first customer. Some embodiments further comprise a plurality of customer interface systems distributed throughout the shopping facility and each configured to enable customers to enter product attributes of products the customer is interested in purchasing and based on which assortments are selected. The system, in some embodiments, further comprises: a product routing system positioned in the storage area and configured to transport products between storage locations and a staging area where products are placed onto the product support systems; wherein the central control circuit in causing the at least one of each of the different products of the first assortment to be physically collected issues an instruction to the product routing system with a product identifier and a storage location of each of the different products of the first assortment and instructing the product routing system to retrieve each of the different products of the first assortment.

Some embodiments provide methods of presenting retail products to customers at a shopping facility, comprising: receiving, through a central control circuit of a retail shopping facility, requested product information regarding one or more product attributes corresponding to a first type of product for which a first customer is shopping; identifying a set of products that each have product attributes that correspond to at least one of the received product attributes; selecting from the set of products a first assortment of different products; causing at least one of each of the different products of the first assortment to be physically collected and positioned on at least a first product support system at the shopping facility; and causing the first product support system and at least the first assortment of the different products to be physically presented to the first customer while at the shopping facility. In some applications, the method further comprises: detecting a first product of the first assortment of the different products selected from the first product support system by the first customer; receiving, at a point of sale system, an identification of the first product; and obtaining payment from the first customer for at least the first product. The selecting of the first assortment of different products, in some implementations, comprises: accessing a partiality vector database that associates different customer identifiers each specific to a different customer and a set of customer partiality vectors corresponding to a respective one of the customer identifiers, wherein customer partiality vectors are directed quantities that each have both a magnitude and a direction, with the direction representing a determined order imposed upon material space-time by a particular partiality and the magnitude represents a determined magnitude of a strength of the belief, by the corresponding customer, in a benefit that comes from that imposed order; and selecting the first assortment of different products that each have at least a threshold relationship between corresponding product partiality vectors and one or more of the first customer's partiality vectors.

In some embodiments, the selecting of the first assortment of different products comprises: accessing, from a plurality of customer profiles each associated with a different customer and maintaining at least purchase history information, a first customer profile associated with the first customer; and selecting the first assortment of different products based at least on the purchase history information of the first customer profile. In some embodiments, the method further comprises: receiving, from the first customer and prior to the first customer entering the shopping facility, a listing of multiple different types of products that the first customer is interested in purchasing; selecting, for each of the multiple different types of products, a separate assortment of different products of that type of product; causing each of the different assortments of the different products to be physically collected prior to the first customer entering the shopping facility; identifying when the first customer is in the shopping facility; and causing the different assortments of the different products to be physically presented to the first customer. The causing the different assortments of the different products to be physically presented to the first customer may comprise causing the different assortments of the different products to be simultaneously presented to the first customer, with the products organized according to the different assortments. In some embodiments the method further comprises: causing a second assortment of different products to be physically collected; and causing the second assortment of the different products to be physically presented to a second customer while the first assortment is physically presented to the first customer and at a physical location within the shopping facility that is different than a physical location where the first assortment is being presented to the first customer. In some embodiments the receiving the requested product information comprises receiving the product information from a first customer interface system of a plurality of customer interface systems distributed throughout the shopping facility and each configured to enable customers to enter product attributes of products the customer is interested in purchasing and based on which assortments are selected. In some embodiments the causing the at least one of each of the different products of the first assortment to be physically collected comprises issuing an instruction to a product routing system with a product identifier and a storage location of each of the different products of the first assortment and instructing the product routing system to retrieve each of the different products of the first assortment.

Some embodiments provide virtual catalog apparatuses comprising: a memory having modular and product location data for a retail location stored thereon; a location determining device; a display; and a control circuit coupled to the location determining device and the display, wherein the control circuit is configured to: determine a location of a user with the location determining device; access modular data of the retail location to determine a product display adjacent to the user; access product location data of the retail location to determine which products are intended to be stocked on the product display; determine a particular product of the products intended to be stocked on the product display; and present products within a hierarchy of the particular product on the display. In some embodiments, the hierarchy of the particular product includes products commonly purchased with the particular product. In some embodiments the hierarchy of the particular product includes other available sizes for the particular product. In some embodiments, the control circuit is configured to present products within increasingly broader aspects of the hierarchy based on time elapsed. In some embodiments, the control circuit is configured to determine the location of the user based on micro-locationing with the location determining device. In some embodiments, the control circuit is configured to determine the location of the user based on beacon signals received from product displays within the retail location with the location determining device. In some implementations, the control circuit is configured to determine the location of the user based on modulation of lights within the retail location with the location determining device.

In some embodiments, the control circuit is configured to apply a filter to the products within the hierarchy to be presented on the display. The filter, in some applications, comprises a shopping list identified by the user. In some embodiments, the filter comprises value information indicating at least one partiality possessed by the user. In some embodiments, virtual catalog apparatus further comprises a camera device; and wherein the control circuit is configured to analyze video captured by the camera device to identify products on the product display. In some embodiments, the control circuit is further configured to analyze stock levels on the product display in the video captured by the camera device and send a signal in response to determining that a product has a low stock. In some embodiments, the control circuit is configured to receive a selection of one or more of the products within the hierarchy of the particular product for purchase. In some embodiments, the control circuit is further configured to add the selected products to a virtual cart for purchase at a point of sale of the retail location along with any physical products. In some embodiments, the control circuit is further configured to receive a selection of delivery or pick-up of the selected products.

Some embodiments provide methods of providing a virtual catalog with a mobile device comprising: determining a location of a user within a retail location with a location determining device of the mobile device; accessing modular data stored in a memory with a control circuit of the mobile device to determine a product display adjacent to the user; accessing product location data stored in the memory with the control circuit to determine which products are intended to be stocked on the product display; determining a particular product of the products intended to be stocked on the product display with the control circuit; and presenting products within a hierarchy of the particular product on a display of the mobile device. The presenting of the products within the hierarchy of the particular product, in some implementations, comprises presenting products commonly purchased with the particular product. In some embodiments, the presenting the products within the hierarchy of the particular product comprises presenting products within increasingly broader aspects of the hierarchy based on time elapsed. In some embodiments, the presenting products within the hierarchy of the particular product further comprises applying a filter to the products within the hierarchy to be presented on the display. In some embodiments, the applying the filter comprises presenting products identified in a shopping list. In some embodiments, the applying the filter comprises filtering products within the hierarchy based on value information indicating at least one partiality possessed by the user. In some embodiments, the method further comprises analyzing video captured by a camera device of the mobile device to identify products on the product display with the control circuit. In some embodiments, the method further comprises analyzing stock levels on the product display in the video captured by the camera device with the control circuit; and sending a signal in response to determining that a product has a low stock. In some embodiments, the method further comprises receiving a selection of one or more of the products within the hierarchy of the particular product for purchase. In some embodiments, the method further comprises adding the selected products to a virtual cart with the control circuit for purchase at a point of sale of the retail location along with any physical products.

Some embodiments provide apparatuses, comprising: a memory having stored therein: information including partiality information for each of a plurality of persons in the form of a plurality of partiality vectors for each of the persons wherein the partiality vector has at least one of a magnitude and an angle that corresponds to a magnitude of the person's belief in an amount of good that comes from an order associated with that partiality; and vectorized characterizations for each of a plurality of products, wherein each of the vectorized characterizations indicates a measure regarding an extent to which a corresponding one of the products accords with a corresponding one of the plurality of partiality vectors. In some embodiments the apparatus further comprises: a control circuit operably coupled to the memory and configured to compare a particular one of the partiality vectors for a particular one of the plurality of persons to each of a plurality of the vectorized characterizations to thereby identify a particular one of the plurality of products that best accords with the particular one of the partiality vectors. The control circuit, in some implementations, is configured to compare the particular one of the partiality vectors to each of the plurality of the vectorized characterizations using vector dot product calculations. The partiality information, in at least some embodiments, include values, preferences, aspirations, and affinities. In some embodiments, the apparatus further comprises: a control circuit operably coupled to the memory and configured as a state engine that uses the partiality vectors and the vectorized characterizations to identify at least one product to present to a customer.

In some embodiments the apparatus further comprises: a control circuit operably coupled to the memory and configured to use the partiality vectors and the vectorized characterizations to identify at least one product to present to the customer by, at least in part: using the partiality vectors and the vectorized characterizations to define a plurality of solutions that collectively form a multi-dimensional surface; selecting the at least one product from the multi-dimensional surface. The control circuit, in some instances, is further configured to use the partiality vectors and the vectorized characterizations to identify at least one product to present to the customer by, at least in part: accessing other information for the customer comprising information other than partiality vectors; using the other information to constrain a selection area on the multi-dimensional surface from which the at least one product can be selected. In some embodiments, the other information comprises objective information.

This application is related to, and incorporates herein by reference in its entirety, each of the following U.S. provisional applications listed as follows by application number and filing date: 62/323,026 filed Apr. 15, 2016; 62/341,993 filed May 26, 2016; 62/348,444 filed Jun. 10, 2016; 62/350,312 filed Jun. 15, 2016; 62/350,315 filed Jun. 15, 2016; 62/351,467 filed Jun. 17, 2016; 62/351,463 filed Jun. 17, 2016; 62/352,858 filed Jun. 21, 2016; 62/356,387 filed Jun. 29, 2016; 62/356,374 filed Jun. 29, 2016; 62/356,439 filed Jun. 29, 2016; 62/356,375 filed Jun. 29, 2016; 62/358,287 filed Jul. 5, 2016; 62/360,356 filed Jul. 9, 2016; 62/360,629 filed Jul. 11, 2016; 62/365,047 filed Jul. 21, 2016; 62/367,299 filed Jul. 27, 2016; 62/370,853 filed Aug. 4, 2016; 62/370,848 filed Aug. 4, 2016; 62/377,298 filed Aug. 19, 2016; 62/377,113 filed Aug. 19, 2016; 62/380,036 filed Aug. 26, 2016; 62/381,793 filed Aug. 31, 2016; 62/395,053 filed Sep. 15, 2016; 62/397,455 filed Sep. 21, 2016; 62/400,302 filed Sep. 27, 2016; 62/402,068 filed Sep. 30, 2016; 62/402,164 filed Sep. 30, 2016; 62/402,195 filed Sep. 30, 2016; 62/402,651 filed Sep. 30, 2016; 62/402,692 filed Sep. 30, 2016; 62/402,711 filed Sep. 30, 2016; 62/406,487 filed Oct. 11, 2016; 62/408,736 filed Oct. 15, 2016; 62/409,008 filed Oct. 17, 2016; 62/410,155 filed Oct. 19, 2016; 62/413,312 filed Oct. 26, 2016; 62/413,304 filed Oct. 26, 2016; 62/413,487 filed Oct. 27, 2016; 62/422,837 filed Nov. 16, 2016; 62/423,906 filed Nov. 18, 2016; 62/424,661 filed Nov. 21, 2016; 62/427,478 filed Nov. 29, 2016; 62/436,842 filed Dec.

20, 2016; 62/436,885 filed Dec. 20, 2016; 62/436,791 filed Dec. 20, 2016; 62/439,526 filed Dec. 28, 2016; 62/442,631 filed Jan. 5, 2017; 62/445,552 filed Jan. 12, 2017; 62/463,103 filed Feb. 24, 2017; 62/465,932 filed Mar. 2, 2017; 62/467,546 filed Mar. 6, 2017; 62/467,968 filed Mar. 7, 2017; 62/467,999 filed Mar. 7, 2017; 62/471,804 filed Mar. 15, 2017; 62/471,830 filed Mar. 15, 2017; 62/479,525 filed Mar. 31, 2017; 62/480,733 filed Apr. 3, 2017; 62/482,863 filed Apr. 7, 2017; 62/482,855 filed Apr. 7, 2017; and 62/485,045 filed Apr. 13, 2017.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system comprising:
    a database of user profiles, the user profiles having one or more partialities associated therewith and the user profiles being associated with particular customers;
    a database of retail products, at least some of the retail products having identified vectorized product characterizations;
    a control circuit configured to access the database of user profiles and the database of retail products and configured to identify one or more suggested retail items for a particular customer based, in part, on comparisons between the identified partialities of the user profile associated with the particular customer and the identified vectorized product characterizations of the retail products;
    a plurality of physical shopping carts at a retail shopping facility, one of the plurality of shopping carts being designated for the particular customer and filled with at least one of the one or more suggested retail items prior to the particular customer arriving at the retail shopping facility;
    a rejection bin where the particular customer may deposit unwanted suggested retail items, the rejection bin having a bin sensor configured to detect placement of the unwanted suggested retail items; and
    a product support system and a product routing system communicatively coupled to the control circuit, the product support system configured to present products to consumers that are loaded thereon by an automated loading system;
    wherein the control circuit is further configured to:
        receive identification information from the bin sensor regarding unwanted suggested retail items placed in the rejection bin and to update the one or more partialities in the database of user profiles based, in part, on the particular customer associated with the user profile placing one of the unwanted suggested retail items in the rejection bin; and
        receive a product information query from a user computing device, identify a set of products having product attributes corresponding to the product information query received, and instruct the product support system to physically present at least one product of the identified set of products by loading the at least one product of the identified set onto the product support system by one or more retrieval devices of the automated loading system, for physical presentation to the particular customer at the retail shopping facility.

2. The system of claim 1 further comprising a staging area within the retail shopping facility with numerous shopping carts designated for use by particular customers, the designated shopping carts filled with at least one of the one or more suggested retail items for the particular customers, the staging area being where the particular customers retrieve their designated shopping carts.

3. The system of claim 1 wherein the user profile has purchased retail products associated therewith and at least one identified partiality associated with the purchased retail products.

4. The system of claim 1 further comprising one or more point of sale terminals and the control circuit is further configured to update the user profile associated with the particular customer based, in part, on retail products purchased by the particular customer at the point of sale terminal and the identified vectorized product characterizations associated with the purchased retail products.

5. The system of claim 1 further comprising a user computing device and wherein the control circuit is configured to receive, from the user computing device associated with the particular customer, a collection time and a collection location for picking up the particular customer's designated shopping cart filled with the at least one of the one or more suggested retail items.

6. The system of claim 1 further comprising a user computing device and wherein the control circuit receives location information from the user computing device associated with the particular customer and the at least one of the one or more suggested retail items are loaded into the designated shopping cart as the particular customer is identified as approaching approaches the retail shopping facility.

7. The system of claim 1 wherein the database of user profiles further includes a purchase history and the control circuit is further configured to identify the one or more suggested retail items based, in part, on the purchase history of the particular customer.

8. The system of claim 1 wherein the control circuit is configured to update the database of user profiles according to purchases at multiple retail facilities.

9. The system of claim 1 wherein the partialities are represented by partiality vectors and can include values, preferences, and affinities.

10. The system of claim 9 wherein the control circuit is further configured to analyze the partiality vectors and the vectorized product characterizations and identify an overlap therebetween.

11. The system of claim 1 wherein the control circuit is further configured to select the at least one product of the identified set of products for physical presentation based, in part, on the user profile associated with the particular customer submitting the product information query.

12. A method comprising:
    maintaining a database of a plurality of user profiles having one or more identified partialities associated therewith and the user profiles being associated with particular customers;
    maintaining a database of retail products, at least some of the retail products having identified vectorized product characterizations;
    identifying, via a control circuit, one or more suggested retail items for a particular customer based, in part, on comparisons between the identified partialities of the user profile associated with the particular customer and the identified vectorized product characterizations of the retail products;

loading a designated shopping cart, at a retail shopping facility, for the particular customer with at least one of the one or more suggested retail items prior to the particular customer arriving at the retail shopping facility;

receiving unwanted suggested retail items deposited into a rejection bin, the rejection bin having a bin sensor configured to detect placement of the unwanted suggest retail items and to notify the control circuit;

receiving, at the control circuit, identification information regarding the unwanted suggested retail items and updating the one or more partialities in the database of user profiles based, in part, on the particular customer associated with the user profile placing one of the unwanted suggested retail items in the rejection bin;

receiving a product information query at the control circuit from a user computing device;

identifying, via the control circuit, a set of products having product attributes corresponding to the received product information query;

instructing a product support system and a product routing system communicatively coupled to the control circuit to physically present at least one product of the identified set of products; and physically presenting the at least one product of the identified set of products to the particular customer on the product support system at the retail shopping facility wherein the at least one product of the identified set of products is loaded onto the product support system by one or more retrieval devices of an automated loading system or physically presenting the at least one product of the identified set of products to the particular customer on the product support system at the retail shopping facility wherein the at least one product of the identified set of products is loaded onto a display portion of the product support system that is transported to the particular customer at the retail shopping facility by one or more conveyors of the product routing system.

13. The method of claim 12 further comprising providing the designated shopping cart at a staging area within the retail shopping facility.

14. The method of claim 12 further comprising updating the user profile based, in part, on information received about the particular customer from a point of sale terminal visited by the particular customer before exiting the retail shopping facility.

15. The method of claim 12 further comprising receiving, from a user computing device associated with the particular customer, a collection time and a collection location for picking up the particular customer's designated shopping cart filled with the one or more suggested retail items.

16. The method of claim 12 further comprising receiving location information from a user computing device associated with the particular customer and loading the one or more suggested retail items into the designated shopping cart as the particular customer approaches the retail shopping facility.

17. The method of claim 9 further comprising:
selecting the at least one product of the identified set of products for physical presentation based, in part, on the user profile associated with the particular customer submitting the product information query.

18. A system comprising:
a database of user profiles, the user profiles having one or more partialities associated therewith and the user profiles being associated with particular customers;
a database of retail products, at least some of the retail products having identified vectorized product characterizations;
a control circuit configured to access the database of user profiles and the database of retail products and configured to identify one or more suggested retail items for a particular customer based, in part, on comparisons between the identified partialities of the user profile associated with the particular customer and the identified vectorized product characterizations of the retail products;
a plurality of physical shopping carts at a retail shopping facility, one of the plurality of shopping carts being designated for the particular customer and filled with at least one of the one or more suggested retail items prior to the particular customer arriving at the retail shopping facility;
a rejection bin where the particular customer may deposit unwanted suggested retail items, the rejection bin having a bin sensor configured to detect placement of the unwanted suggested retail items; and
a product support system configured to present products to consumers that are loaded onto a display thereof;
wherein the control circuit is further configured to:
receive identification information from the bin sensor regarding unwanted suggested retail items placed in the rejection bin and to update the one or more partialities in the database of user profiles based, in part, on the particular customer associated with the user profile placing one of the unwanted suggested retail items in the rejection bin; and
receive a product information query from a user computing device, identify a set of products having product attributes corresponding to the product information query received, and instruct the product support system to physically present at least one product of the identified set of products by transporting by one or more conveyors of a product routing system, the display of the product support system loaded with the at least one product of the identified set to the particular customer at the retail shopping facility for physical presentation of the at least one product of the identified set.

\* \* \* \* \*

UNITED STATES PATENT AND TRADEMARK OFFICE
CERTIFICATE OF CORRECTION

PATENT NO. : 10,592,959 B2
APPLICATION NO. : 15/487728
DATED : March 17, 2020
INVENTOR(S) : Bruce W. Wilkinson et al.

Page 1 of 1

It is certified that error appears in the above-identified patent and that said Letters Patent is hereby corrected as shown below:

In the Claims

Column 72, Line 33, Claim 6, delete "approaching approaches" and insert --approaching--, therefor.

Column 74, Line 4, Claim 17, delete "The method of claim 9" and insert --The method of claim 12--, therefor.

Signed and Sealed this
Twenty-eighth Day of July, 2020

Andrei Iancu
*Director of the United States Patent and Trademark Office*